United States Patent [19]

Sugarbaker et al.

[11] Patent Number: 5,262,843
[45] Date of Patent: Nov. 16, 1993

[54] PROCESSING ARRANGEMENT FOR OPTICAL RATE SENSOR

[75] Inventors: Daniel L. Sugarbaker, Grand Rapids; Thomas E. Perfitt, Kentwood, both of Mich.; Gary A. Wallen, Fort Wayne, Ind.

[73] Assignee: Lear Siegler, Inc., Santa Monica, Calif.

[21] Appl. No.: 875,589

[22] Filed: Apr. 28, 1992

Related U.S. Application Data

[63] Continuation of Ser. No. 854,190, Apr. 21, 1986, abandoned.

[51] Int. Cl.$^5$ .......................... G01B 9/02; H01S 3/083
[52] U.S. Cl. ......................................... 356/350; 372/94
[58] Field of Search ........................... 356/350; 372/94

[56] References Cited

U.S. PATENT DOCUMENTS

| | | | |
|---|---|---|---|
| 4,320,974 | 3/1982 | Ljung | 356/350 |
| 4,429,573 | 2/1984 | Walker | 356/350 X |
| 4,504,146 | 3/1985 | Morgan | 356/350 |
| 4,687,330 | 8/1987 | Lefevre | 365/350 |

FOREIGN PATENT DOCUMENTS 0168292 1/1986 European Pat. Off. ............ 356/350

*Primary Examiner*—Stephen C. Buczinski
*Attorney, Agent, or Firm*—Varnum, Riddering, Schmidt & Howlett

[57] ABSTRACT

An optical rate sensor (300) is disclosed for use in inertial reference systems to measure rates of angular rotation with substantially high resolution and sensitivity. The sensor (300) comprises a passive ring Sagnac interferometer (302) with a multiturn fiber optic ring (308) through which counter-propogating optical waves are transmitted. A non-reciprocal phase modulation is applied to the waves, and the waves are combined to produce a "zero order" fringe pattern having an intensity varying in accordance with the relative phase between the counter-propogating waves. The phase modulation is under control of modulated control signals which are functionally related to measured values of the angular rotation rate. The phase modulation thereby produces an intensity signal which tends to alternate between values of substantially maximum change with respect to given changes in phase shift resulting from the non-reciprocal phase modulation. The optical rate sensor (300) also includes an analog integrator (364) and a central processing unit (384) which provides for optimal control and filtering for determination of the rate of angular rotation and appropriate control signals to be applied to the non-reciprocal phase modulator. The central processing unit (384) also includes an arrangement whereby a relatively wide dynamic range is achieved with substantially minimal errors in rate determination and with the use of a physically realizable digital-to-analog converter through an arrangement whereby the most significant bits of the determined control signals are "stripped off" prior to application through a digital-to-analog converter (392).

21 Claims, 29 Drawing Sheets

PROCESSING ARRANGEMENT FOR OPTICAL RATE SENSOR

This is a continuation of application Ser. No. 06/854,190, filed Apr. 21, 1986, now abandoned.

TECHNICAL FIELD

The invention relates to optical rate sensors and, more particularly, relates to optical rate sensors employing Sagnac interferometric principles to precisely measure angular rates of rotation.

BACKGROUND ART

Inertial reference guidance systems, extensively utilized in aircraft and missile navigation applications, have traditionally employed spinning mass gyroscopes and associated electromechanical devices for performing various guidance functions, including the detection and measurement of angular rotation rates. Such devices are relatively bulky, expensive and complex, subject to drift rates difficult to control, and require an extensive number of moving parts, some of which have a corresponding short operating life.

Various apparatus utilizing more sophisticated concepts than those of the spinning mass gyroscopes to detect and measure rotation relative to a reference frame have long been known in the art of electromagnetics and, more particularly, optical physics. One of these concepts is the "Sagnac effect" manifested in the implementation of ring interferometric apparatus, and first demonstrated in now classic experiments described by Sagnac in 1913 and later by Michalson and Gale in 1925.

Ring interferometers comprise an optical or other electromagnetic wave source for generating a signal which is applied to a beam splitter or similar optical isolation device to divide the generated signal into two equivalent counter-propagating waves initially transmitted on separate paths. These paths respectively terminate at each of two ports of a closed ring configuration such that the paths are of substantially equivalent length.

The Sagnac effect can best be described and understood by characterizing the counter-propagating waves as a clockwise (CW) traveling wave and a counter-clockwise (CCW) traveling wave. If the ring configuration is rotating at a clockwise rate $G_I$, relativistic theory explains that the counter-propagating wave travelling in the same direction as the rotation vector of the closed path (the CW wave) is observed to follow a longer optical path than the CCW wave travelling in opposition to the path rotation. The counter-propagating waves will therefore experience a differential phase shift $P_S$ (known as the "Sagnac effect" phase shift) which can be characterized in accordance with the following equation:

$$P_s = [(4\pi RL)/(L_o c)] G_I \qquad \text{(Equation 1)}$$

where R is the radius of the enclosed path, L is the actual length of the physical path, $L_o$ is the nominal wave length of the counter-propagating waves, and c is the speed of light.

As apparent from Equation 1, the Sagnac phase shift $P_s$ is linearly proportional to the angular rotation rate $G_I$ of the passive ring for constant wavelength optical signals. Accordingly, a system having a ring interferometer and means for detecting and measuring Sagnac phase shift is theoretically capable of use as a navigation apparatus to determine angular rotation rates. However, as described below, extensive difficulties exist in developing physically realizable interferometric apparatus suitable for implementation in aircraft and, more specifically, in developing systems capable of practically and accurately measuring Sagnac phase shifts.

The early development of practical navigational apparatus employing Sagnac interferometric principles was hindered by the bulky size of requisite instrumentation components and direct measurement difficulties due to the small magnitude of induced Sagnac phase shifts in the range of rotation rates achieved during flight. However, laser technology and the recent advances in development of low scatter mirrors and stable structural materials have rendered the Sagnac effect measurable in various prior art systems. Certain of these systems, such as those disclosed in the Podgorski U.S. Pat. No. 3,390,606, issued Jul. 2, 1968, utilize "active" medium ring configurations and are commonly known as "ring laser gyroscopes." These ring laser gyroscopes comprise tuned resonant cavities wherein the angular rotation rate of the ring configuration is proportional to an observed beat frequency between the oppositely travelling waves within the cavity. However, such active medium ring lasers have problems associated with the phenomena of "mode pulling" and "frequency lock-in" commonly known to those skilled in the art of optical system designs. These phenomena are experienced when the frequency difference between the oscillating waves becomes small, for example, less than 500 Hz. Optical coupling occurring within the active medium tends to "pull" the frequencies of the oscillatory waves together (mode pulling) and ultimately "locks" them together (frequency lock-in) into one frequency, thereby eliminating beat frequency at the low frequency differences which would be observed in ring laser gyroscopes operating in aircraft or missile navigation systems.

Rate sensing devices have also been developed utilizing "passive" ring configurations wherein the ring configuration is a tuned cavity arrangement with externally generated counter-propagating waves. As the ring configuration is rotated, the counter-propagating waves exhibit differential frequencies and, like the ring laser systems, a corresponding beat frequency is observed therebetween which is proportional to the rate of rotation. Though these passive systems do not experience frequency lock-in and pulling phenomena, other bias variation effects such as high temperature sensitivity tend to produce inherent beat frequency instabilities when the tuned cavity ring configurations comprise adjustable mirrors or similar arrangements. If optical fibers are utilized in the ring configurations, as may be necessitated to minimize instabilities, cavity length control becomes extremely difficult.

Another problem associated with any optical system employing signals having differential frequencies is that various bias effects can operate in a non-reciprocal manner dependent upon wave frequencies. Such bias effects are cumulative over time and can result in observed finite beat frequencies even though there is no actual angular rotation of the ring configuration.

The state of the art of integrated optics and, more specifically, optical fiber and laser design is now at a stage whereby compact instrumentation comprising passive ring interferometers can be designed with coiled multiple turn fiber optic rings capable of producing a measurable Sagnac effect phase shift over a substantially wide range of rotation rates as required in aircraft and missile applications. It should be apparent from Equation 1 that increasing the number of ring turns correspondingly increases the magnitude of Sagnac phase shift for a given rotation rate. These passive ring interferometers utilize single mode counter-propagating waves and avoid the problems of active medium and dual mode systems as previously described. However, many existing rate sensing devices utilizing the aforementioned state of the art optical technology still exhibit inaccuracies caused by inherent problems such as poor resolution over wide dynamic ranges of rotation rates (e.g. low signal to noise (S/N) ratios), and sensitivity to intensity and wavelength variations of source-generated signals.

To illustrate certain of the aforementioned problems and for purposes of understanding the invention, FIG. 1 depicts, in block diagram form, a prior art rate sensor 100 having a passive ring Sagnac interferometer 101. The subsequent discussion herein regarding the Sagnac effect will be somewhat cursory in that detailed principles of such interferometers are well-known in the art and, for example, are described in Schneider, et al, *Journal of Applied Optics*, Vol. 17, p. 3035 et seq. (1978).

Interferometer 101 comprises a laser source 102 capable of generating an optical signal on conductor 104 having a nominal wavelength $L_o$. Conductor 104 and other conductors described herein can comprise any one of several types of paths capable of transmitting optical signals. The optical signal on conductor 104 is applied to a beam split/recombine circuit 106 as shown in FIG. 1. The circuit 106 is an isolation/coupler circuit well-known in the art of optical circuit design, and divides the optical signal on conductor 104 into two equivalent counter-propagating signal waves transmitted on conductors 108 and 110. The signal waves will be referred to as the clockwise signal (CW) wave 112 as transmitted on conductor 108 and the counter-clockwise (CCW) signal wave 114 as transmitted on conductor 110. The waves 112 and 114 are applied, respectively, to the two ring ports 116 and 118 of a multiple turn fiber optic passive ring 120. Included in the path of conductor 110 is a phase bias circuit 122 which will be described in subsequent paragraphs herein. The fiber optic ring 120 is coiled such that it comprises a radius R and a path length L. The CW wave 112 and CCW wave 114 traverse the paths of ring 120 in opposite directions and emerge from the ring on conductors 110 and 108, respectively. The returning propagating waves are then applied through circuit 106 and recombined such that a combined signal wave referred to as CS wave 124 is transmitted on conductor 126 as shown in FIG. 1.

The returning CW wave 112 and CCW wave 114 will have experienced a relative Sagnac phase shift having a magnitude and directional sense linearly proportional to the angular rotation rate of the passive ring 120. If the phase shift is characterized as $P_s$ and the angular rotation of the passive ring as $G_I$, then Equation 1 defines the proportional relationship. For purposes of subsequent discussion relating to the prior art and the principles of the invention, this proportional relationship will be referred to herein as scale factor $K_S$, whereby $P_S = K_S G_I$.

Ignoring for a moment the function of the depicted phase shift bias circuit 122 and any constant predictable phase shifts within the interferometer 101, the recombined CS wave 124 will be reflective of the Sagnac effect phase shift $P_S$ and can be applied on conductor 126 as an input signal to a photodiode 128. CS wave 124 will "impinge" on the photodiode 128 with a fringe pattern well known in the art of optical physics. The "low order" fringe pattern, that is, the areas between alternate light and dark bands near the center of the fringe pattern, will vary in intensity in accordance with the relative phase of the recombined counter-propagating waves 112 and 114 as represented by CS wave 124. The current output signal of photodiode 128 on conductor 130 is representative of the intensity of the "zero order" portion of the low order fringe pattern. For purposes of description, this intensity signal will be referred to as signal S and can be applied as shown in FIG. 1 to various readout circuits 132 which provide a measurable output signal on conductor 134 corresponding to the signal S.

As known in physical optics theory, the signal S on conductor 130 can be described in terms of the following equation:

$$S = I_o \cos^2 (P_s/2) \qquad \text{(Equation 2)}$$

where $I_o$ is the maximum signal intensity and $P_s$ the relativistic phase shift occurring due to the Sagnac effect as previously described with respect to Equation 1. FIG. 2 depicts the sinusoidal variation of signal S relative to the Sagnac phase shift $P_s$. S is symmetrical about the intensity signal axis with the intensity having a value $I_o$ for a zero valued $P_s$. As shown in FIG. 2, if the intensity of signal S is measured as a value $S_1$, then a corresponding magnitude of Sagnac phase shift $P_1$ will be observed by computation in accordance with the known functional relationship between intensity signal S and Sagnac phase shift $P_s$ (Equation 2). As previously described with respect to Equation 1, $P_s$ is linearly proportional to the angular rotation rate for a specific passive ring configuration and a constant wavelength signal source. Accordingly, the magnitude of signal S provides an observable determination of rotation rate $G_I$. Other conventional circuitry can be utilized to provide indication as to the polarity, i.e. directional sense, of the phase shift and to further determine whether the phase shift is between 0° and 90°, or 90° and 180°, etc.

The readout circuits 132 can comprise various types of circuits for obtaining a measurement of the intensity of signal S. For example, signal S can be sampled with associated analog to digital (A/D) conversion circuitry periodically every T seconds. The resulting output of such digital mechanization can be a binary word proportionally representative of the angular rotation rate $G_I$ each period. The period T must be chosen sufficiently small to preclude loss of substantial signal information when computing the angular displacement from the samples of intensity signal S.

As previously noted, several problems exist in basic implementations of rate sensors employing passive ring Sagnac interferometers as depicted in FIG. 1 when utilized in inertial reference systems. The relationship between the intensity signal S and the Sagnac effect phase shift $P_s$ is a non-linear sinusoidal $\cos^2$ wave form as described in Equation 2. The physically realizable values of $P_s$ will be extremely small with respect to the wavelength $L_o$. Accordingly, the actual measured intensity $S_1$, corresponding to a Sagnac phase shift $P_1$, will be close to the maximum "peak" of the wave form of the signal S. Therefore, measurement of changes in Sagnac phase shift by measuring changes in magnitude of signal S is extremely difficult. Thus, within this area of operation, the non-linear relationship between the intensity signal S and the Sagnac phase shift $P_s$ limits the useful range of rate measurements when utilizing conventional measurement techniques such as digital sampling. That is, any type of digital sampling to obtain an estimation of the Sagnac phase shift will be limited by the minimal sensitivity occurring at the peak of the wave form of signal S near the phase shift axis origin.

Another problem in prior art systems is related to possible intensity variations of the signal S. Such variations can readily occur due to laser source variations or transmission losses within the optical conductive paths of interferometer 101. FIG. 3 depicts the effect of signal intensity changes with the nominal wave form of signal S shown in dotted lines and the intensity varied signal shown in solid lines. As apparent therefrom, an intensity change in signal S can result in an erroneous determination $P_E$ of the Sagnac phase shift $P_S$ for a measured signal magnitude $S_1$. This erroneous determination will thus result in an erroneous calculation of the angular rotation rate $G_I$.

Another difficulty with interferometer 101 is the possibility of obtaining erroneous measured rates due to variations in wave length of the optical signals. For example, a typical optical beam generated through a laser diode has a wavelength which is temperature dependent and may vary in the range of 0.03% per degree Centigrade. FIG. 4 depicts the effect of wavelength changes where the intensity pattern of signal S with a nominal wave length $L_o$ is shown in dotted lines and the varied pattern of signal S with an actual wavelength $L_E$ is shown in solid lines. Again, such wavelength changes result in an erroneous determination $P_E$ of the Sagnac phase shift $P_s$ for a measured signal magnitude $S_1$.

Another problem associated with utilizing interferometers in applications such as missile navigation systems, where substantial accuracy is required over a wide dynamic range of rotation rates, relates to the requisite resolution within the range. For example, such a navigation system can require output signals indicative of rotation rate throughout a range of 1000° per second to 1° per hour, i.e. a range ratio of $3.6 \times 10^6$ to 1, assuming constant resolution within the range. If a measurement technique such as digital sampling is utilized to estimate the magnitude of signal S, a 22 bit (plus sign) binary word must be utilized for purposes of analog to digital conversion. The necessity of such large scale data words is prohibitive to the use of small scale and high speed A/D converters as required for aircraft and missile guidance control systems. Still another problem associated with the requisite wide dynamic range pertains to the signal to noise ratio. In accordance with conventional communication theory, a 131 db S/N ratio is required for a $3.6 \times 10^6$ dynamic range. In physically realized passive rate interferometers comprising the circuitry shown in FIG. 1, the S/N ratio will actually be closer to a value of 75 db.

Certain prior art systems employing passive ring interferometers have attempted to overcome the previously-discussed problem of intensity signal insensitivity to Sagnac phase shift changes by introduction of a phase bias circuit 122 into the optical conductive path 110 as shown in FIG. 1. Circuit 122 is a conventional circuit which induces a substantially constant phase shift in wave signals transmitted on conductor 110. The externally-applied phase shift modifies the previously-described relationship of signal S to Sagnac phase shift disclosed in Equation 2 to the following:

$$S = I_0 \cos^2 \tfrac{1}{2}(P_B + P_s) \qquad \text{(Equation 3)}$$

where $P_B$ is the externally induced phase shift applied from phase bias circuit 122.

The induced phase shift $P_B$ causes the relational pattern of output signal S to be "shifted" with respect to the Sagnac phase shift $P_s$. FIG. 5 depicts in dotted lines the relationship between signal S and Sagnac phase shift $P_s$ with no externally-induced phase shift, and further depicts in solid lines the effect on the same relationship of the induced phase shift $P_B$. As apparent from FIG. 5, the measured intensity $S_1$ with induced phase shift $P_B$ and corresponding to a Sagnac phase shift $P_1$ will be on a substantially linear and "maximum slope" portion of the relational pattern. In accordance with conventional digital sampling and communication theory, such a system will be substantially more sensitive to changes in Sagnac phase shift due to angular rotation rate changes than will a system where the expected values of phase shift occur on or near peaks and valleys of the sinusoidal intensity signal wave pattern.

One known gyroscope apparatus utilizing a passive fiber ring interferometer and generally employing phase bias circuitry was invented by W. C. Goss and R. Goldstein, and is described in the "Technical Support Package on Optical Gyroscope for NASA Technical Brief", Vol. 3, No. 2, Item 25, JPL Invention Report 30-3873/NPQ-14258 published by Jet Propulsion Laboratory, California Institute of Technology, Pasadena, Calif., and dated October, 1978. The Goss et al optical gyroscope comprises a passive ring Sagnac interferometer for measuring rotation rates in accordance with the Sagnac phase shift principles previously discussed herein. Output signals are generated at two optical detectors having a response pattern indicative of the resultant phase shift due to angular rotation of the passive fiber ring.

A bias cell utilizing commonly-known "Faraday effect" principles is introduced into the optical paths of the interferometer to provide a constant 45° advance of one wave, 45° retardation of the other wave, and phase offset compensatory for the Sagnac effect phase shift. The overall effect of the bias cell is to "shift" the response pattern of the output signals such that changes in signal intensity are maximized for corresponding Sagnac phase shift changes, thereby providing maximum measurement sensitivity. A fiber optic reversing switch is also included in the optical paths to minimize the phase shift effects of such reciprocal phenomena as long-term source drift, etc. However, the Goss apparatus does not provide complete resolution to inaccuracies in measuring rotation rates with passive ring Sagnac interferometers caused by inherent problems such as sensitivity to short term source intensity variations and optical path losses, wavelength dependency, lack of sufficient signal to noise ratio and insufficient operational dynamic range.

A substantial technological advance over other rate sensing devices is described and claimed in the commonly-assigned Carrington et al U.S. Pat. No. 4,456,376 issued Jun. 26, 1984. In Carrington et al, an optical rate sensor is disclosed which substantially corresponds to the rate sensor 200 depicted in FIG. 6. The rate sensor 200 is somewhat similar to the previously-described optical rate sensor 100 in that it comprises a passive ring Sagnac interferometer 202 having a laser source 204, optical isolation/coupler circuit 206 and a multiple turn optical fiber ring 208.

The laser source circuit 204 provides a means for generating a single transverse mode linearly polarized optical signal DS on conductor 210 with a nominal wavelength of $L_o$. Any of several types of source circuits could be utilized for the laser source circuit 204. The optical signal DS on conductor 210 is applied as an input signal wave to optical isolation/coupler circuit 206. Circuit 206 provides a means for dividing the signal DS into two substantially equivalent wave signals separately transmitted on conductors 212 and 214. These equivalent signal waves are characterized as "counter-propagating" waves for purposes made apparent subsequently herein, and are further referred to as clockwise (CW) wave signal 216 and counterclockwise (CCW) wave signal 218 transmitted on conductors 212 and 214, respectively. Waves 216 and 218 are substantially equivalent single transverse mode waves each having a nominal wavelength of $L_o$.

The CW wave signal 216 on conductor 212 is directly applied to one ring port 220 of the optical fiber ring 208. The CCW wave signal 218 on conductor 214 is applied as an input to ring port 222 of the fiber ring 208. However, a phase modulator circuit 224 is connected intermediate the isolation coupler circuit 206 and the fiber ring 208 on the conductive path 214. The function of the phase modulator circuit 224 will be subsequently described herein.

The fiber ring 208 can be circular in structure with a radius R and a physical path length L. Ring 208 provides a preferable ring configuration necessary for operation of the Sagnac interferometer 202 and will be more functionally described in subsequent paragraphs herein. Returning to connections in circuitry associated with the isolation/coupler circuit 206, a conductor 226 is directly connected to the coupler circuit 206 and also to an input terminal of photodiode circuit 228. The photodiode 228 provides a means for generating a current signal on conductor 230 which is representative of a sampled portion of a low order fringe pattern of the wave signal appearing on conductor 226.

Connected to the photodiode 228 by means of conductor 230 is a photodiode transconductance amplifier 232 which provides a means for converting low level output current from the photodiode 228 on conductor 230 to a voltage level signal on conductor 234, with the signal level being of a magnitude suitable for subsequent sampling and analog to digital (A/D) conversion functions. Connected to an output terminal of transconductance amplifier 232 by means of conductor 234 is an anti-aliasing filter circuit 236. The filter 236 comprises a means for preventing high frequency noise signals from the voltage signal appearing on conductor 234 from folding over into the lower frequency signal associated with the time-variant angular rate after A/D sampling of the analog signal from the photodiode 228 has occurred.

The output signal of the anti-aliasing filter 236 is applied on conductor 238 as an input to a conventional sample/hold (S/H) circuit 240. Circuit 240 provides a means for obtaining sampled signals transmitted from the filter 236 on conductor 238 and is controlled by clock pulses on conductor 242 and 244 generated from master clock 246.

Connected to the output of the S/H circuit 240 by means of conductor 248 is an A/D conversion circuit 250. Circuit 250 comprises a means for converting the sampled signals transmitted from circuit 240 to digital signals for purposes of subsequent operations. The A/D circuit 250 is controlled by means of clock pulses applied on conductor 244 from master clock 246. The clock pulses operate as "start" pulses for performance of the A/D conversion. In known systems in accordance with the Carrington et al patent, the A/D circuit 250 can comprise, for example, 12 binary information bits, thereby providing a resolution of 4,096 levels per sampled signal. A conversion time of 200 nanoseconds or less is considered suitable for purposes of utilizing the rate sensor 200 in various aircraft and missile applications.

The A/D circuit 250 is directly connected by means of conductor 252 to a sample register 254 comprising a means for storage of digital information signals representative of a plurality of sampled signals from the S/H circuit 240. Register 254 can comprise, for example, a 128 "first-in first-out" (FIFO) information word memory, each word having 12 bits of information.

The A/D circuit 250 is also connected to an overflow logic circuit 256 by means of conductor 258 as shown in FIG. 6. Sample signal levels having a magnitude greater than a predetermined level would not be stored in the A/D circuit 250, and the occurrence thereof would cause a pulse to be applied to the logic circuit 256 by means of conductor 258. The logic circuit would be reset by means of clock pulses occurring on conductor 260 as generated from the master clock 246.

The logic circuit 256 would also provide two state signals to register 262. Register 262 could be equivalent in structure and design to the register 254 and provide means for storage of a plurality of clock information signals representative of clock times corresponding to the measured times of the associated signal samples stored in register 254. These representative clock signals could be applied to the register 252 by means of clock register 264 through conductor 266. Clock pulses from master clock 246 transmitted on conductors 244 and 260 could be utilized as input signals to the register 264 to provide a sequential implementation function to achieve the requisite clock signal information within register 264. Register 264 could also comprise, for example, storage for 12 binary information signals, thereby providing 4,096 clock signal levels.

The clock register 262 and the sample register 254 are connected to a central processing unit (CPU) 268 by means of conductors 270 and 272, respectively. The conductors 270 and 272 provide a means for transmitting the binary information signals stored in registers 262 and 254 directly to the CPU 268. These conductors allow bidirectional transmission and also provide a means for the CPU 268 to selectively address the information words within the registers 262 and 254. In this particular type of configuration, the CPU 268 does not provide any specific control of the operation of the various sampling, A/D conversion and register circuitry previously described herein. The circuits operate strictly under the control of the master clock 246, and CPU 268 is merely capable of addressing the registers 262 and 254 to obtain transmission of the binary information signals stored therein directly to conventional memory units within the CPU 268. Specific functions achieved by CPU 268 are more fully described in subsequent paragraphs herein.

Returning to aspects of the optical rate sensor 200 associated with the phase modulator circuit 224, the master clock 246 is directly connected to a counter 274 by means of conductor 276. Counter 274 is a conventional binary counter which provides a means for generating sequential information signals to additional circuitry subsequently described herein. The counter 274 is clocked by clock pulses provided on conductor 276 by the master clock 246. Counter 274 can, for example, comprise a 12 bit binary information storage memory sequentially incremented at a 2 MHz rate from clock pulses supplied on conductor 276. The counter 274 can also receive information signals from the CPU 268 by means of conductor 278. In addition, and as subsequently described herein, information signals provided on conductor 278 can be utilized for purposes of initialization of phase modulation cycles and selection of particular modulator patterns to be utilized.

The counter 274 is connected by means of conductor 280 to a phase state register 282 as also depicted in FIG. 6. Phase state register 282 provides a means for storage and transmission of digital information signals to which the phase modulation circuit 224 is responsive to provide a particular modulator pattern. Phase state register 282 can, for example, comprise a parallel output of 12 binary information signals with storage capability of 4,096 12-bit binary information words.

The output of the phase state register 282 is directly connected to a digital to analog (D/A) converter 284 which provides a means for converting the digital signals received on conductor 286 to corresponding analog signals which are applied as output signals on conductor 288. D/A converter 284 can be any suitable conversion circuit capable of providing latched analog output signals corresponding to 12-bit binary input signals with a conversion and settling time of less than approximately 200 nanoseconds.

The D/A converter 284 is connected by means of the conductor 288 to a phase modulator driver amplifier 290. Driver 290 provides a means for converting the analog signals transmitted from converter circuit 284 to suitable voltage signal levels on conductor 292 for operating the phase modulator circuit 224. For example, the output voltage signals on conductor 292 can comprise a 500 nanosecond alternating polarity pulse pattern with amplitude variation of 0 to ±20 volts. A suitable loading for the driver 290 is provided by the capacitive input of the electro-optical phase modulator 224. The driver 290, converter 284, phase state register 282 and counter 274, with associated clock control from master clock 246, comprise a control means for achieving a particular pattern of phase modulation within the modulator circuit 224.

Although not shown in FIG. 6, the optical rate sensor 200 can also include a means for achieving temperature compensation for measurements of angular rotation rates. The compensation arrangement can include a temperature monitor connected to the phase modulator 224, with additional circuitry to convert monitor signals into appropriate signals capable of storage and input to the CPU 268.

In operation, the CW wave signal 216 on conductor 212 is directly applied to the ring port 220 of the fiber ring 208. Correspondingly, the CCW wave signal 218 on conductor 214 is applied through the phase modulator circuit 224 which induces a time-variant phase shift in the CCW wave 218. The magnitude of the phase modulation shift at any given time is directly dependent and proportional to the driving voltage signal applied on conductor 292 from the previously described driver 290. The CCW wave signal 218 is thus phase modulated and applied to the ring port 222 of the fiber ring 208. The wave signals 216 and 218 thus propagate in opposing directions through the fiber ring 208.

As the waves 216 and 218 propagate through and emerge from the fiber ring 208, the phase modulator circuit 224 has been driven to a different phase shift value during the transit time, since the time of duration for each level of phase shift is made to substantially correspond to the ring transit time. The counter propagating wave which appears on conductor 214 as it emerges from the fiber ring 208 is then applied to the phase modulator circuit 224 and transmitted therefrom directly to the isolation/coupler circuit 206. The counter propagating wave emerging from the fiber ring 208 on conductor 212 is directly applied to the coupler circuit 206.

Coupler circuit 206 then operates to recombine the waves 216 and 218 into a combined wave characterized as CS wave 294 transmitted on conductor 226 as depicted in FIG. 6. As previously described with respect to passive ring Sagnac interferometers in general, the counter propagating waves 216 and 218 will have a relative Sagnac phase shift therebetween which is directly proportional to the angular rotation rate $G_I$ of the passive fiber ring 208. This Sagnac induced phase shift will result in the CS wave 294 having a low order fringe pattern representative of the magnitude and direction of the Sagnac phase shift. The CS wave 294 can be characterized as the output signal wave from the passive ring interferometer 202, and having information indicative of the magnitude and direction of the Sagnac phase shift due to angular rotation rate $G_I$ of the ring 208.

The CS wave 294 on conductor 226 is then applied as an "impinging" signal to the photodiode 228. The photodiode 228 generates an output current signal on conductor 230 having an intensity representative of a given point of the "low order" fringe pattern of CS wave 294 and, accordingly, is representative of the relative phases of CW wave 216 and CCW wave 218.

The current output signal on conductor 230 is directly applied as an input signal to the transconductance amplifier 232 which, as previously described, provides a voltage output signal on conductor 234 having a level suitable for subsequent functional operations thereon. In FIG. 6, the signal on conductor 234 is characterized as intensity signal S.

As previously described, the relationship of an intensity signal S to a Sagnac phase shift $P_S$ and fixed induced phase shift $P_B$ is shown in Equation 3. However, in accordance with the Carrington et al arrangement, wherein a time-variant nonreciprocal phase shift is applied to the counter-propagating waves 216 and 218, the relationship of the intensity signal S to Sagnac phase shift $P_S$ is the following:

$$S = I_0 \cos^2 \tfrac{1}{2}(P_B(t) + P_S(t)) \qquad \text{(Equation 4)}$$

Where $P_B(t)$ is the known induced nonreciprocal phase shift applied from phase modulator circuit 224 and $P_S(t)$ is the rate proportional Sagnac phase shift.

As described in the Carrington et al patent, the phase shift $P_B(t)$ applied through the phase modulator circuit 224 can be varied rapidly in time in a periodic manner relative to expected rates of change of rotation. This actual phase shift applied by modulator circuit 224 can be directly proportional to the driving voltage applied on conductor 292 by driver 290. An exemplary waveform for this driving voltage pattern is depicted in FIG. 7. Each level of driving voltage has a direct and proportional correspondence with a magnitude of phase shift applied by modulator circuit 224 within the range of $-\pi$ to $+\pi$ radians. The time period $T_P$ for each modulator voltage level could, for example, be a period of five microseconds or a similar duration, and would correspond to the wave transit time through the fiber ring 208. In addition, it is also possible to vary the modulator drive pattern such that $T_P$ is a much shorter time interval than the ring transit time. By utilizing such a shorter drive voltage time period, a faster rate of output of the measured angular rotation rate could be achieved.

For purposes of subsequent description, the phase modulator phase shift symbol "$P_B$" will be understood to be a function of time t. With the phase modulator circuit 224 providing a phase shift $P_B$ proportional to the output voltage of the driver 290, and with the time-variant phase shift varied rapidly over the range of $-\pi$ to $+\pi$ radians, the pattern of the intensity signal S as a function of the modulator phase shift $P_B$ (and, accordingly, as a function of the voltage drive pattern) will appear similar to the sinusoidal functional relationship of the signal S versus Sagnac phase shift $P_S$ previously described and depicted in FIG. 2 when there is a substantially zero rate of angular rotation $G_I$ of the passive ring 208. However, the abscissa axis of this wave pattern will now be the externally applied phase shift $P_B$, rather than the Sagnac phase shift $P_S$ as depicted in FIG. 2.

With the scanning rate of the modulator circuit 224 sufficiently rapid relative to the rate of change of angular rotation, and with a voltage drive pattern comparable to that depicted in FIG. 7, the effect of nonzero angular rotation rate of the passive ring 208 is to cause a relational pattern of signal S relative to modulator phase shift $P_B$ to translate to the left or right of the voltage drive axis origin as depicted in FIG. 8. The specific magnitude and direction of translation, characterized herein as "phase offset," can be readily shown to directly correspond to the magnitude and direction of observed Sagnac phase shift $P_S$. Accordingly, and as shown in FIG. 8, the modulator phase shift $P_B$ corresponding to the maximum "peak" of intensity signal S which occurs at the abscissa origin when the angular rotation rate is substantially zero will correspond to the Sagnac phase shift $P_S$. The measurement of the "peak offset" corresponding to the offset of the intensity signal from its position when zero angular rotation is applied to the fiber ring 208 will provide a determination of the Sagnac effect phase shift.

Basically, this offset is measured in units of effective modulator differential voltage where the differential time interval implied thereby is the fiber ring optical transit time. By utilizing measurement means of the peak offset as subsequently described herein to determine the Sagnac-induced phase shift, the Carrington et al arrangement overcomes a number of inherent problems previously discussed with respect to the optical rate sensor 100 depicted in FIG. 1.

For example, the rate sensor 200 includes arrangements for determining the offset of the intensity signal S relative to the modulator drive voltage by means of center biasing intensity signal S and determining zero-crossing locations immediately before and after a peak or valley. The functional relationship between the signal S and the modulator drive voltage (and to the modulator phase shift proportional to the drive voltage) after center biasing is accomplished as shown in FIG. 9, with the modulator drive voltage corresponding to the peak offset shown as voltage $V_S$ and the Sagnac induced phase shift corresponding thereto as phase shift $P_S$. To obtain the zero-crossing locations, the S/H circuit 240 will sample the intensity signal S at various regions of the signal pattern shown as the "sampled region" in FIG. 9. In accordance with conventional communication sampling theory, the samples obtained at zero or minimum sloped regions of the intensity pattern do not substantially contribute to determination of the zero-crossing locations. Accordingly, the optical rate sensor 200 utilizes only the sample signals which correspond to the region substantially between ±45° of the maximum sloped positions which correspond to the zero-crossing locations.

This sampled region is determined by prestorage of a magnitude level within the A/D converter 250 which corresponds to a magnitude above which the intensity signal S can be characterized as being outside of the sampled region. As the sample signals are applied from S/H circuit 240 to the A/D converter 250, they are stored in sample register 254 until a magnitude of intensity signal sample is received which is above the predetermined magnitude corresponding to the thresholds of the sampled region. When such a signal is received, a trigger pulse is applied to the overflow logic circuit 256 by means of conductor 258. Similarly, a trigger pulse is also applied on conductor 258 when the magnitude of signal samples goes from a greater value to a lesser value than the threshold levels of the sampled region.

The overflow logic circuit 256 utilizes the trigger signals applied on conductor 258 to apply start and stop signals directly to the sample register 254 and clock register 262. During the time that the intensity signal samples are within the sampled region thresholds, the A/D converter 250 sequentially applies digital signals representative of the analog sample signals to storage locations in the sample register 254. Correspondingly, the clock register 264 applies associated clock signals to the clock register 262 to provide a time correspondent of the sample signals stored in register 254.

At appropriate times as subsequently described herein, the sample signals stored in register 254 and corresponding clock signals stored in register 262 are applied to the CPU 268. CPU 268 can be any appropriate processor circuit capable of determining the zero-crossing locations of the relational signal pattern S from the samples obtained in registers 254 and 262.

Referring again to FIG. 9, the zero-crossing locations of the intensity signal pattern S are characterized as corresponding to modulator drive voltages $V_{C1}$ and $V_{C2}$. When these voltages have been determined, the voltage corresponding to the location of the peak offset of the relational pattern of the intensity signal S is effectively the average of voltages $V_{C1}$ and $V_{C2}$ and is shown in FIG. 9 as $V_S$. As previously described, the modulator drive voltage corresponding to the intensity signal peak will directly correspond to the Sagnac induced phase shift $P_S$ which, in turn, is linearly proportional to the angular rotation rate $G_I$.

Again referring to the inherent problems previously discussed with respect to other optical rate sensors such as sensor 100 depicted in FIG. 1, the offset position of the peak is not altered by intensity changes of signal S. Furthermore, the peak offset as determined by the average value between the voltages corresponding to the zero-crossing locations is also not altered. In addition, the determination of the peak offset by utilizing the zero-crossing locations is substantially immune to the effect of laser source wavelength changes. Accordingly, the voltage $V_S$ corresponding to the peak can be calculated by determination of zero-crossing locations regardless of the wavelength of the intensity signal corresponding thereto.

Still further, the nonlinearity of the intensity signal S relative to the phase shifts $P_B$ and $P_S$ is of no substantial concern due to the utilization of zero-crossing detection to determine the peak offset corresponding to the modulator drive voltage $V_S$. The zero-crossing locations are utilized to infer the phase shift corresponding to the peak offset and are linear with respect to rotation rate. Additionally, by taking a substantially large number of samples of the intensity signal S over the linear portion of the $\cos^2$ waveform, certain optimal techniques to determine cross-over locations can be effected within the CPU 268 as described in subsequent paragraphs herein.

Referring to more specific detail of the phase modulation circuit 224 and associated control circuitry, the counter circuit 274 is controlled by clock pulses derived from master clock 246 and transmitted thereto on conductor 276. The counter 274 comprises a parallel 12-bit output signal which can be utilized to directly address storage locations of the register 282. Counter 274 is triggered by the clock pulses occurring on conductor 276 and provide a count output signal in the range of 0 to 4,095 levels. Counter 274 can be controlled by start and reset pulse signals from CPU 268 on conductor 278. Conductor 278 also provides a means for varying the starting count for purposes of modifying modulator scans for reasons subsequently described herein.

As the counter 274 provides sequential binary output signals applied to the phase state register 282, register 282 is responsive to these signals to address a word location therein and generate an output signal on conductor 286 corresponding to the stored information signals within the address word location. The information signals stored in these word locations correspond to digital information signals representative of particular voltage levels which will be applied to the phase modulator circuit 224 to cause phase shifts of the counter-propagating waves 216 and 218 relative to the interferometer 202 over the time of one ring transit.

The output signals from the register 282 are directly applied to the D/A converter 284 by means of conductor 286. D/A converter 284 converts the digital information signals corresponding to the modulator voltage to be applied to modulation circuit 224 to corresponding analog signals. These analog signals are transmitted on conductor 288 to the previously-described driver 290. The driver 290 provides an appropriate interface to the modulator circuit 224 and applies voltage levels on conductor 292 in accordance with the voltage drive pattern previously described and depicted in FIG. 7.

As also previously discussed, it is possible to utilize certain conventional techniques commonly known in the art of communication circuit design to enhance the determination of zero-crossing locations and, accordingly, provide relatively high resolution in determining the angular rotation rate $G_I$ of the passive ring 208. In the rate sensor 200 depicted in FIG. 6, the function can be provided in part by utilization of information processing within CPU 268. For example, the information processing and control functions can be accomplished in part by dividing the same into certain real time sequences relating to the following functions: executive sequence control, zero-crossing and peak offset determinations, optimal estimation of peak offset, output of signals representative of angular rotation rate, phase modulator scan initiation, background tasks and recovery sequences for processing of erroneous zero-crossing information signals. A sequence diagram for these functions is depicted in FIG. 10, and a timing diagram showing the relationship of circuit functions performed by circuitry external to CPU 268 to the sequential functions performed within CPU 268 is depicted in FIG. 11.

Referring to FIGS. 6 and 11, a particular phase modulation cycle can be initiated by application of a reset signal to the counter 274 from CPU 268 by means of conductor 278. The phase modulation control circuitry comprising counter 274, register 282, D/A converter 284 and driver amplifier 290 provides sequential control of the phase modulator circuit 224 such that the modulator is driven through one period of a complete phase shift modulation pattern. This particular cycle will be characterized herein, for purposes of description, as an "even" cycle. Following the occurrence of the reset signal on conductor 278 and an appropriate predetermined delay time for purposes of allowing all circuitry to reinitialize, the S/H circuit 240 and associated A/D conversion circuit 250 accumulate sample signals from the intensity signal S and apply digital information signals representative of the analog sample signals to the sample register 254, while corresponding clock information signals are applied to the clock register 262. When the digital information signals surrounding the first zero-crossing are accumulated, the signals from registers 254 and 262 are applied to the CPU 268 by means of conductors 272 and 270, respectively.

Following the transmission of signal samples around the first zero-crossing to the CPU 268, the CPU 268 operates to determine a modulator drive voltage corresponding to the first zero-crossing of intensity signal S. When the sampled magnitude of intensity signal S is again within the sampled region depicted in FIG. 9, signal samples are again transmitted to the register 254, with corresponding clock signals transmitted to register 262. When all sample signals have been received by the register 254 within the threshold magnitudes corresponding to the sampled region, the samples are again transmitted to the CPU 268. CPU 268 again operates to determine the modulator drive voltage corresponding to the second zero-crossing of intensity signal S. Following the determination of the first and second zero-crossing locations, the determination of the modulator drive voltage corresponding to the peak offset is accomplished by averaging the modulator voltages corresponding to the first and second zero-crossings as previously described. It should be noted from the timing sequence diagram in FIG. 11 that the functions of zero-crossing and peak offset determination performed within CPU 268 can occur simultaneously with sampling and A/D conversion of intensity signal S. Accordingly, the sampling and digital conversion functions of the rate sensor 200 are independent of zero-crossing and peak offset determination functions implemented by means of the CPU 268.

When the phase modulation circuit 224 has completed the "even" cycle phase shift pattern, a reset signal is again applied from CPU 268 by means of conductor 278 to the counter 274. The counter 274 is responsive to this signal to initiate a new phase modulator pattern cycle described as the "odd" phase modulator pattern cycle. During the cycle, third and fourth zero-crossing locations and modulator drive voltages corresponding thereto are determined in a manner similar to the previously described determination of the first and second zero-crossing locations. A second peak offset determination is then made which corresponds to the average values of the modulator drive voltages corresponding to the third and fourth zero-crossings.

The times of occurrence of the two peak offsets determined by utilization of the first/second and third/fourth zero-crossing locations will differ and are utilized by CPU 268 as an input to a conventional optimal estimation sequence to provide a recursive estimate of the modulator drive voltage corresponding to the peak location and, hence, the Sagnac phase shift. The CPU 268 can then determine both an incremental angle and an angular rate of rotation by means of the known parameters of the various components of rate sensor 200, and can generate signals on conductors 296 and 298, respectively, corresponding thereto.

One problem particularly associated with optical rate sensors employed in aircraft and missile applications relates to the utilization of zero-crossing locations to determine a peak offset corresponding to the Sagnac-induced phase shift. Specifically, it is preferable that two and only two zero-crossings occur within any given scan of the phase modulator circuit 224. If more than two zero-crossing locations are present, extensive circuitry would be required to determine these crossings occurring immediately before and immediately after the peak of intensity signal S corresponding to the modulator phase shift equivalent to the Sagnac effect phase shift. However, an output rate for determination of the angular rotation rate is desirable in the range of 400 Hz. Accordingly, the phase modulation circuit 294 is required to complete two phase shift scans within 2500 microseconds. For an angular rotation rate which can have a maximum of 1000° per second and for an interval of 45° between zero-crossings, the phase modulator circuit 224 must be capable of scanning between $\pm 4\pi$ radians if the central peak is to be properly tracked and detected utilizing the zero-crossing locations of the intensity signal S. However, the capability of scanning across $8\pi$ radians in less than 1,250 microseconds with a 12-bit D/A conversion level for the modulator drive voltage pattern would allocate only a 0.035 microseconds maximum time per drive voltage state. Such a state time is entirely too small for utilization of the state of the art electronic components.

To overcome this problem, the nonreciprocal phase modulation scan provided by the modulator circuit 224 has an $8\pi$ radians length, but is divided into multiple overlapping "scanning windows" each having a length of $2\pi$ radians. By utilization of a $2\pi$ scanning window length, two and only two zero-crossings are present in any given scan.

To achieve the effect of an $8\pi$ scan length with scanning windows of $2\pi$ radians, the CPU 268 comprises scan initialization logic capable of determining an appropriate scanning window in accordance with the relative positions of the detected peak offsets within prior modulator scans. Since the modulator scan has an effective length of $8\pi$ radians, an actual $2\pi$ modulator scan utilizes only $\frac{1}{4}$ of the possible modulator voltage level states as defined by the digital information signals stored in the phase state register 282. Following a particular modulator scan, the appropriate logic circuitry within CPU 268 can determine if the current phase modulator scan window should be altered. If the central peak within the current scanning window is not substantially centered within the scan cycle, CPU 268 transmits signals on conductor 278 as depicted in FIG. 6 which cause the counter 274 to address an altered set of information storage locations within the register 282. This altered set of storage locations will then correspond to the new scanning window by applying a differing set of digital voltage signals to the D/A converter 284. Accordingly, the phase pattern produced by the phase modulation circuit 224 can be altered in an appropriate manner to ensure that only two zero-crossing locations are detected within a modulator scan. It is apparent from this discussion that scanning windows of lengths other than $2\pi$ radians can also be utilized, and the scanning windows can overlap and ensure no loss of tracking of the zero-crossing locations.

Referring to the sequence diagram of FIG. 10, the controlling sequence is designated therein as "EXEC" and provides transfer of control of the CPU 268 to background tasks when zero-crossing samples are being received by external circuitry. When zero-crossing A/D sampling is completed, the EXEC sequence can be interrupted and sequential control transferred from the background tasks to the appropriate sequence. As depicted in the timing diagram of FIG. 11, the sequence providing zero-crossing determination is performed after each zero-crossing. Determination of peak location of the intensity signal is performed only after every second scan, i.e. after four zero-crossing detections. Optimal estimation of the Sagnac phase shift is also performed only after every second scan, as is the conversion of the optimally-estimated intensity signal peak offset to an angular acceleration rate signal and an incremental angle signal. Initiation of a new scan for phase modulator 224 must occur after every scan. A recovery sequence for bad zero-crossing location signals can be performed if necessary. When processing for a particular sequence has been completed, sequential control can be returned to the current background task until the next occurrence of an interrupt which will occur at the completion of the next zero-crossing A/D conversion cycle.

Exemplary embodiments of the particular sequences shown in FIG. 10 will now be described. The function of the zero-crossing detection sequence is to determine where zero-crossing locations exist in terms of equivalent differential phase modulator voltage. As previously described, the voltages corresponding to the two zero-crossing locations yield an average value corresponding to the shift of the peak with respect to its location at a zero rate of angular location. These detections can be accomplished by means of conventional methods such as "curve fitting" utilizing the principles of "linear least squares" as commonly known in the art.

The basis for deriving zero-crossing locations using linear least squares techniques is the assumption that the sinusoidal waveform of signal S (after removing its average value) near zero-crossing locations can be approximated by the following linear equation:

$$S(V_z) = a + bV_z \qquad \text{(Equation 5)}$$

where $S(V_z)$ is the magnitude of the intensity signal corresponding to a modulator drive voltage $V_z$, a is the $V_z = 0$ value of the linear function, and b is the slope of the linear function through the zero-crossing. In accordance with Equation 5, the modulator drive voltage corresponding to the zero-crossing location is:

$$V_x(S=O) = -a/b \quad \text{(Equation 6)}$$

Conventional linear least squares methods can be utilized to estimate a and b and, accordingly, the modulator drive voltage corresponding to a zero-crossing location. In a physically realized reduction to practice of the invention, values of a and b for a functional relationship of signal samples of intensity signal S and corresponding time could be determined by measurements of sampled pairs of intensity signal S and time (derived from signals generated by master clock 246). For example, with the illustrative embodiment depicted in FIG. 6, a predetermined member of such signal pairs would be stored in clock register 262 and sample register 254. The gain of the transconductance amplifier 232 would be adjusted so that register words were caused to overflow for expected intensity signal samples outside of the sampled region. Accordingly, such signal samples are not included in the derivation of the zero-crossing location.

As previously described, the actual techniques for deriving the parameters of Equations 5 and 6 are commonly-known in the art. For example, such techniques are described in *Advanced Engineering Mathematics*, Wylie, Jr. (McGraw Hill 1966). When the zero-crossing "times" have been determined from the received signal pairs, they can be converted to corresponding differential modulator voltages. The modulator voltage corresponding to the central peak offset (and corresponding modulator phase shift) is then determined as an average of the voltages corresponding to zero-crossing locations. This peak offset voltage is independent of bias shifts in the intensity signal S; provided, of course, that such bias shifts are slow with respect to the modulator scan time.

It should be noted, however, that certain random errors can exist within determinations of the peak offset when using conventional curve fitting techniques, such as "least squares" determinations. Such errors can be caused, for example, by A/D quantization noise, laser diode intensity noise, shot noise within the photodiode 228, Johnson noise within the analog electronics and D/A uncertainty within the basic sampled voltage steps from the intensity signal S. To at least partially overcome these and other random errors, an optimal estimation sequence can be utilized within CPU 268 to better determine the valley offset voltage. Since the statistical parameters of the modulator voltage (mean, type of disturbance noise, etc.) can be readily determined, conventional sequential estimation can be utilized.

For example, a sequential Kalman filter can provide optimal estimates of the true value of the modulator drive voltage corresponding to the central peak of the intensity signal S, even with substantially noisy measurements of this peak location. Processes related to Kalman filters and apparatus thereof are well-known in the art and, for example, are described in such texts as *Probability, Random Variables, and Stochastic Processes*, Papoulis (McGraw-Hill 1965), and *Estimation Theory with Application to Communications and Control*, Sage & Melsa (McGraw-Hill, 1971).

Basically, a Kalman filter can be used to estimate, on the basis of noisy output measurements, the value of an inaccessible state variable of a system driven by stochastic input disturbances. In an optimal rate sensor in accordance with the Carrington et al invention, the Kalman filter estimation process can be used to optimally estimate the true value of the central peak modulator voltage by linearly combining past and present measurements of this modulator voltage such that the mean square errors between the true and expected values thereof are minimized. The utilization of such an optimal estimation technique is advantageous over simple averaging processes, in that it takes into account not only additive measurement noise on the central peak modulator voltage, but also the statistics of the vehicle dynamics.

Using terminology well-known in the art of statistical estimation, a state model is first derived which represents the true value of the central peak modulator voltage as a function of sensor rate correlation time, previous values of central peak voltage, and vehicle dynamics. The measured central peak voltage is represented as a function of both the true voltage value and a noise component representing residual noise from the previously-described zero-crossing/central valley determination. For each discrete Kalman filter "cycle," corresponding to a predetermined filter update rate, an "a priori" mean square estimation error is computed as a function of rate correlation time, previous mean square estimation error computations, and the statistical effects of the previously-described residual noise. The Kalman current measurement "gain" is then computed therefrom which, in turn, is utilized with previous computations to derive an optimal estimate of the central peak modulator voltage in accordance with functional processes well-known in the art.

During the Kalman filter processing, it is inherently desired to derive what is conventionally-known as the "innovations" sequence from the voltage estimates and measurements. This sequence is used for characterizing filter performance by the comparison of the square of the innovation value with the mean square estimation error which itself is derived as part of the filter computation. If the estimation mean square error is repeatedly larger than the innovations sequence value over a number of Kalman cycles, the Kalman gain may be too small to follow high rates of vehicle angle acceleration. In such instances, the filtering process parameters can be reinitialized or other appropriate strategy can be followed.

In providing a sequence for generating output signals representative of angular rotation, experience with missile guidance systems as known by those skilled in the art shows that angular rotation frequencies of a typical missile could extend up to 150 Hz. The high frequencies often result from high order "body bending" modes. In accordance with conventional Shannon sampling theory, the output data rate must be at least twice as large as the aforementioned highest frequency. If a 400 Hz update is utilized for determination of angular rate within the CPU 268, a random drift can be achieved of approximately 1° per hour.

The modulator scan initiation sequence can be designed to require completion of two scans in 2500 microseconds. For example, with a ±1000° per second maximum rate and a 22.5° half angle zero-crossing interval, the phase modulator 224 must be capable of scanning ±4p radians if the central peak is to be tracked properly using the zero-crossing circuitry previously discussed. Multiple overlapping scanning windows, each having a length of $2\pi$ radians, can be utilized to guarantee that two and only two zero-crossings are detected in any given scan. The sequence within CPU 268 must determine the start and finish of the D/A converter 284 read-out sequence and, given the optimal estimation of angular rate, must also decide whether to stay in a current modular scan window or to decrease or increase one position.

In addition to the foregoing, it is also possible to include a "recovery" sequence within the sequential functions of the CPU 268. The purpose of the recovery sequence is to provide capability of handling "hard" measurement errors, for example, due to loss of one of the two required zero-crossings in a scan, or otherwise due to the selection of a scan window which does not properly contain the central signal peak and its two surrounding zero-crossings. The recovery logic sequence can be readily determined by one skilled in the art of signal processing design having knowledge of systems such as the optical rate sensor 200.

In summary, the signal processing functions of the known optical rate sensor 200 comprise the sampling of the intensity signal at various times when the functional relationship between the intensity signal and the modulator phase (and modulator voltage) is substantially linear With the use of a least squares method for data smoothing, a central peak of this functional relationship is computed. The phase shift caused by modulation which corresponds to the central intensity signal peak also corresponds to the Sagnac phase shift resulting from the angular acceleration of the fiber ring.

It should be noted that the previously described optical rate sensor 200 is substantially an "open-loop" system with respect to operation of the phase modulator 224. That is, the phase modulator voltage applied as an input to modulator 224 is substantially independent from the measured central peak offset or any other parameters determined on a real-time basis from the intensity signal S.

To some extent, however, the foregoing statement regarding open-loop operation must be modified. In the optical rate sensor 200 as disclosed in Carrington et al, optimal estimation techniques are utilized to better determine the true value of the modulator drive voltage corresponding to the central peak of intensity signal S. Given the estimate (through use of a Kalman filter) of modulator voltage and, accordingly, the angular rate $G_I$, the particular scanning window is determined so as to better insure that two and only two zero-crossings are present in a given scan. That is, the modulator scanning window is shifted as a function of rate so as to "track" the movement of the central intensity peak as the input rate changes.

In view of the foregoing, there is some "feedback" associated with the optical rate sensor 200 with respect to phase modulator drive voltage. However, this feedback arrangement is solely directed to the function of modifying the phase modulator scanning window for purposes of maintaining only two zero-crossing locations within any given scan.

It should also be noted that information regarding the intensity signal is ignored in certain time slots, i.e. those time slots where the intensity signal is above or below certain predetermined thresholds and the functional relationship between the intensity signal and the modulator voltage is substantially non-linear. In accordance with conventional communication theory, ignoring these portions of the intensity signal results in a relative reduction of the signal to noise ratio. When the modulator voltage pattern results in a substantially sinusoidal functional relationship between the intensity signal and modulator voltage, the S/N ratio reduction will be on the order of 3 to 6 db. This reduction will necessarily result in a loss of Sagnac phase measurement accuracy.

Still further, it can be noted that the optical rate sensor 200, when used in certain applications, will be subjected to relatively low frequency applied inertial rates, e.g. 200 Hz or less. If this low inertial rate is compared with the sampling rate and the frequency of the phase modulator output, it can be seen that the intensity signal can possibly be "aliased" to D/C. That is, because there is a finite period between scanning windows, it is feasible that a low frequency angular rate could actually be erroneously measured as a constant inertial rate input.

Finally, it can also be noted that although the measurement of the inertial rate input using the foregoing processes associated with optical rate sensor 200 is substantially independent of source wavelength, the measurement is dependent on phase modulator temperature. To illustrate, the modulator phase shift $P_B$ is a function of the modulator input voltage $V_M$ in accordance with the following:

$$P_B = (K_d/L)V_M \qquad \text{(Equation 7)}$$

where $K_d$ is a constant associated with the physical implementation of the modulator, and $L_o$ is the laser source wavelength. The constant $K_d$ is, however, dependent upon the temperature of the phase modulator.

Equation 1, functionally relating the Sagnac phase shift to the inertial input rate can be rewritten as follows:

$$G_I = K_p L_o P_s \qquad \text{(Equation 8)}$$

where $K_p$ is a physical parameter associated with the configuration of the fiber ring, e.g. ring radius, number of turns, etc. If the phase modulation $P_B$ is now set equal to the Sagnac phase shift $P_s$, which occurs at the central peak offset of the intensity signal, then the following functional relationship exists between the modulator voltage and the inertial input rate:

$$G_I = [(L_o K_p K_d)/L_o]V_M \qquad \text{(Equation 9)}$$

It can be noted from Equation 9 that the source wavelength terms "cancel out," with the result being independent of laser wavelength.

In addition, it can be noted from Equation 9 that the change in modulation as a function of phase modulator voltage can be calibrated by "swinging" $V_M$ sufficiently far so as to cause $P_B$ to cover a range of 2p. From Equation 7, the change in phase modulation as a function of modulator voltage can be written as follows:

$$\Delta P_B/\Delta V_M = (K_d/L_o) \qquad \text{(Equation 10)}$$

In accordance with the foregoing, it can be seen that if deviations in source wavelength could be modeled or otherwise accurately measured, Equation 10 could be utilized to improve the accuracy of Equation 9. However, if the source wavelength cannot be accurately modeled or measured, the actual accuracy of Equation 9 is dependent upon the ability to accurately estimate or otherwise control $K_d$ over temperature. That is, the calibration provided by swinging $V_M$ sufficiently far so as to cause $P_B$ to cover a range of 2p can only provide calibration of the quantity $(K_d/L_o)$.

SUMMARY OF THE INVENTION

In accordance with the invention, an optical rate sensor has a passive ring Sagnac interferometer for detecting a relative phase shift between counter-propogating optical or electro-magnetic waves indicative of the rate of angular rotation of the passive ring, wherein the rotation rate can be measured with high resolution and sensitivity by application of a non-reciprocal phase shift between the counter-propogating waves and a closed loop configuration whereby the phase modulation is functionally related to measurements of the rate of angular rotation. The passive ring Sagnac interferometer of the rate sensor includes a pair of counter-propogating optical waves transmitted in opposite directions through a ring path and emerge therefrom with a relative Sagnac phase shift indicative of the rate of angular rotation. The interferometer comprises a combining means for recombining the counter-propogating waves wherein a resultant low-order fringe pattern is representative of the relative phases of the counter-propogating waves.

The rate sensor further comprises circuit means connected to the interferometer for generating an intensity signal indicative of the resultant low order fringe pattern, and measuring means connected to the circuit means for measuring the intensity signal and generating an output signal corresponding to the angular rotation rate. Phase modulation means are connected to the interferometer for externally applying to the counter-propogating waves a non-reciprocal phase shift. In accordance with the invention, the optical rate sensor also comprises means to apply to the phase modulation means a control signal which is a function of the measured value of the rate of angular rotation. Modulator means are connected to the phase modulation means and to the measuring means to modulate the control signal so that the intensity signal is varied between values of substantially maximum change with respect to given changes in the non-reciprocal phase shift resulting from the phase modulation means.

In accordance with one aspect of the invention, estimates of the true value of phase error signal are obtained by combining past and present value measurements derived from the intensity signal. Advantageously, this technique takes into account additive measurement noise of the phase error signal as well as statistics of vehicle dynamics to provide a more accurate phase error signal.

In accordance with another aspect of the invention, the output of the intensity signal detector is sampled and is applied to the circuitry that measures the intensity signal and generates an output signal corresponding to angular rotation, only during certain time periods while blanking the signal during other time periods. In one particular embodiment of the invention, the period of sampling of the detector output signal is defined as a function of the period of time T required by the liquid waves to traverse the ring path. Advantageously, such sampling of the intensity signal reduces effects of extraneous optical and electrical signals, which may otherwise affect the control signal applied to the phase modulation means, and frees-up the control circuitry to perform other tasks. In one particular embodiment of the invention, the circuitry connected to the detector output comprises a switch which is responsive to timing pulses to connect the detector output signal to the control circuitry at a period rate which is a function of 1/nT, and wherein n is an integer.

In accordance with another aspect of the invention, the control circuitry includes a digital signal processor and is responsive to the detector output signal to generate a square wave phase error control signal indicative of a detected phase error. Advantageously, the square wave signal provides well-defined transitions which facilitate coordination of the phase error signal with other signals generated in the system. In one particular embodiment of the invention, the sampling of the intensity signal is synchronized with the phase error square wave. Particularly, the intensity signal is sampled by means of a square wave which is synchronized to the phase error square wave, and the leading edge of the sampling pulse is delayed from the leading edge of the phase error control signal by a predetermined delay time. Advantageously, this delay time provides for more accurate reading of the intensity signal since it is sampled during a steady state portion of the phase error square wave, and perturbations in the signal which might occur from the transients associated with the leading edge of the square wave phase error signal are eliminated.

In accordance with a further aspect of the invention, a dither signal in the form of a square wave phase shift signal is combined with the square wave phase error signal to apply to the phase modulator a phase shift which is equivalent to the Sagnac phase shift and a further phase shift to shift the phase of the intensity signal to a more linear portion of the optical output signal.

BRIEF DESCRIPTION OF DRAWINGS

The background art pertaining to the invention has been previously described with reference to the drawings in which.

Figure 12:
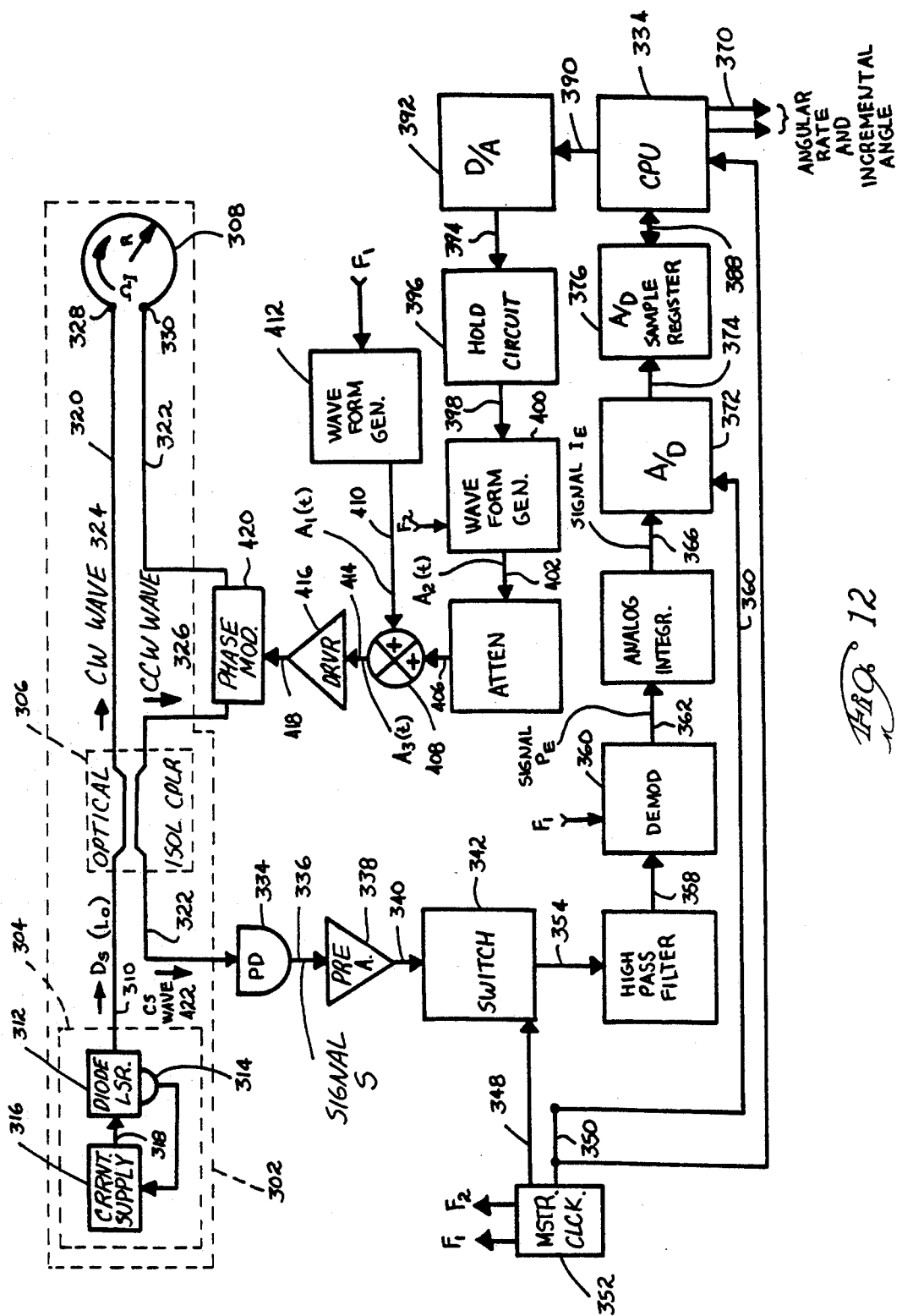
Figure 13:
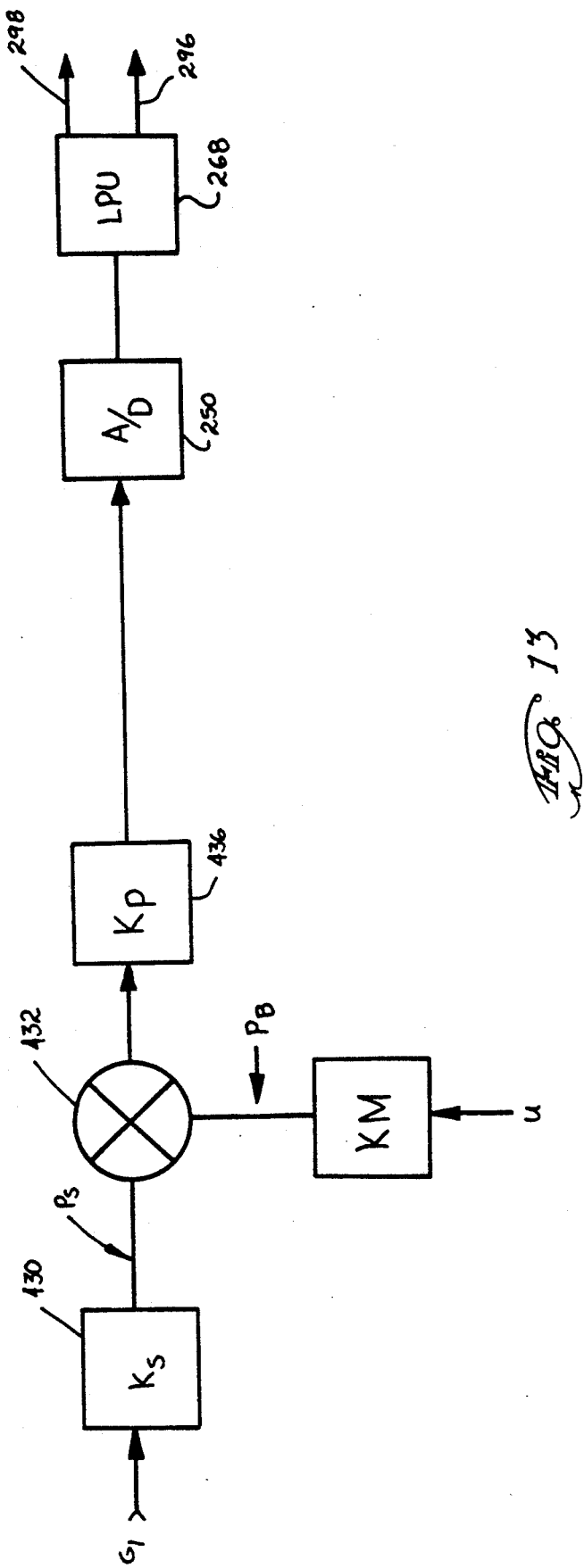
Figure 14:
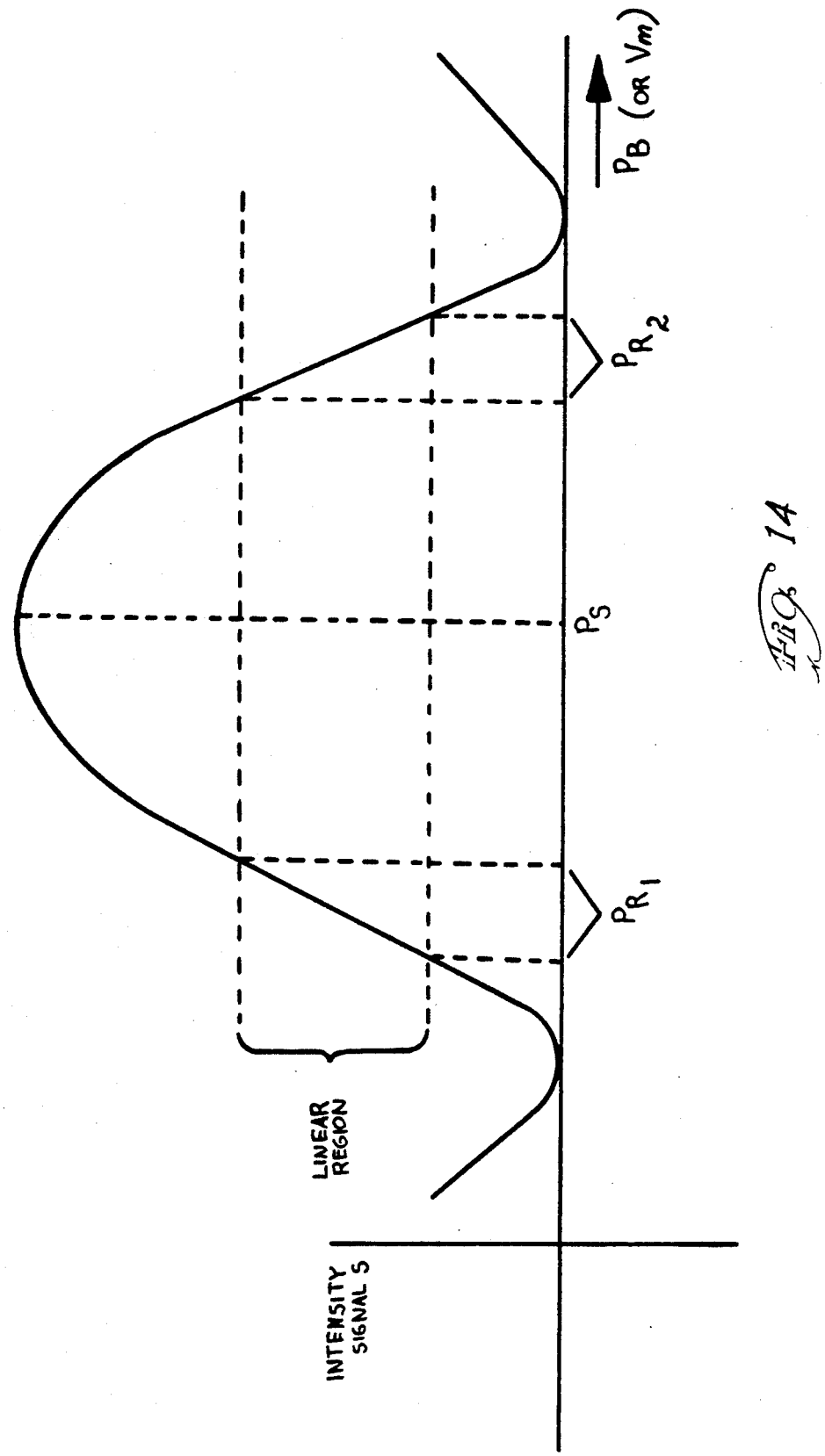
Figure 15:
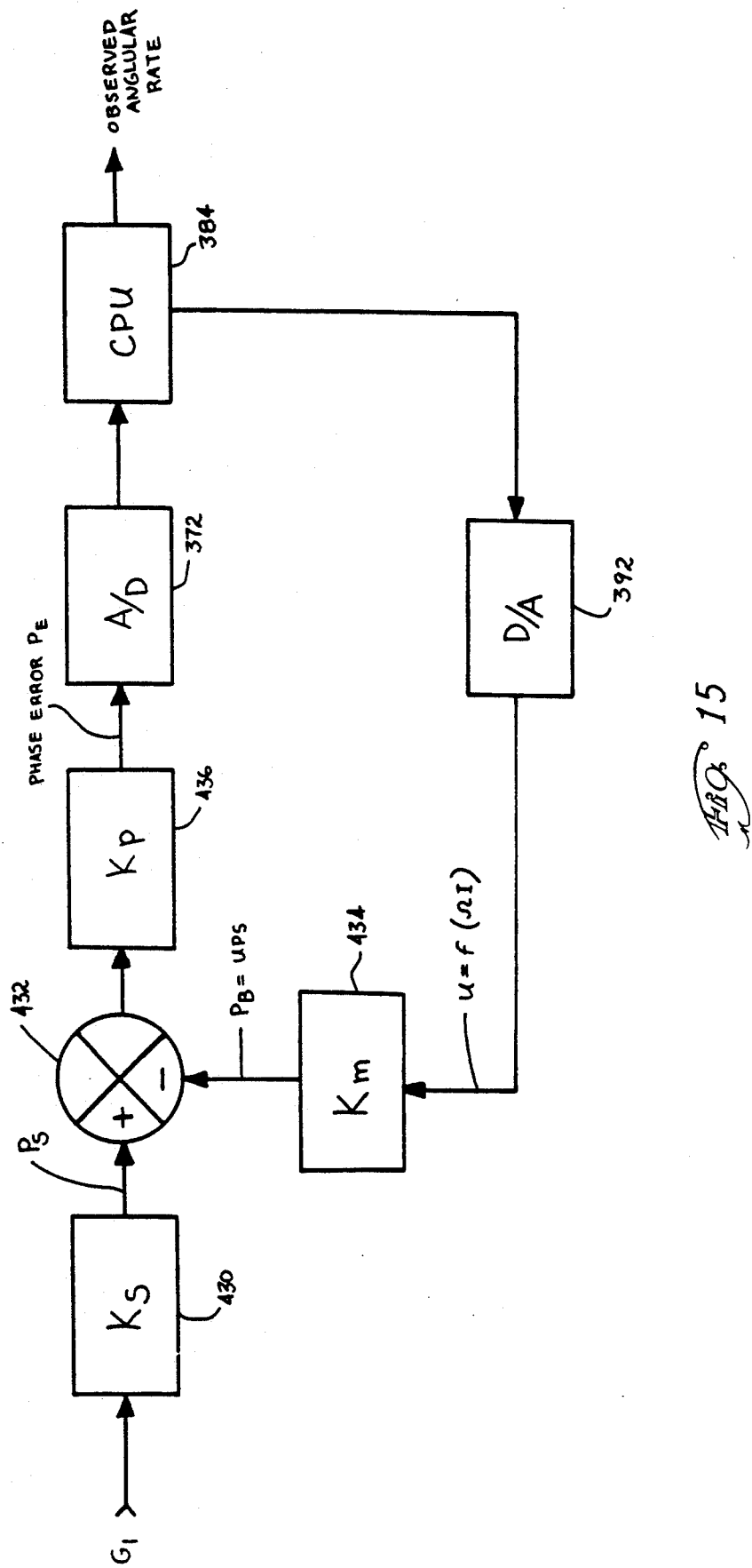
Figure 16:
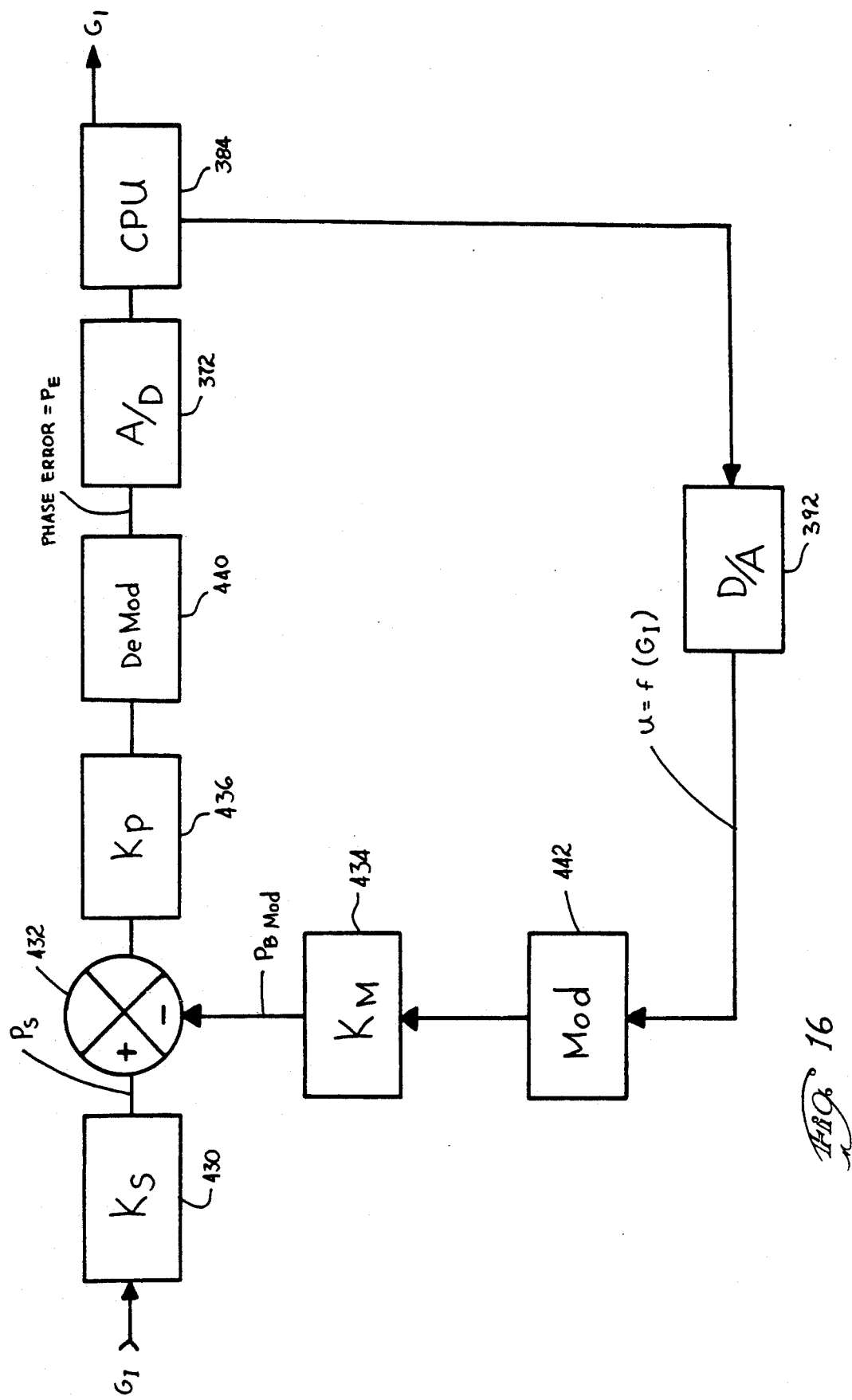
Figure 17:
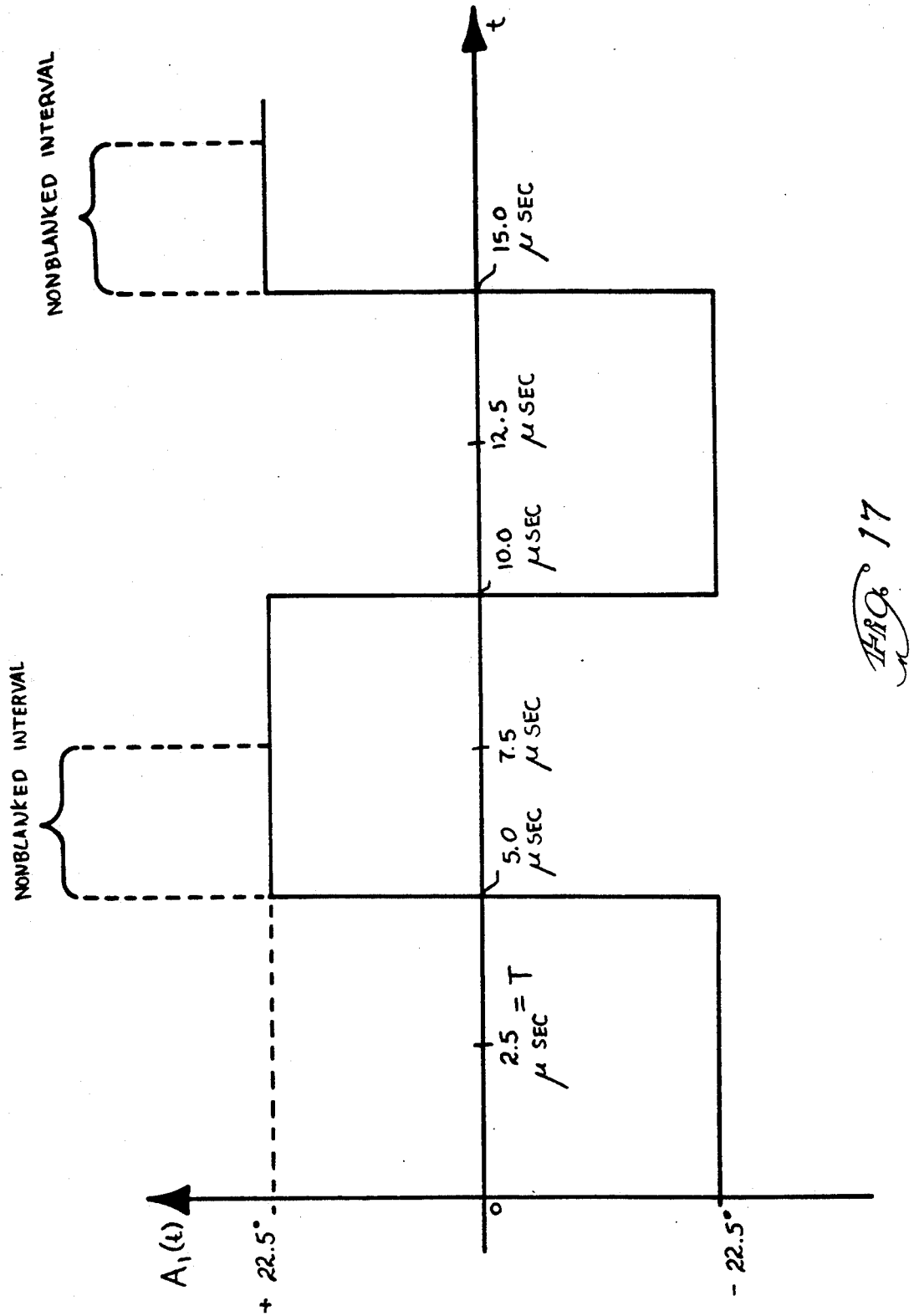
Figure 18:
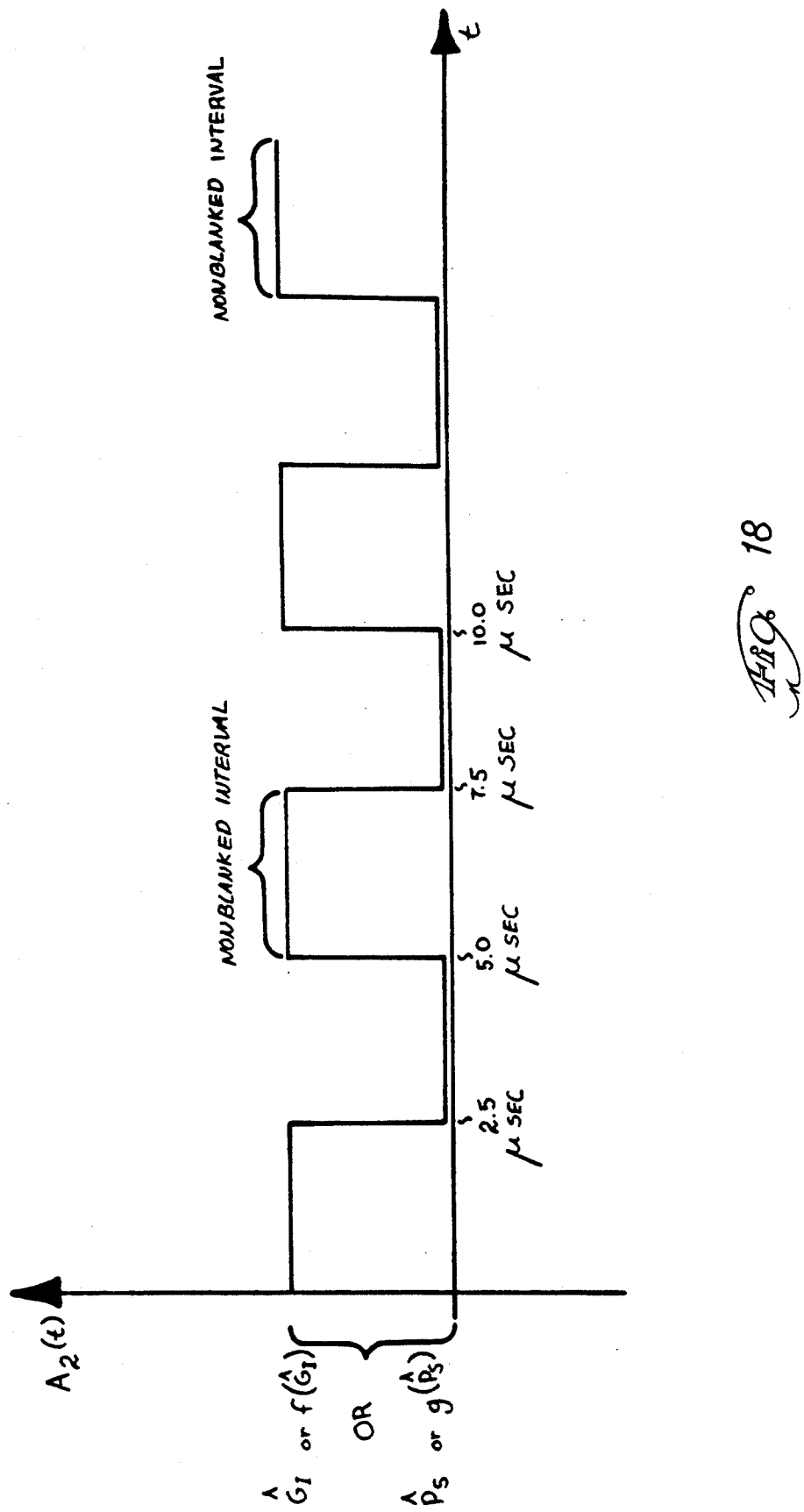
Figure 19:
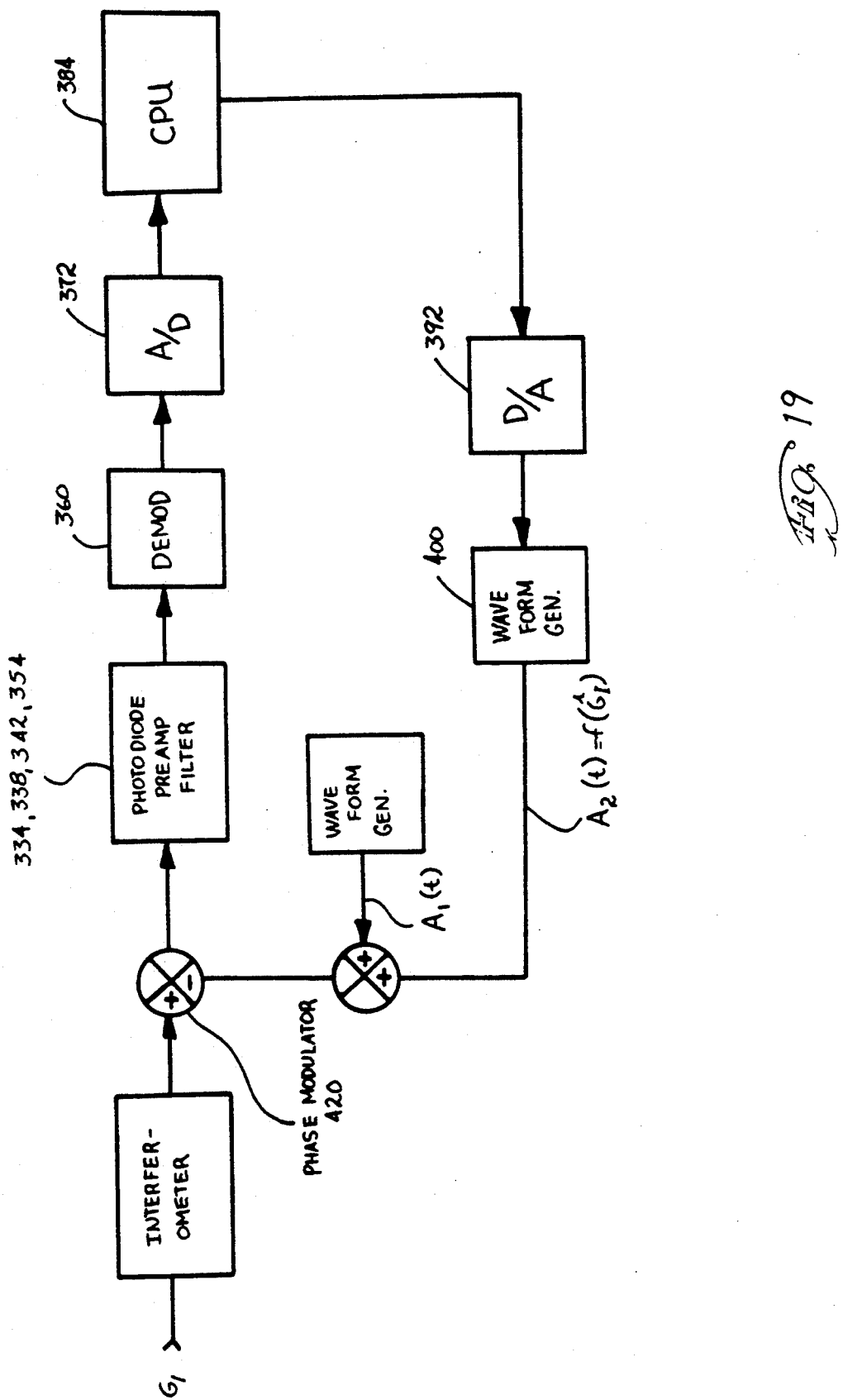
Figure 20:
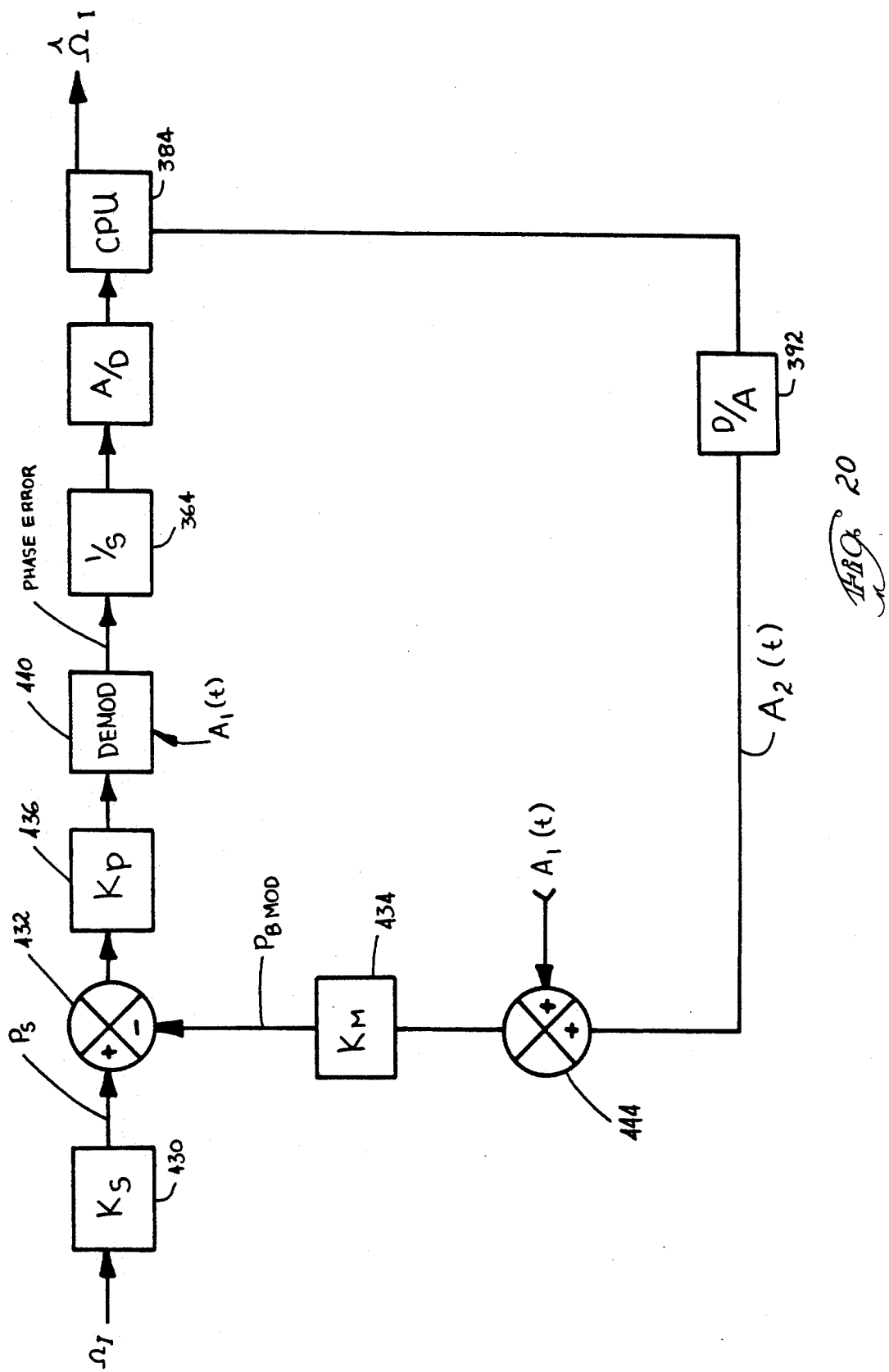
Figure 21:
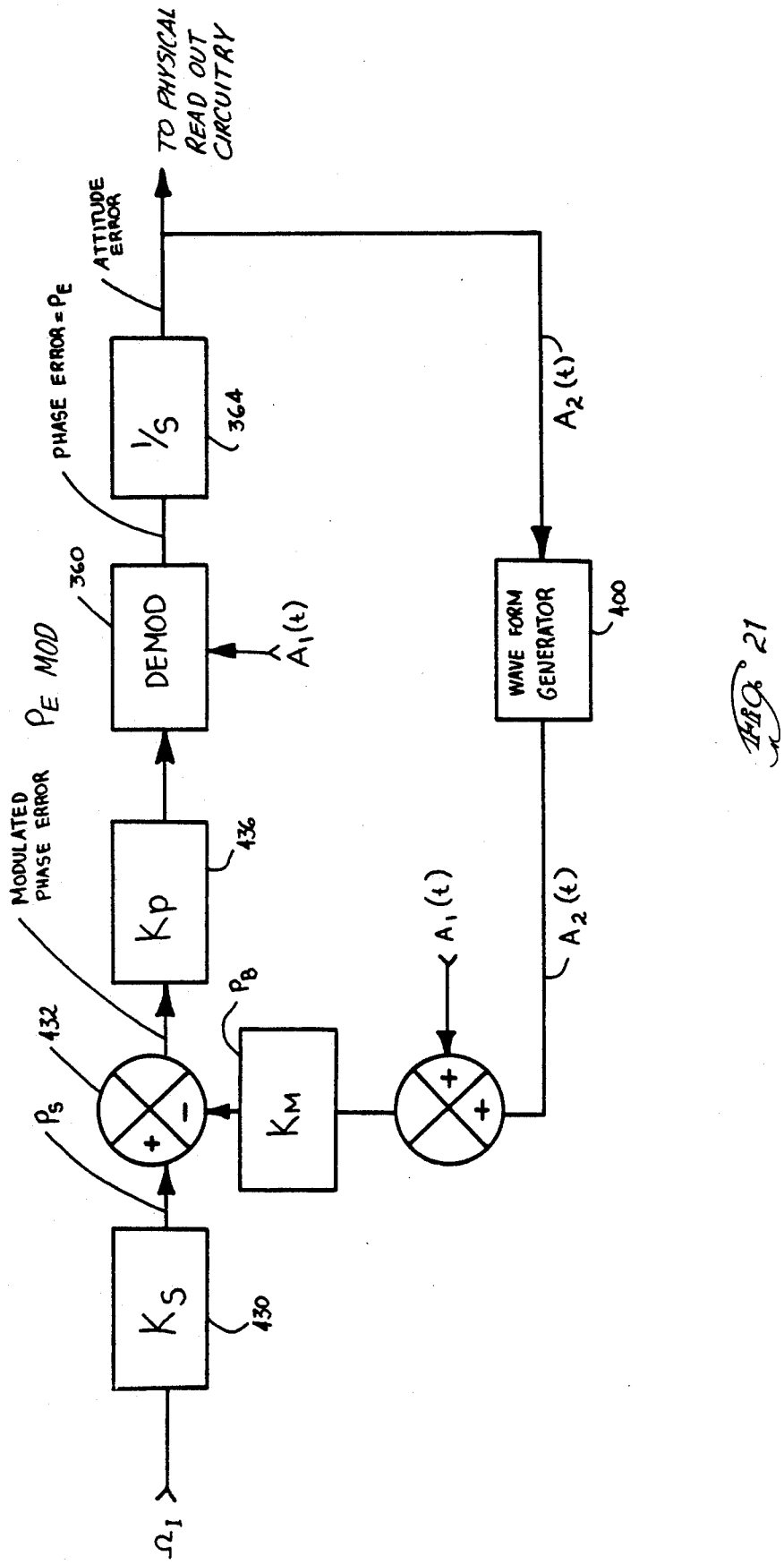
Figure 22:
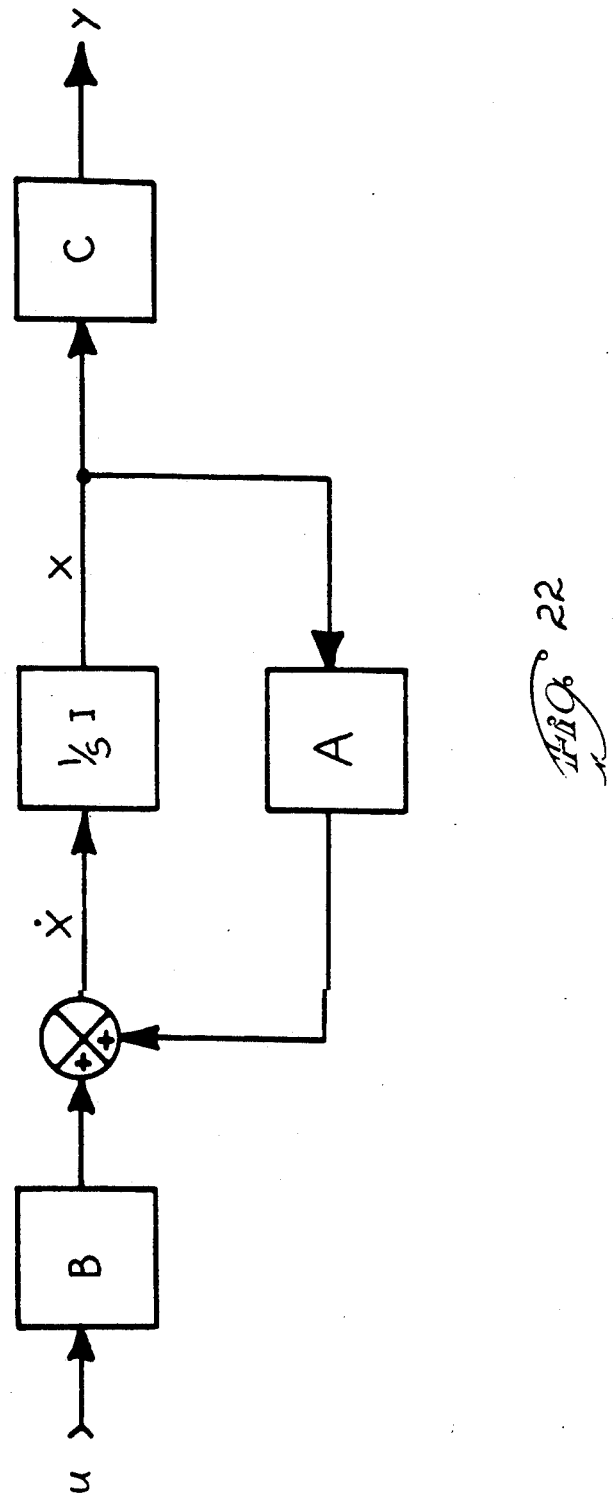
Figure 23:
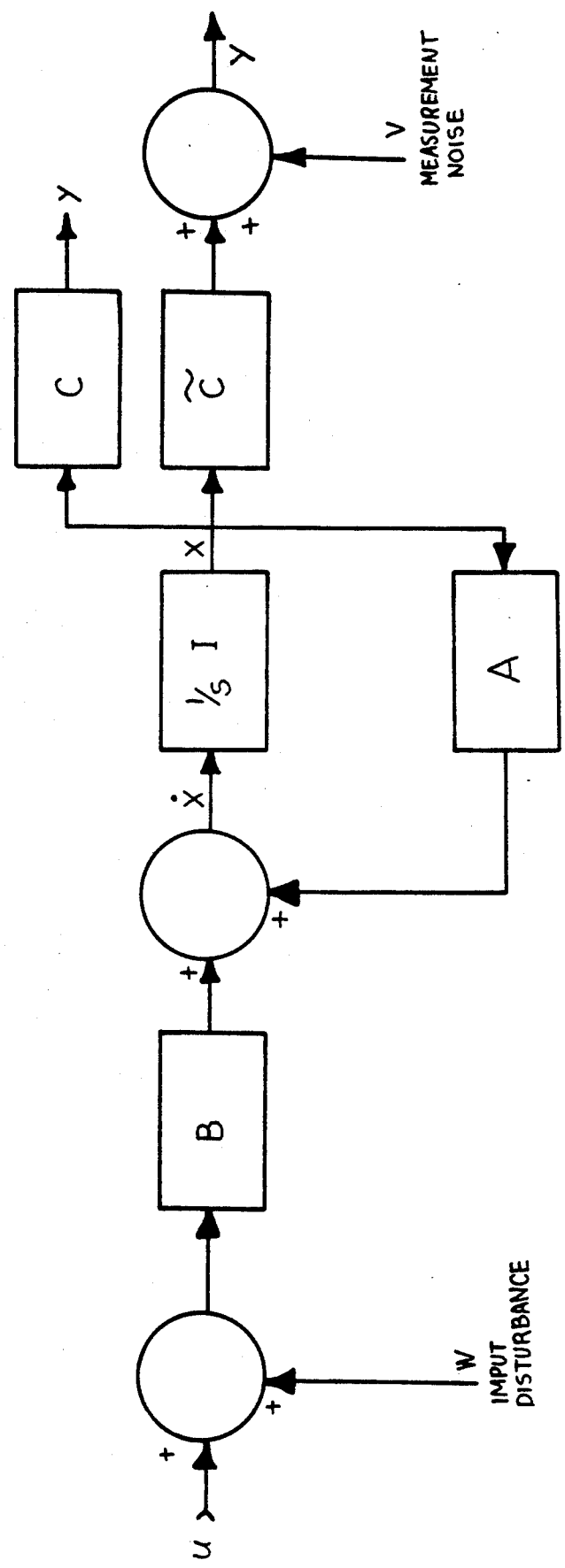
Figure 24:
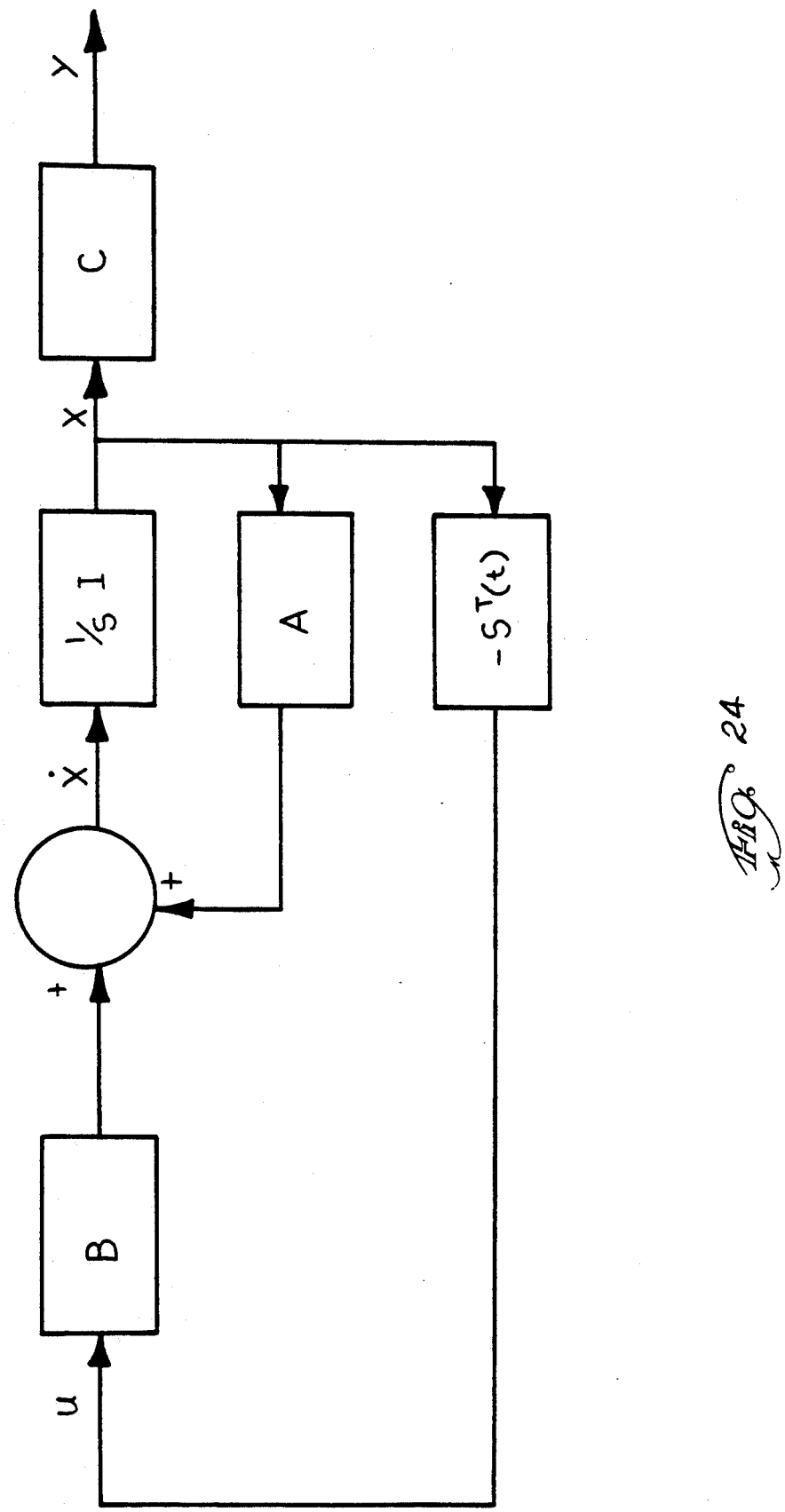
Figure 25:
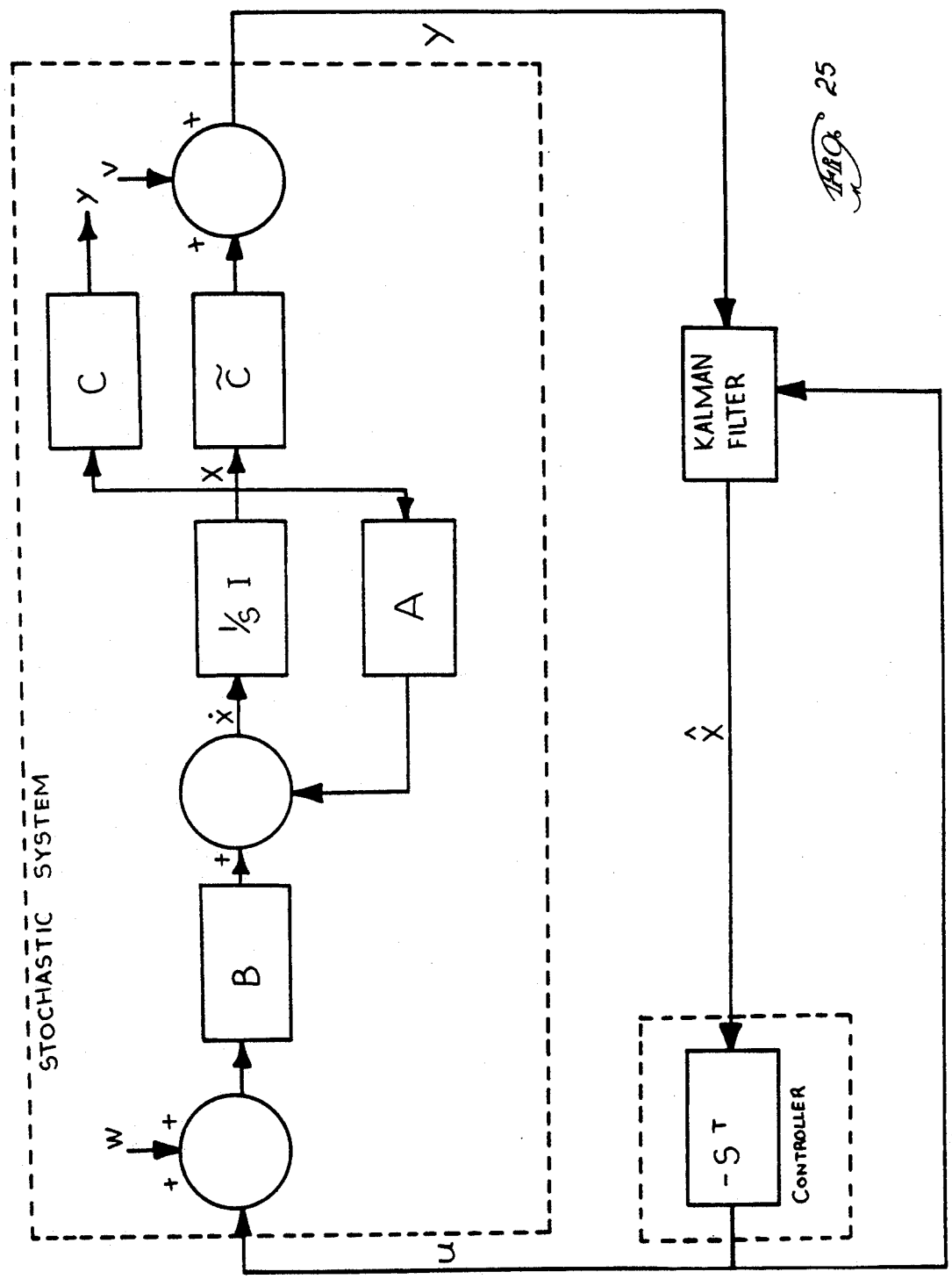
Figure 26:
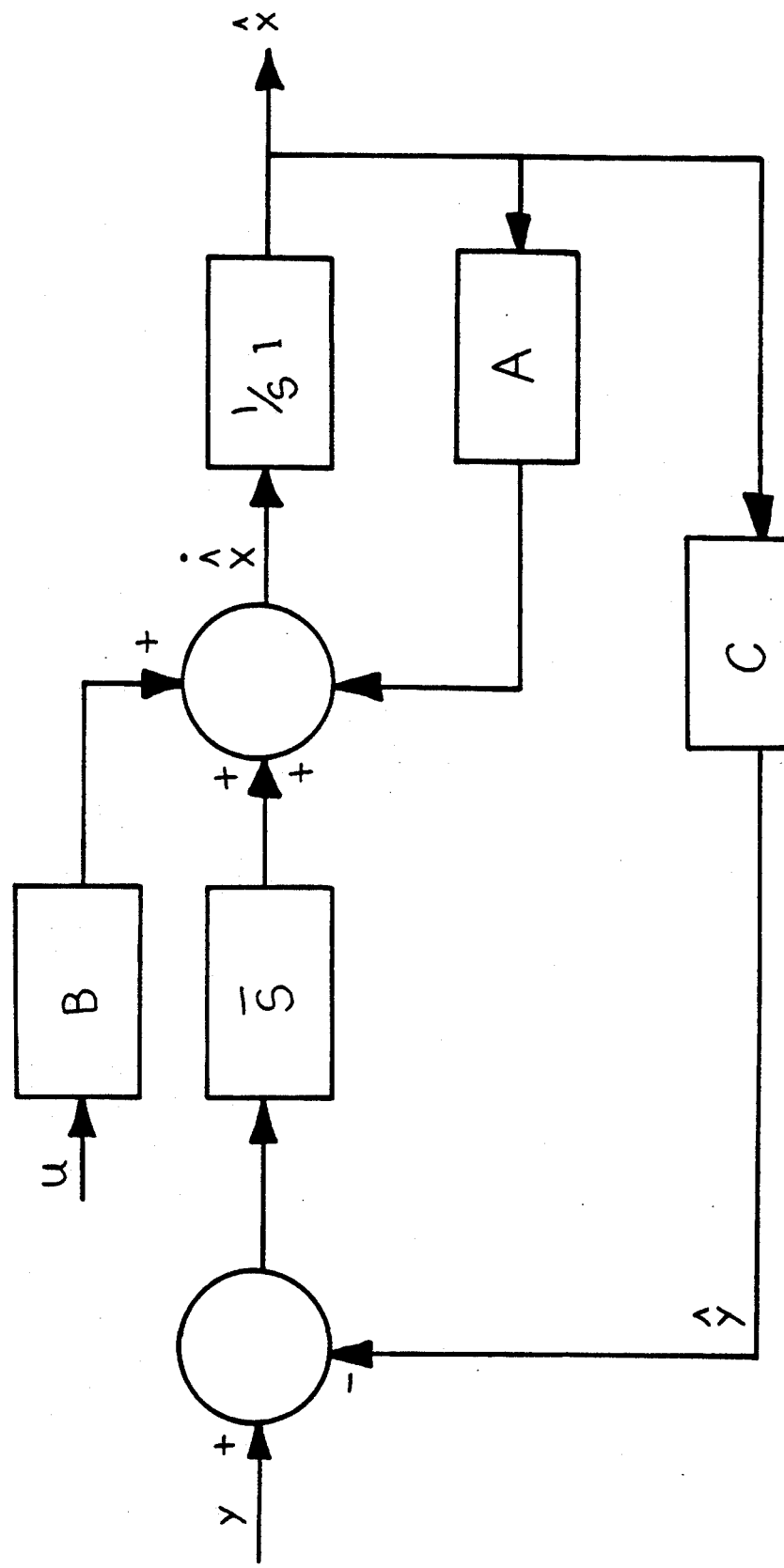
Figure 27:
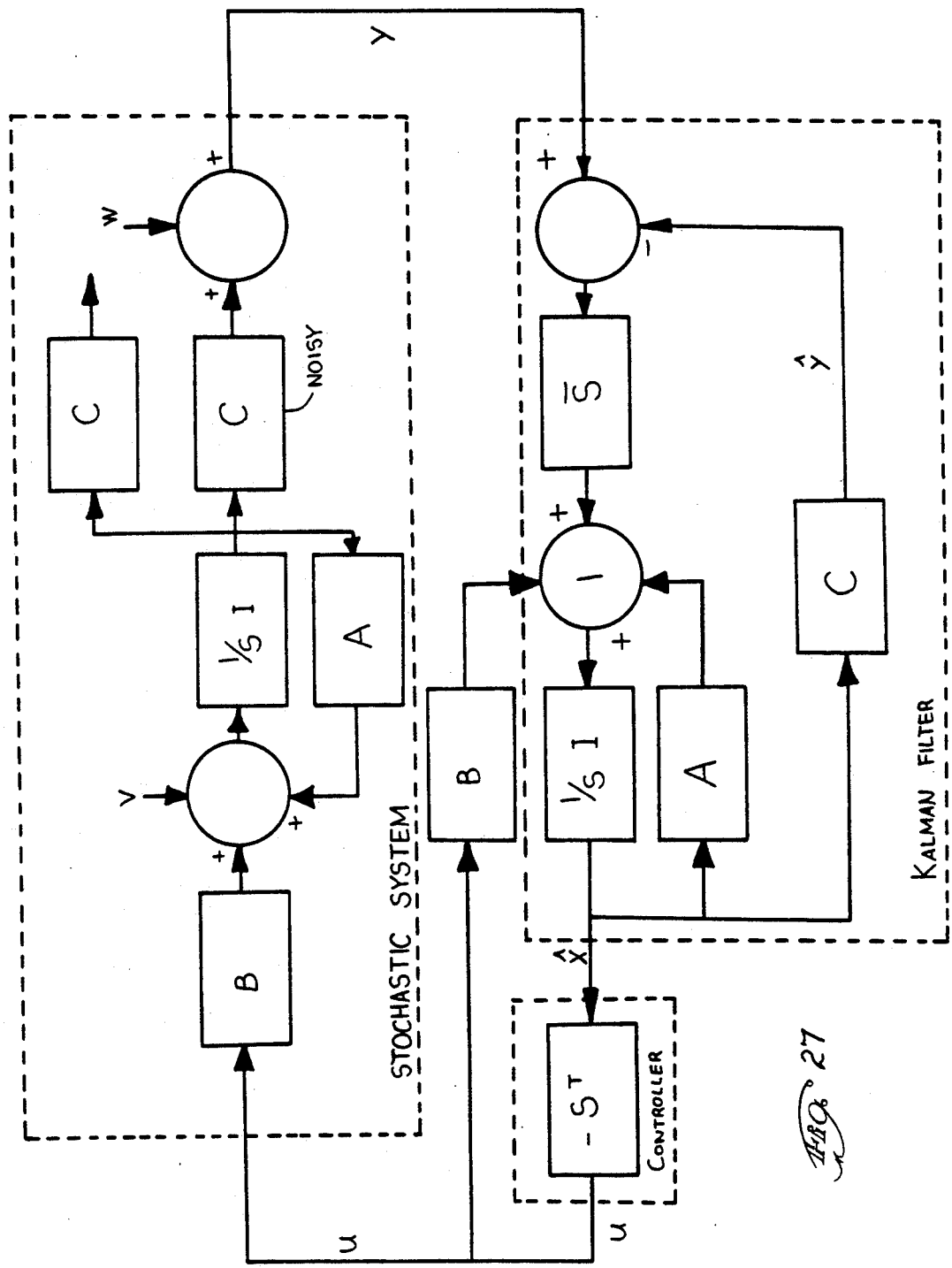
Figure 28:
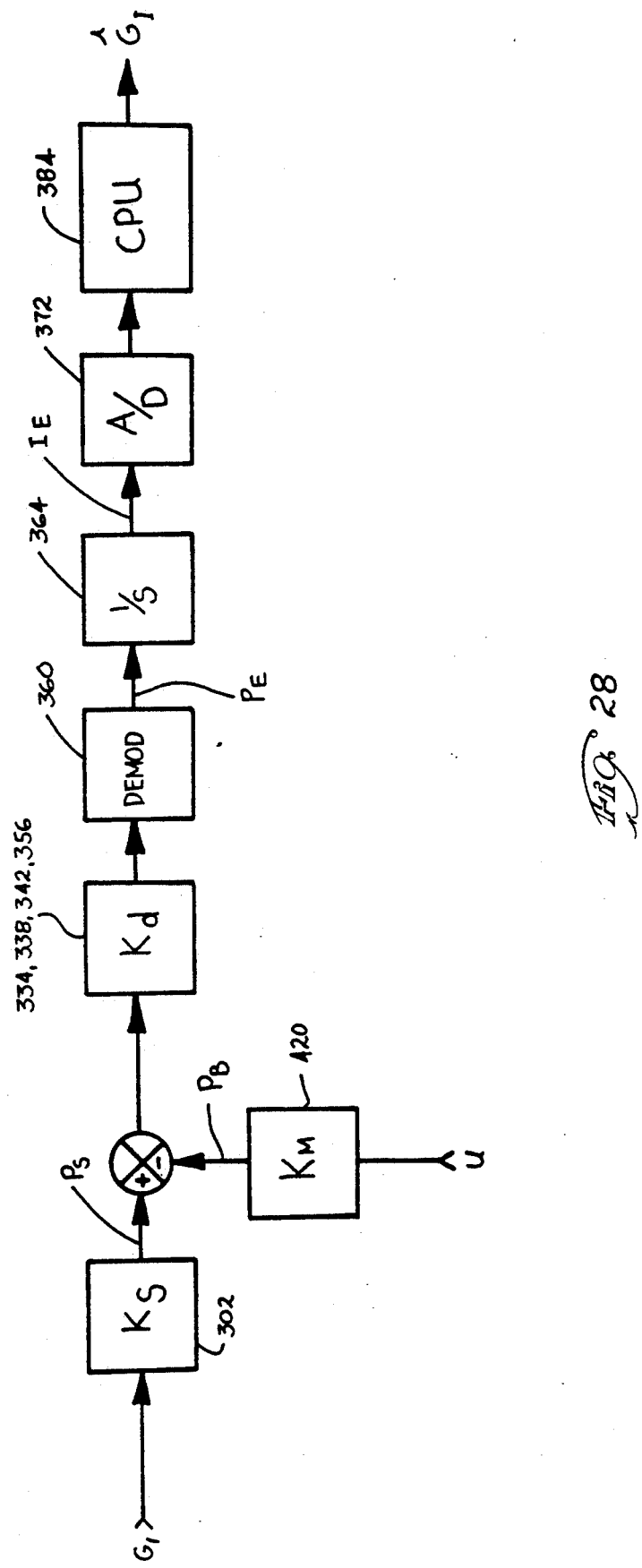
Figure 29:
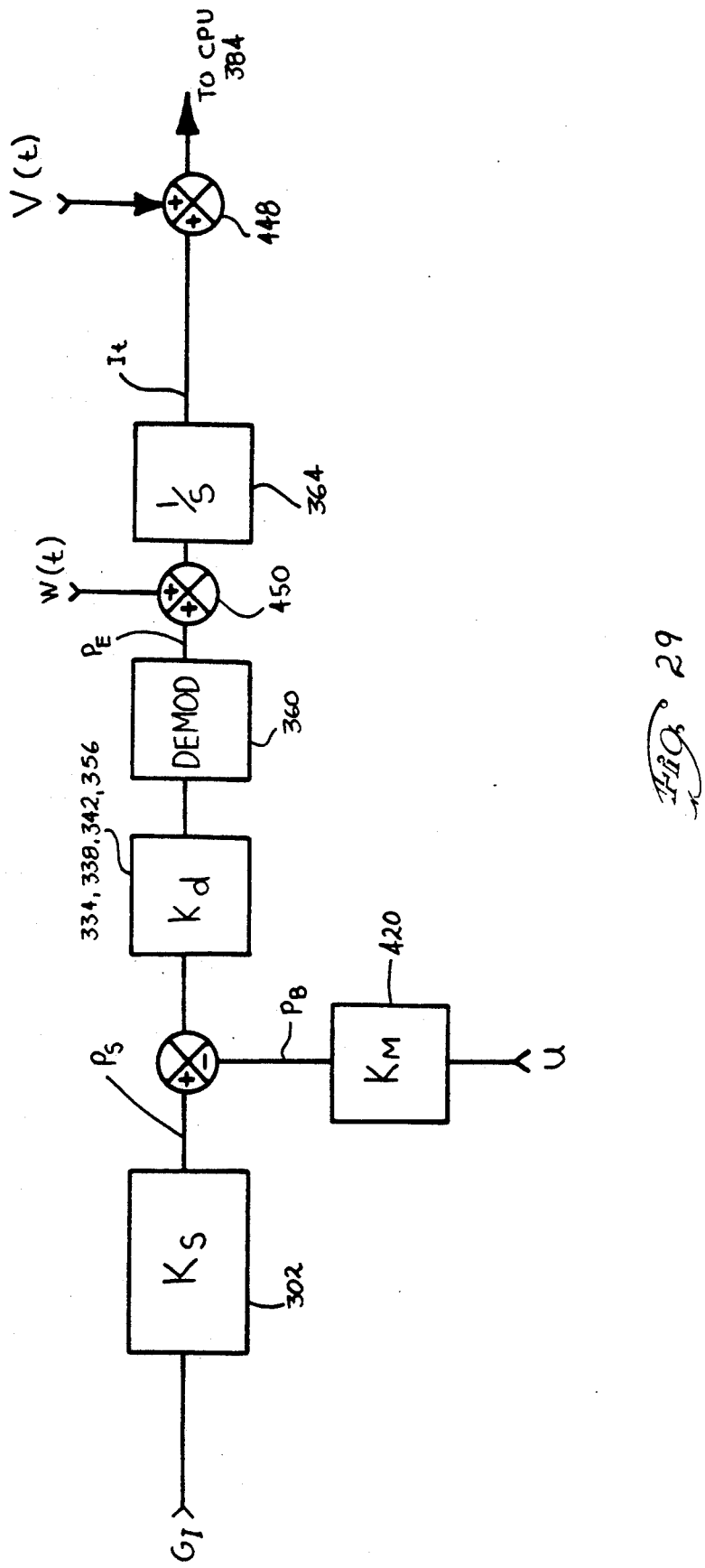
Figure 30:
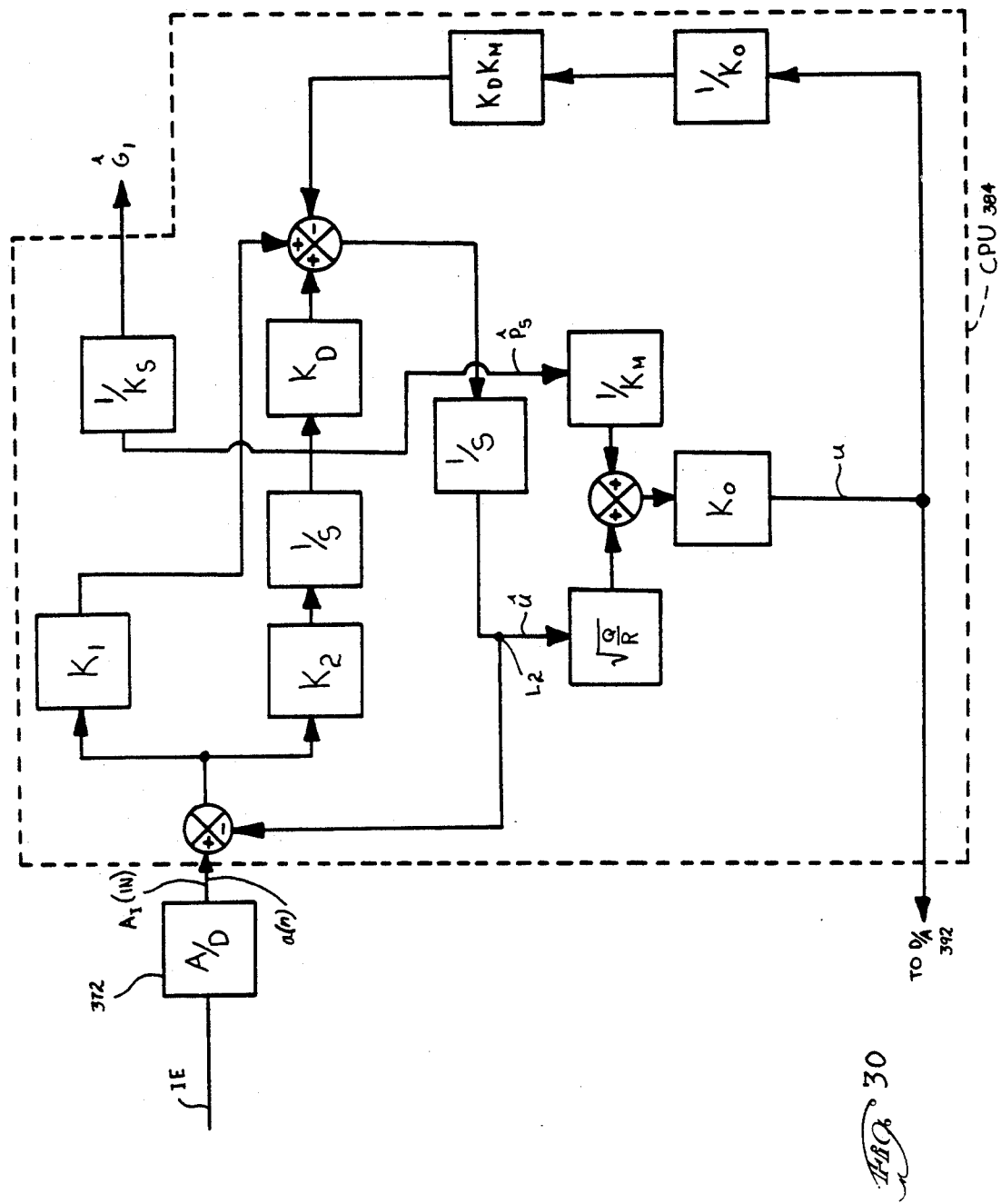
Figure 31:
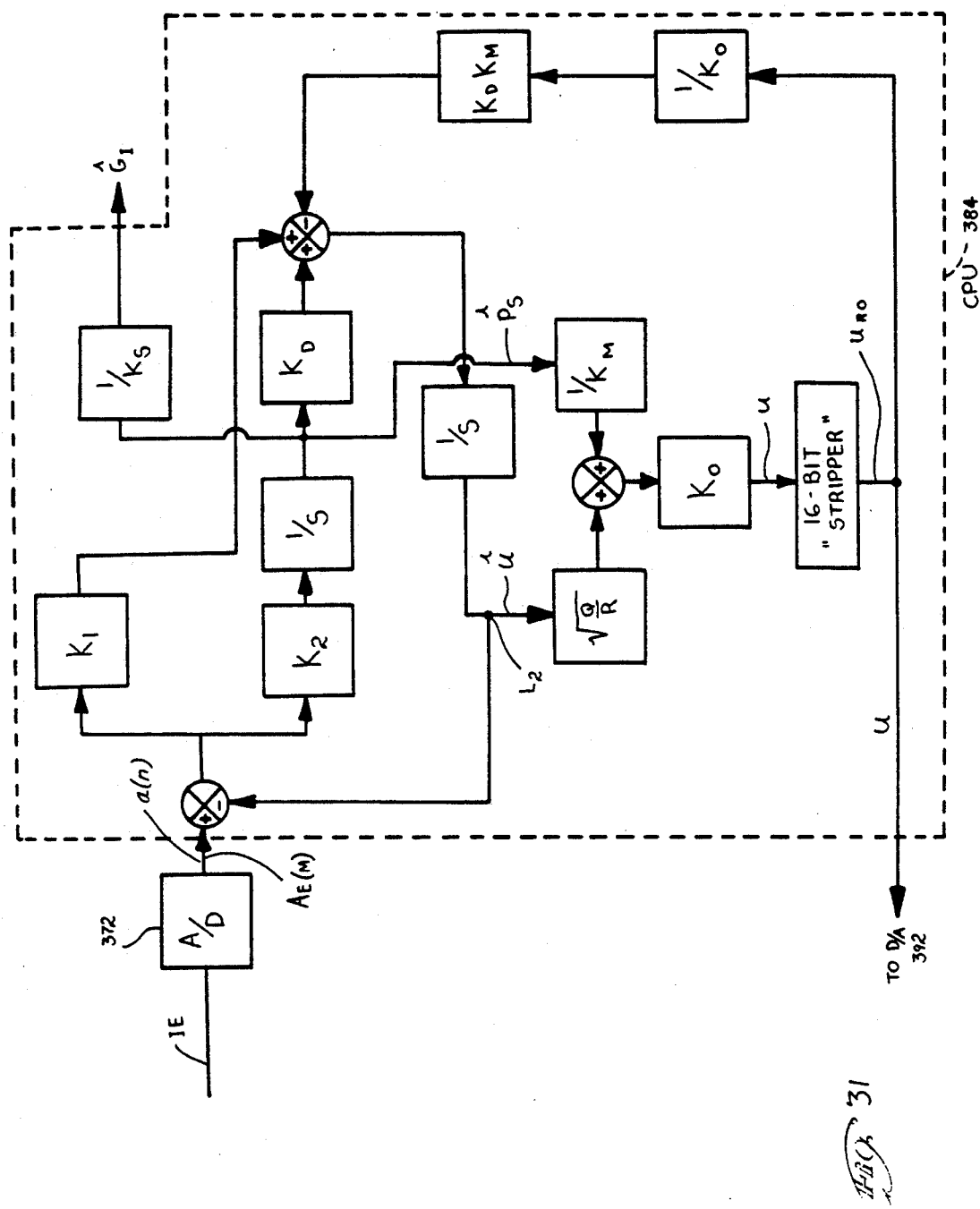
Figure 32:
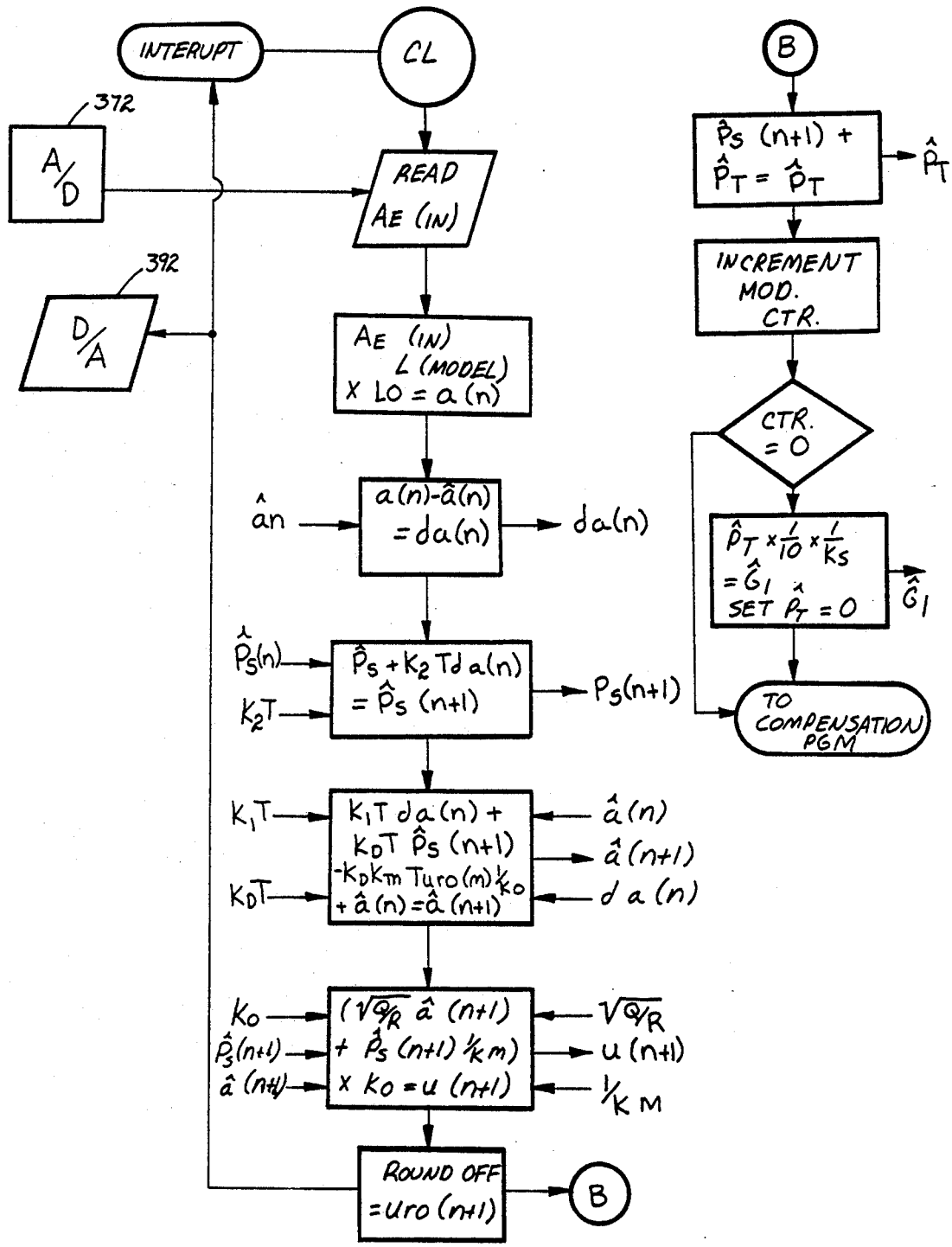

The invention will now be described with reference to the drawings in which:

FIG. 12 is a schematic diagram of one illustrative embodiment of an optical rate sensor in accordance with the invention;

FIG. 13 depicts an exemplary "open loop" symbolic system representation diagram of an optical rate sensor;

FIG. 14 depicts a waveform showing the functional relationship between the intensity signal and the modulator phase of modulator input voltage;

FIG. 15 depicts a system block diagram representation of an optical rate sensor having a closed loop operation;

FIG. 16 depicts a system block diagram representation of the closed loop optical rate sensor operation shown in FIG. 15 with the addition of modulation and demodulation;

FIG. 17 depicts one exemplary waveform $A_1(t)$ which can be utlized as a "dither" waveform as an input to the phase modulator of the optical rate sensor shown in FIG. 12;

FIG. 18 depicts an exemplary waveform $A_2(t)$ which can be generated as a function of an estimate of the Sagnac phase and utilized as an input to the phase modulator of the optical rate sensor shown in FIG. 12;

FIG. 19 is a simplified system diagram showing closed loop operation of the optical rate sensor with the use of the waveforms $A_1(t)$ and $A_2(t)$;

FIG. 20 depicts a system block diagram representation similar to that shown in FIG. 19, with the addition of an analog integrator shown in LaPlace transform notation;

FIG. 21 depicts a system block diagram representation of a closed loop operation of the optical rate sensor without the use of any central processing unit;

FIG. 22 is a simplified system block diagram representation showin a system in accordance with the basic state control equations;

FIG. 23 is a system block diagram representation similar to the representation of FIG. 22 but with the addition of input disturbance and measurement noise;

FIG. 24 is a system block diagram representation of one type of optical feedback control structure;

FIG. 25 is a system block diagram representation of one type of optimal structure for the linear stochastic control problem;

FIG. 26 depicts the basic implementation of a Kalman filter;

FIG. 27 depicts the complete optimal filter and estimation structure for the stochastic control problem;

FIG. 28 depicts a system block diagram representation showing open loop operation of an optimal controller without noise input;

FIG. 29 depicts a system block diagram representation of the optical rate sensor shown in FIG. 12 with the addition of input disturbance and measurement noise;

FIG. 30 is a system block diagram representation of one embodiment of an optimal controller and filter in accordance with the invention for use with the optical rate sensor shown in FIG. 12;

FIG. 31 is a system block diagram representation of the optimal controller and filter shown in FIG. 30, with the addition of a stripping function to obtain the most significant bits of the output; and FIG. 32 is an exemplary sequence diagram of one type of sequence which can be utilized to provide closure loop functions in the central processing unit shown in the optical rate sensor of FIG. 12.

DETAILED DESCRIPTION

Figure 1:
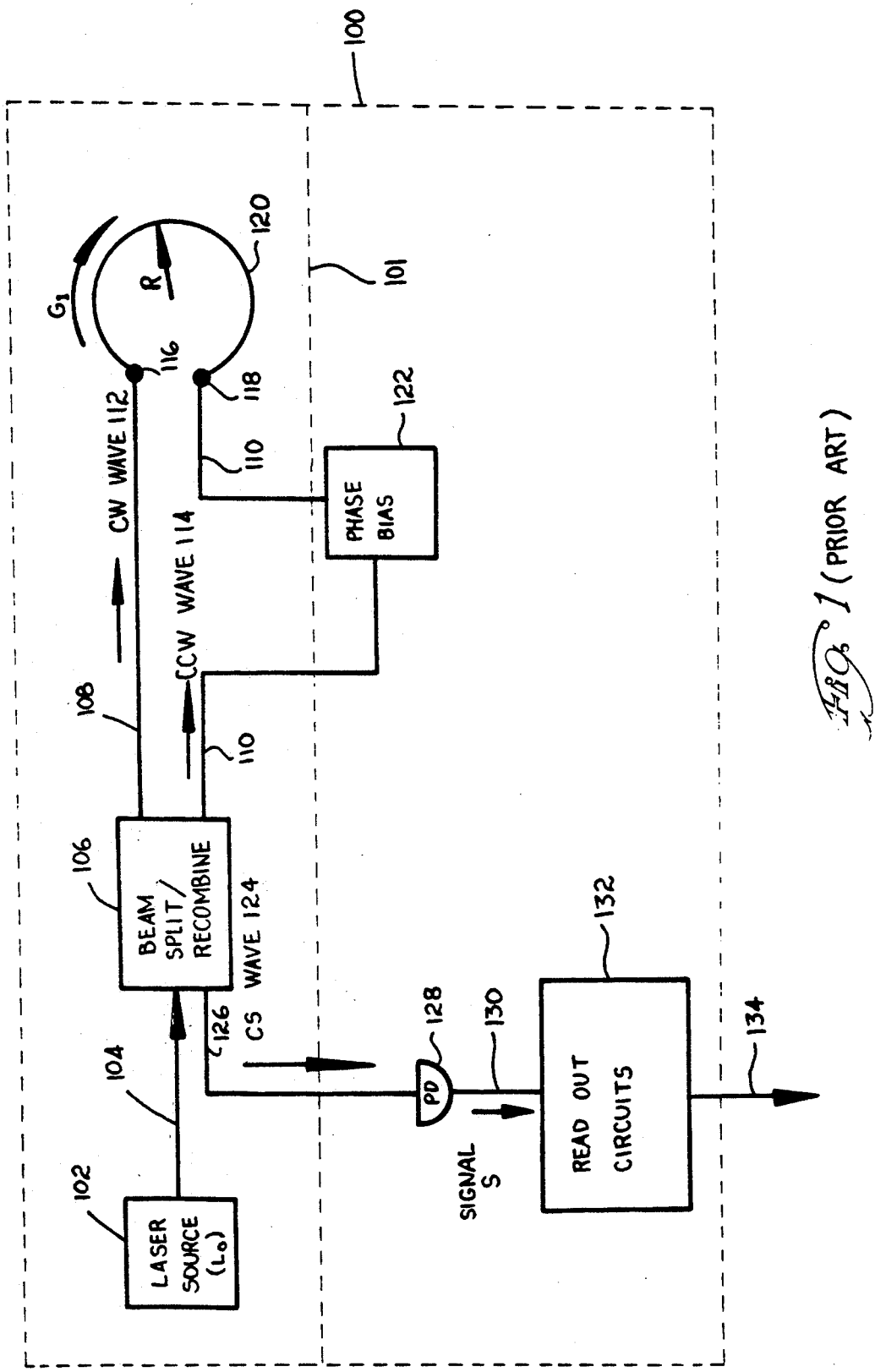
FIG. 1 is a schematic block diagram of an optical rate sensor comprising a passive ring Sagnac interferometer.

The principles of the invention are disclosed, by way of example, in an optical rate sensor 300 as depicted in schematic block diagram form in FIG. 12. As will be made apparent from the subsequent description herein, a rate sensor of this type can be utilized in inertial reference systems to detect angular rotation and measure magnitude and directional sense of the rate of rotation. Furthermore, the rate sensor 300 in accordance with the invention substantially overcomes or minimizes the previously described inherent problems of rate sensors employing Sagnac interferometric principles and utilized in a manner corresponding to that of the interferometer depicted in FIG. 1 and previously described in the section entitled "Background Art." In addition, the rate sensor 300 not only comprises the substantial advantages of the previously described rate sensor 200 over known optical rate sensors, but also provides further advantages with respect to increased signal to noise (S/N) ratio performance, and the ability to operate over a wide dynamic range, including relatively low frequency angular rates.

A substantial number of the subsequently described elements of the optical rate sensor 300 have been previously described with respect to the optical rate sensors 100 and 200, and will therefore not be described in substantial detail herein. Similar to the optical rate sensor 200, the rate sensor 300 comprises a passive ring interferometer 302 having a laser source circuit 304, optical isolator/coupler circuit 306 and a multiple turn optical fiber ring 308. These components can be substantially similar in structure and function to the laser source 102, isolator/coupler circuit 106 and fiber ring 120, respectively, as previously described with respect to the prior art sensor 100 depicted in FIG. 1. However, some distinctions exist with respect to the basic circuitry of the optical rate sensor 200 and the circuitry of the optical rate sensor 300 as described in subsequent paragraphs herein.

The laser source circuit 304 provides a means for generating a single transverse mode linearly polarized optical signal DS on conductor 310 with a nominal wave length of $L_o$. Source circuit 304 comprises a conventional diode laser 312 directly connected to a monitor photodiode 314 which is in turn connected in a feedback arrangement to current supply circuit 316. Current supply 316 supplies, on a conductor 318, operating input current directly to the diode laser 312. This feedback circuit arrangement comprising the photodiode 314 and supply circuit 316 yields a multilongitudinal mode operation and thereby provides signal intensity stabilization of the diode laser 312. The current supply circuit 316, monitor photodiode 314 and laser diode 312 are all conventional circuitry well known in the art of optical circuit design. For example, the diode laser 312 may be a GaAlAs striped geometry double hetero structure device generating the optical signal DS in a single transverse mode with a nominal wavelength $L_o$ in the range of 0.8 to 0.9 microns. However, rate sensors in accordance with the invention are not limited to any particular type of signal source within the passive ring Sagnac interferometer. Other source circuits capable of generating optical or similar electromagnetic wave signals can be utilized. It should be noted that an interferometer 302 in accordance with the invention does not require differing circular polarization form for counter-traveling beams. The necessity of such polarization in prior art rate sensing devices can cause various non-reciprocal biased effects avoided in the present invention. For example, certain non-reciprocal effects will cause differential phase shifts dependent upon the refractive index of signal waves within the interferometer.

The various conductive paths, such as conductor 310 and other conductors within the rate sensor 300 as subsequently described herein, can comprise any type of path capable of transmitting optical or similar types of electromagnetic signals. For purposes of description, the rate sensor 300 will be described herein solely with respect to the use of optical signals within the interferometer 302.

The optical signal DS on conductor 310 is applied as an input signal to optical isolator/coupler circuit 306 as depicted in FIG. 12. Coupler circuit 306 provides a means for dividing the signal DS into two equivalent wave signals separately transmitted on conductors 320 and 322. These equivalent signal waves are characterized as "counter-propagating" waves for purposes made apparent subsequently herein and are further referred to as clockwise (CW) wave signal 324 and counter-clockwise (CCW) wave signal 326 transmitted on conductors 320 and 322, respectively. Wave signals 324 and 326 are substantially equivalent single transverse mode waves each having a nominal wavelength of $L_o$. The isolator/coupler circuit 306 is conventional in design and commonly known in the art as a "beam splitter" and various types of circuitry can be used therefor. For example, circuit 306 can be an integrated optic device utilizing titanium-diffused lithium niobate which is DC-biased in the range of 0 to ±15 volts to yield a desired 3 db crosscoupling to evenly split the optical signal DS into the equivalent signal waves 324 and 326. It should be noted that the isolation circuit 306 can also provide polarization selection to minimize thermal and pressure-induced phase errors within the fiber ring 308 subsequently described herein.

It should also be noted that for proper operation of the coupler 306, the coupler 306 should comprise two separate beam splitters. If only one beam splitter is employed, inaccuracies can result due to the fact that one of the counter-propagating waves will be reflected twice through the beam splitter, while the other counter-propagating wave will be transmitted twice through the beam splitter. Accordingly, the beam splitter itself can produce a relative phase shift between the waves as a result of the light waves travelling in different optical paths. It is preferable to employ two beam splitters so that the subsequently described CS wave 422 impinging on photo-diode 334 comprises recombined counter propagating waves which have travelled essentially identical optical paths with respect to their travel through the beam splitters. It should also be noted that in the physically realized circuitry comprising optical rate sensor 300, the conductors or optical fibers 320 and 322 actually can comprise a single fiber.

For purposes of understanding the illustrative embodiment in accordance with the invention, the structural connections of the circuitry of the remaining portions of optical rate sensor 300 will now be described prior to a complete functional and operational description thereof. As further shown in FIG. 12, the conductive path 320 is directly connected to a ring port 328 of the multiple turn optical fiber ring 308. Similarly, the conductive path 322 is connected to the second ring port 330 of the fiber ring 308. The fiber ring 308 can be circular in structure with a radius of R and a physical path length of L. The ring 308 provides a ring configuration necessary for operation of the Sagnac interferometer 302 and will be more functionally described subsequently herein. The fiber ring can, for example, consist of approximately one kilometer of single-mode fiber material wound into a multi-turn configuration. The optical fiber ring should be thermally designed so as to minimize time-varying thermal gradients which can produce transcient bias errors in all fiber ring optical sensors as commonly known in the art.

Returning to connections associated with the optical isolator/coupler circuit 306, the conductor 332 which is directly connected to the circuit 306 is also directly connected to an input terminal of photodiode 334 as shown in FIG. 12. The photodiode 334 provides a means for generating a current signal on conductor 336 which is representative of a sampled portion of a low order fringe pattern of the wave signal appearing on conductor 332 as will be subsequently described herein. The photodiode 334 can be any suitable circuit element capable of providing the aforementioned function and can, for example, be a PIN silicon photodiode having substantially low dark current and noise, and operable in a photo-conductive mode with relatively fast response.

Connected to the photodiode 334 by means of conductor 336 is a photodiode transconductance amplifier 338 which provides a means for converting low-level output current from the photodiode 334 on conductor 336 to a voltage level signal on conductor 340. The voltage level of the signal on conductor 340 is of a magnitude suitable for subsequent sampling and analog-to-digital (A/D) conversion functions. The transconductance amplifier 338 is well known in the circuit design art and can be any suitable amplifier capable of achieving the aforementioned functions. Amplifier 338 can, for example, have a conversion ratio of $2.5 \times 10^8$ volts per ampere with a bandwidth in the range of 1 MHz and an output voltage range of ±10 volts.

Connected to an output terminal of transconductance amplifier 338 by means of conductor 340 is a switch circuit 342. The switch 342 comprises a means for essentially observing the intensity signal S only at certain periods of time, and "blanking" sampling of this intensity signal at other periods of time. Specifically, the switch will operate so that the intensity signal S (applied through the transconductance amplifier 338) will be sampled or "passed through" only during a time period corresponding to substantially the ring transit time following a "positive going" or rising edge of signals $F_2$ and $A_2$ as described in subsequent paragraphs herein. The switch 342 can be controlled in a conventional manner by clocking signals generated from the master clock 352. The output signals passed through the switch 342 are applied on conductor 354. For purposes of subsequent description herein, these output signals will be referred to as "sampled" signals.

Connected to the output of the switch circuit 342 by means of conductor 354 is a high pass filter 356. The filter 356 provides a means for filtering low-frequency transients and similar undesired signals. Circuit 356 is a conventional high pass filter with a frequency cutoff, for example, of approximately one kHz.

In accordance with one aspect of the invention, the filtered and sampled signals from the high pass filter 356 are applied as input signals on conductor 358 to a conventional demodulator 360 as shown in FIG. 12. Also applied as an input signal to the demodulator 360 is a signal $F_1$ having a frequency $f_1$. As will be described in subsequent paragraphs herein, the demodulator 360 provides a means for removing the high frequency components of the sampled signals which are input to the demodulator 360 on conductor 358. The demodulator 360 is conventional in design and can comprise, for example, a conventional signal multiplier or "divider" circuit for purposes of shifting the frequency spectrum of the input signals on conductor 358 by the frequency $f_1$ of the signal $F_1$.

As will be described in subsequent paragraphs herein, the sampled signals input to the demodulator 360 will essentially comprise a modulated signal representative of the difference between the Sagnac effect phase shift and the nonreciprocal phase shift applied by the phase modulator 420. The demodulator 360 thus removes the modulation from this "phase error" signal.

The resultant demodulated signals output from the demodulator 360 and designated in FIG. 12 as "phase error" signal $P_e$ are applied on conductor 362 as input signals to an analog integrator circuit 364. The analog integrator 364 is essentially an "averaging" circuit which integrates the phase error signal $P_e$ over time. The integrator 364 provides a means for averaging the information contained in the phase error input signal from conductor 362 in a manner so as to contain or bound error sources resulting from noise and the subsequently described analog-to-digital (A/D) conversion function.

The averaged or integrated signals resulting from the function of the analog integrator 364 are applied on conductor 366 as input signals to a conventional analog-to-digital (A/D) conversion circuit 372. Circuit 372 comprises a means for converting the sampled and integrated signals on conductor 370 to digital signals for purposes of subsequent utilization by central processing unit (CPU) 384. The conversion circuit 372 is controlled by means of clock pulses applied on conductor 350 from the master clock 352. The clock pulses operate as "start" pulses for performance of the analog-to-digital conversion. Conversion circuit 372 can be any suitable analog-to-digital conversion circuit well known in the art and can, for example, comprise 12 binary information bits, thereby providing a resolution of 4,096 levels per sampled and integrated signal. A conversion time of 30 microseconds or less is suitable for purposes of utilizing the optical rate sensor 300 in various aircraft and missile applications. For purposes of description, the output of the analog integrator 364 is characterized as integrated or "averaged" phase error signal IE.

The A/D conversion circuit 372 is directly connected by means of conductor 374 to a sample register 376 comprising a means for storage of digital information signals representative of a plurality of sampled and integrated signals from the conversion circuit 372. Register 376 is conventional in design and can, for example, comprise a 128 "first-in first-out" (FIFO) information word memory, each word having 12 bits of information.

The sample register 376 is connected to the central processing unit (CPU) 384 by means of conductor 388, which provides a means for transmitting the binary information signals stored in register 376 directly to the CPU 384, and also provides a means for the CPU 384 to selectively address the information words within the register 376. It should be noted that the CPU 384 does not provide any specific control of the operation of the various sampling, integration and A/D circuitry previously described herein. These circuits operate strictly under the control of the master clock 352, and the CPU 384 is merely capable of addressing the register 376 to obtain transmission of the binary information signals stored therein directly to conventional memory units within the CPU 384. The specific functions achieved by CPU 384 will be more fully described subsequently herein.

As will also be described in greater detail herein, the CPU 384 is utilized in part to compute a "best estimate" of the angular rate $G_I$ and output signals representative of the same on conductor 370. In addition, the CPU 384 utilizes the phase error information from signals IE to generate signals which, through subsequently described circuitry of the rate sensor 300, will be applied to phase modulator 420 in a manner so that modulator 420 will apply a modulated nonreciprocal phase shift to the intensity signal 422 opposite in polarity to the Sagnac effect phase shift resulting from angular rotation of the ring 308. The actual signals generated by the CPU 384 will be dependent on the integrated phase error signals IE. Accordingly, the rate sensor 300 differs in part from the Carrington et al arrangement in that the sensor 300 operates in a true closed-loop mode, while Carrington et al is better described as an open-loop arrangement, with the exception of minor variations in the phase modulator drive voltage pattern to attempt to "center" the intensity signal peak as earlier described in the section entitled "Background Art."

More specifically, output signals in the form of digital information signals are generated from the CPU 384 and applied as signals on conductor 390 to a digital-to-analog (D/A) conversion circuit 392. For purposes of description, the output signals from the CPU 384 on conductor 390 are characterized herein as control signals u. The D/A converter 392 is conventional in design and provides a means for converting the digital signals received on conductor 390 to corresponding analog signals which are applied as output signals on conductor 394. As will be subsequently described herein, the signals on conductor 394 contain information representative of an estimated value of the Sagnac phase shift $P_s$. The conversion circuit 392 can be any suitable D/A conversion circuit capable of providing latched analog output signals corresponding to 16 bit binary input signals with a conversion and settling time of less than 10 microseconds.

In accordance with one aspect of the invention, the 16 bit analog output signal will be sufficient to provide appropriate resolution of the driving voltage input signals to the phase modulator 420, notwithstanding that inertial rotation rate of the ring 308 may have a dynamic range on the order of $3.6 \times 10^6$. The principles associated with achieving this resolution with the use of a 16 bit D/A converter will be explained in subsequent paragraphs.

The analog output signals generated from the D/A conversion by circuit 392 are applied on conductor 394 as input signals to a hold circuit 396. The hold circuit 396 is conventional in design and commonly characterized as a "deglitcher." The hold circuit 396 merely provides an appropriate interface between the D/A converter 392 and the subsequent circuitry described herein.

The output signals from the hold circuit 396 are applied on conductor 398 as input signals to a wave form generator circuit 400. As earlier described, the output signal u from the CPU 384 contains information regarding the estimate of the inertial rate input $G_I$. In addition, this control signal u will also contain information regarding appropriate signal feedback to achieve an optimal control of the phase error $P_e$. As will be further described, the control signal u will represent an optimal control input for the phase modulator 420, given the "noisy" measurements of the integrated phase error signals IE. To achieve a physically realizable closed loop control and estimation, the wave form generator 400 provides a means for generating a periodic signal $A_2$ on conductor 402. The output signal on conductor 402 will be formed as a square wave having a frequency $f_2$ which is the frequency of input signal $F_2$ generated from master clock 352. The specific configuration of the signal $A_2$ is shown in FIG. 18 and its derivation is described subsequently herein. The wave form generator 400 is conventional in design and well known in the art.

The signal $A_2$ is generated on conductor 402 as an input signal to the attenuator circuit 404. The attenuator 404 will have an attenuation constant of $1/K_o$ and is utilized in part because of the relatively high gains which must be employed in the CPU 384. For relatively low inertial rate inputs, the attenuation constant should be relatively high (i.e. $K_o >> 1$). For high rate inertial inputs, the attenuation constant can approach unity. It should be emphasized, however, that any changes in the attenuation constant must be accompanied by simultaneous changes in the attenuation constant $K_o$ within the CPU 384 described in subsequent paragraphs herein with respect to FIGS. 30 and 31.

The attenuated output signals from the attenuator circuit 404 are applied on conductor 406 to an "adder" circuit 408. Also applied as an input signal to the adder circuit 408 is a signal $A_1$ on conductor 410. The signal $A_1$ is generated by the wave form generator circuit 412 having an input signal $F_1$ generated from the master clock 352 with a frequency $f_1$. As will be described in subsequent paragraphs, the signal $A_1$ will be a square wave having a period $1/f_1$ which is greater than the time period corresponding to the approximate transit time of waves traveling around the fiber ring 308. The signal $A_1$ can be characterized as a "dither" signal having a magnitude which will cause the sensor 300 to operate in a manner such that changes in inertial rate input and, correspondingly, Sagnac phase shift will have the "maximum" and substantially linear effect on corresponding changes in magnitude of the intensity signal S at the output of photodiode 334. The signals $A_1$ and $A_2$, and the specific functional purposes of the adder circuit 408 will be described in detail in subsequent paragraphs herein. The adder circuit 408 comprises a means for generating a signal $A_3$ on conductor 414 which comprises the sum of the signals $A_1$ and $A_2$.

The signal $A_3$ on conductor 414 generated from the adder circuit 408 is applied as an input signal to the phase modulator driver amplifier 416. The driver 416 provides a means for converting the analog signals comprising signal $A_3$ to suitable voltage signal levels on conductor 418 for operating the phase modulator 420 which is positioned on the conductor 322 between the coupler circuit 306 and the fiber ring 308, as shown in FIG. 12. A suitable loading for the driver amplifier 416 is provided by the capacitive input of the electro-optical phase modulator 420. The previously described driver 416, wave form generators 400 and 412 and D/A conversion circuit 392 comprise a control means for achieving a particular pattern of phase modulation within the modulator 420.

The phase modulator 420 is responsive to the driving voltage signals on conductor 418 to induce a time-variant phase shift to the particular wave(s) appearing on conductor 322 at any given instant of time. The magnitude and polarity of the phase shift is directly dependent and proportional to the input driving voltage from driver 416, and is thus proportional to the magnitude and polarity of signal $A_3$.

It should be emphasized that a distinction must be made between the instantaneous phase delay applied to light waves travelling through the phase modulator 420, and non-reciprocal phase shift of the intensity signal S or CS wave 422 resulting from the phase modulator output That is, although the absolute phase delay of the phase modulator 420 at any given instant of time is directly proportional to the magnitude of the instantaneous voltage applied as an input to the phase modulator 420, the non-reciprocal phase shift $P_B$ of the intensity signal S resulting from the output of phase modulator 420 is dependent on the difference in phase delay applied by the phase modulator 420 to the two counter-propogating waves 324 and 326. Accordingly, the non-reciprocal phase shift $P_B$ of the intensity signal is dependent on the change in phase modulator input voltage over a time period corresponding to the nominal transit time of a wave through the ring 308.

Although not shown in FIG. 12, and also not comprising a principal basis for the invention, the optical rate sensor 300 can include a means for achieving temperature compensation for measurements of angular inertial rotation rates. For example, a temperature monitor can be connected to the phase modulator 420 and analog signals therefrom applied to an A/D conversion circuit. The A/D circuit could be utilized to convert the temperature monitor signals to digital signals capable of storage within a buffer and application to the CPU 384. The temperature compensation could be utilized to adjust the particular voltage drive pattern applied to the phase modulator 420 on the basis of temperature changes of the modulator 420 itself. It should also be noted that temperature compensation is advantageous in that variations in ring diameter can also occur as a result of temperature variations. Such changes in ring diameter can affect the ring scale factor $K_s$.

With the exception of the particular details of the functional operation of CPU 384, the complete operation of the optical rate sensor 300 in accordance with the invention will now be described. Referring again to FIG. 12, the CW wave signal 324 transmitted from the isolator/coupler circuit 306 on conductor 320 is directly applied as an input signal to ring port 328 of fiber ring 308. Correspondingly, the CCW wave signal 326 on conductor 322 is applied through the phase modulator 420 which induces a time variant phase shift to the wave signal 326. The magnitude of the phase modulation shift at any given time is directly dependent and proportional to the driving voltage signal applied on conductor 418 from the previously-described driver circuit 416. The CCW wave signal 326 is thus phase modulated and then applied to the ring port 330 of the fiber ring 308.

The CW wave signal 324 and CCW wave signal 326, as they emerge from the coupler circuit 306, are applied by means of the ring ports 328 and 330 to the fiber ring 308 and propagate in opposite directions thereto. As previously described, the fiber ring 308 has a radius R and an actual path length L. The ring 308 is preferably a multiple turn coiled ring to provide an increased path length which effectively increases the resultant Sagnac induced phase shift for given values of angular rotation rate $G_I$ of the ring 308.

As the CW wave signal 324 and CCW wave signal 326 emerge from the fiber ring 308, the CW wave signal 324 which appears on conductor 322 is then applied through the phase modulator 420 and transmitted therefrom directly to the optical coupler circuit 306. The counter-propagating CCW wave signal 326 on conductor 320 is also directly applied to the coupler circuit 306. Coupler 306 now operates to recombine the waves 324 and 326 into a combined wave characterized as CS wave 422 transmitted on conductor 332 as depicted in FIG. 12. As previously described with respect to prior art passive ring Sagnac interferometers, the counter-propagating waves 324 and 326 will have a relative Sagnac phase shift therebetween which is directly proportional to the angular rotation rate $G_I$ of the passive fiber ring 308. In addition, the recombined CS wave 422 will have a non-reciprocal phase shift resulting from the phase delays applied to the CW wave 324 and CCW wave 326 by the phase modulator 420. The value of the nonreciprocal phase shift will be dependent on the change in phase modulator output between the time that the CCW wave 326 was applied through the phase modulator 420 and the time that the CW wave 324 was applied through modulator 420.

However, in accordance with one aspect of the invention, the phase shift applied to the CS wave 422 by the phase modulator 420 will tend to "track" the Sagnac effect phase shift, with an opposite polarity thereto. The CS wave 422 will have a low order fringe pattern representative of the Sagnac and phase modulator phase shifts.

The CS wave 422 on conductor 332 is then applied as an "impinging" signal to the photodiode 334 as depicted in FIG. 12. The photodiode 334 generates an output current signal on conductor 336 having an intensity representative of a given point of the "low order" fringe pattern of CS wave 422 and, accordingly, is representative of the relative phases of wave signals 324 and 326. It should be noted that elements other than the photodiode 334 could be utilized to derive an output signal having an intensity proportional to first, second or other order fringe patterns of the CS wave 422. Photodiode 334 provides a current output signal specifically representative of the zero order fringe pattern of wave 422. The current output signal on conductor 336 is directly applied as an input signal to the transconductance amplifier 338 which, as previously described, provides a voltage output signal on conductor 340 having a level suitable for subsequent functional operations thereon. As shown in FIG. 12, the signal on conductor 340 is characterized as intensity signal S.

As previously discussed with respect to prior art systems employing passive ring Sagnac interferometers and sensors such as the optical rate sensor 100, the relationship of an intensity signal S to a Sagnac phase shift $P_S$ and fixed induced phase shift $P_B$ is shown in Equation 3. With respect to optical rate sensors such as the rate sensor 200 wherein a time variant nonreciprocal phase shift is applied to the counterpropagating waves, the relationship of the intensity signal S to Sagnac phase shift $P_S$ is as shown in Equation 4.

Figure 2:
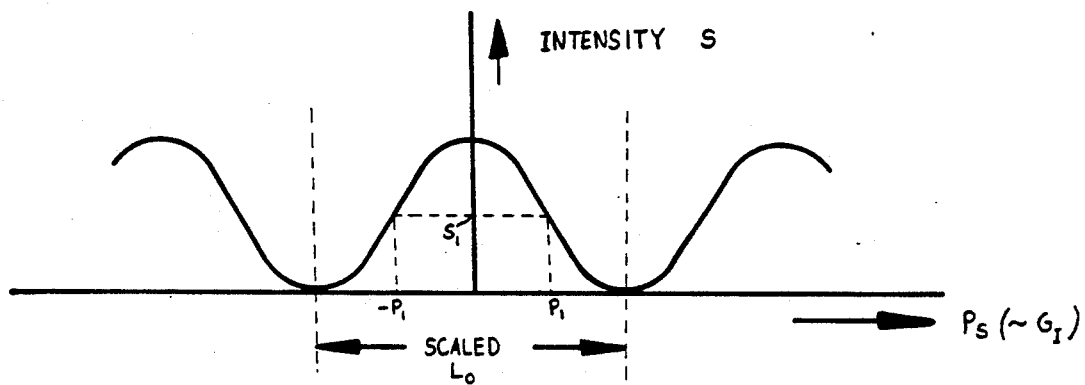
FIG. 2 is a diagram illustrating the wave form of an output intensity signal and its correspondence to Sagnac phase shift of counter-propagating waves within the interferometer shown in FIG. 1.
Figure 3:
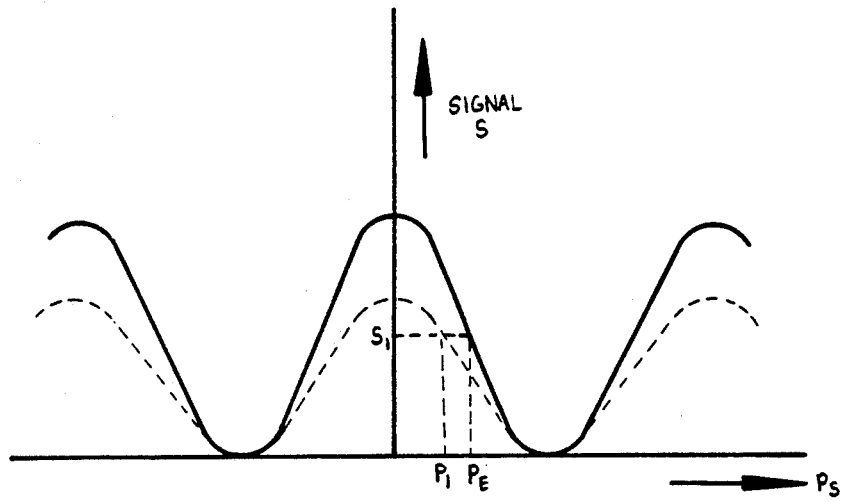
FIG. 3 is a diagram illustrating the effect of laser source intensity changes on the measurement of Sagnac phase shift within the interferometer shown in FIG. 1.
Figure 4:
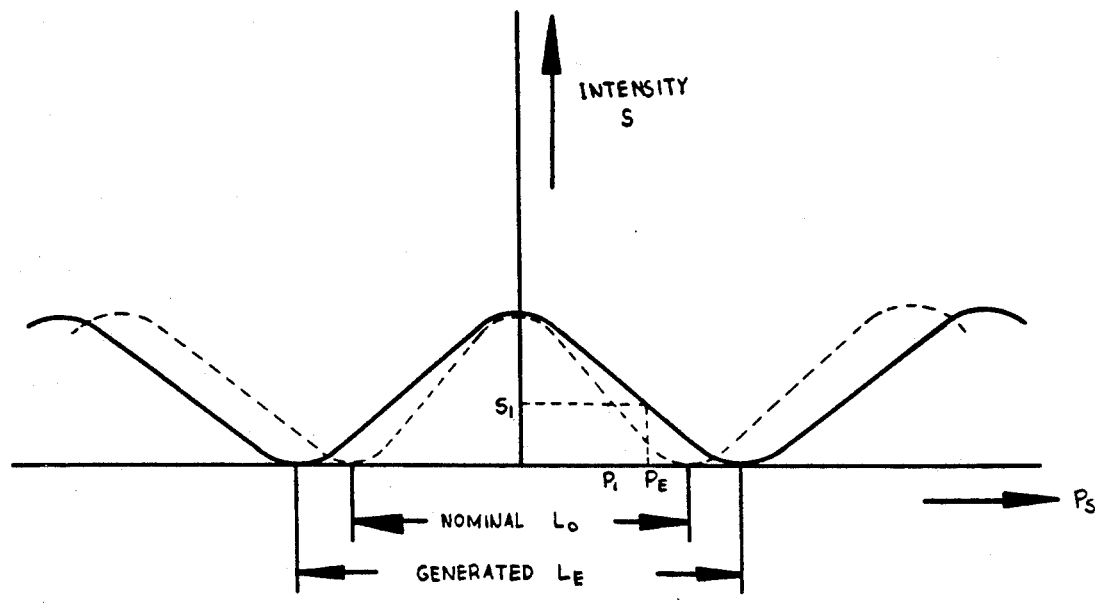
FIG. 4 is a diagram illustrating the effect of laser source wavelength changes on the measurement of Sagnac phase shift within the interferometer shown in FIG. 1.
Figure 5:
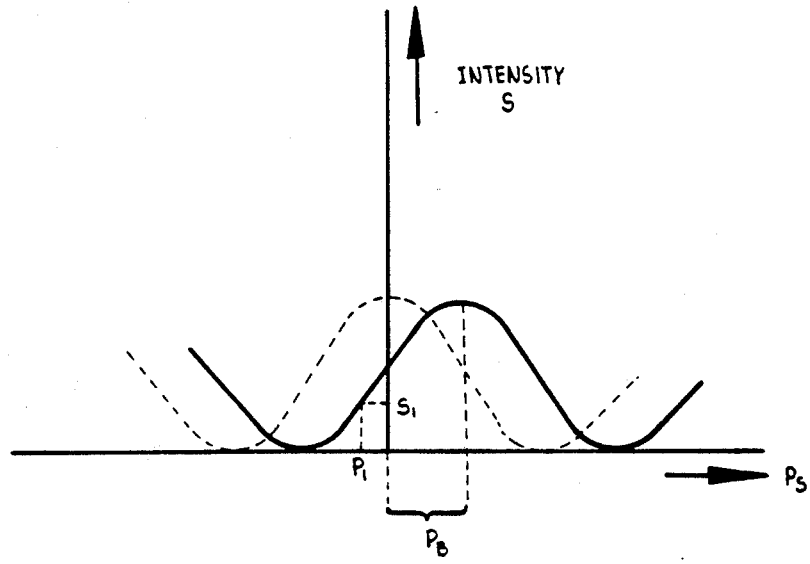
FIG. 5 is a diagram illustrating the effect of application of a constant phase shift of 90° on the measurement of Sagnac phase shift within the interferometer shown in FIG. 1.
Figure 8:
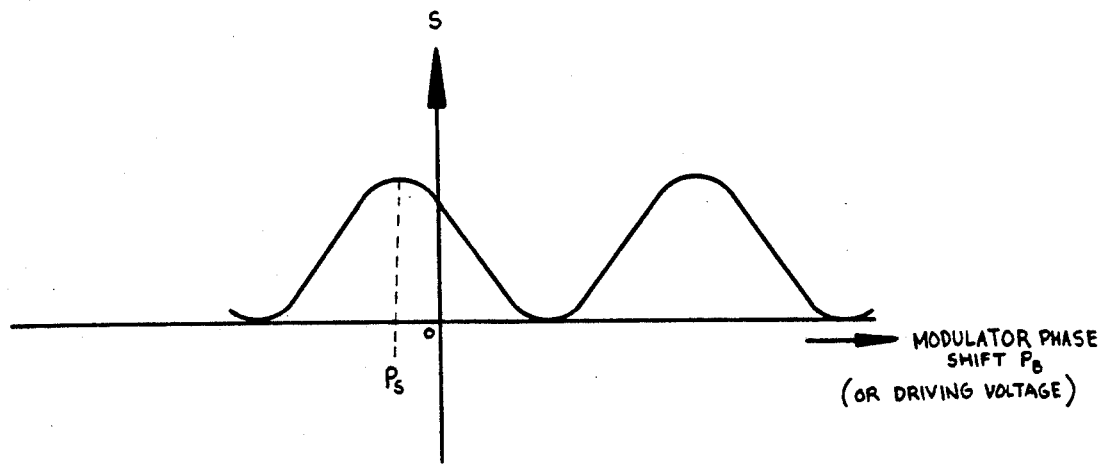
FIG. 8 depicts the output wave form of an intensity signal generated within the optical rate sensor shown in FIG. 6.
Figure 9:
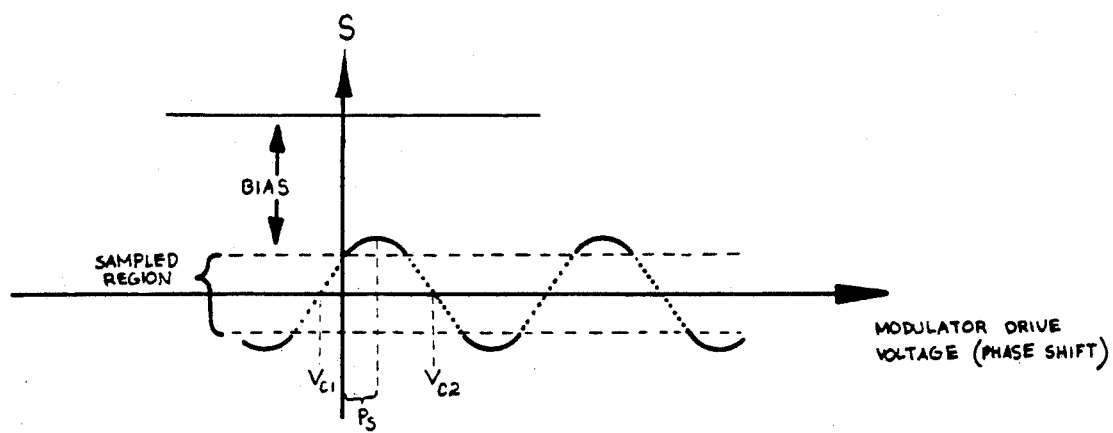
FIG. 9 depicts the intensity signal shown in FIG. 8 after it has been center biased and further depicts the sampling region for sampling the intensity output signal.
Figure 10:
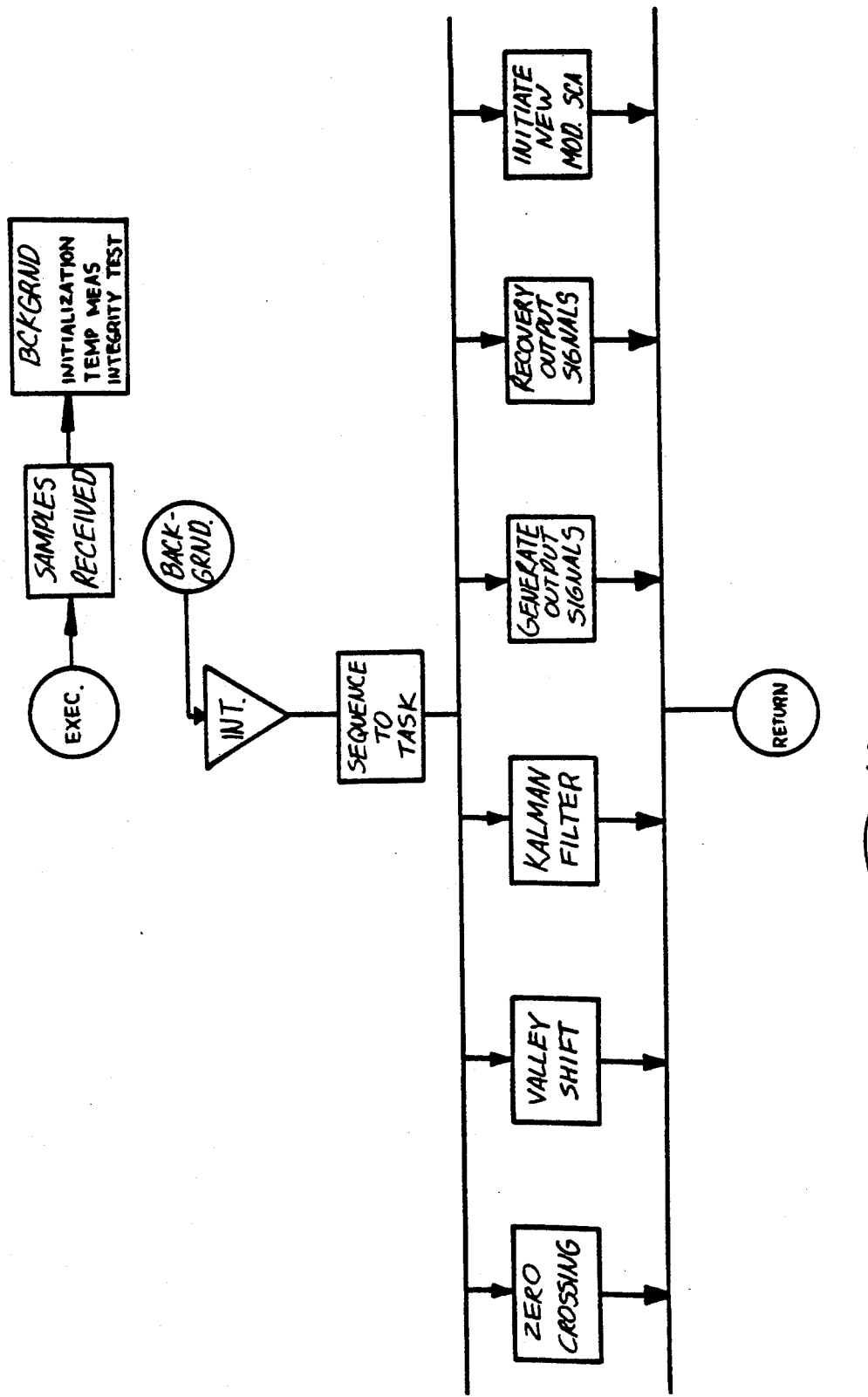
FIG. 10 is a sequence diagram illustrating an exemplary control sequence within the central processing unit of the optical rate sensor shown in FIG. 6.
Figure 11:
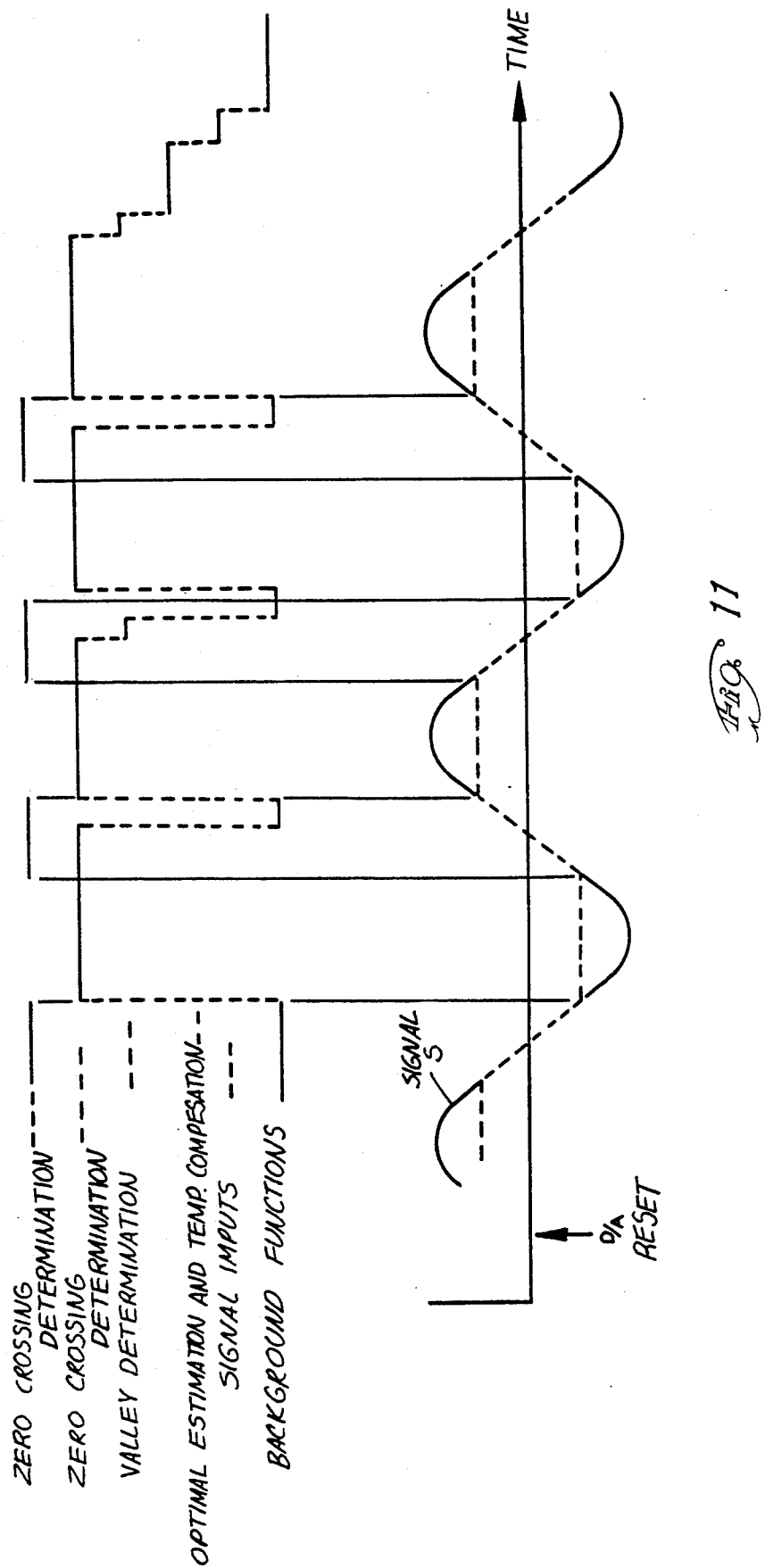
FIG. 11 is a sequence timing diagram illustrating the relationship of the output signal indicative of Sagnac phase shift to the control functions shown in FIG. 10 for the optical rate sensor depicted in FIG. 6.

As also previously described with respect to the optical rate sensor 200, the phase shift $P_B$ applied through the phase modulator can be varied rapidly in time in a periodic manner relative to expected rates of change of rotation. In accordance with the invention disclosed and claimed in the previously-referenced Carrington et al patent, with the time variant phase shift $P_B$ varied rapidly, the pattern of the intensity signal S relative to the modulator phase shift $P_B$ will appear similar to the pattern previously described and depicted in FIG. 2 when there is a substantially zero rate of angular rotation $G_I$ of the passive ring. However, the abscissa axis of this wave pattern in the optical rate sensor 200 is then the externally-applied phase shift $P_B$ rather than the Sagnac phase shift $P_S$ as depicted in FIG. 2. The effect of non-zero angular rotation rate of the passive ring then causes a relational pattern of signal S relative to the modulator phase shift $P_B$ to translate to the left or right of the voltage drive axis origin as depicted in FIG. 8. The specific magnitude and directional translation, characterized in the Carrington et al patent as "phase offset", can be readily shown to directly correspond to the magnitude and direction of observed Sagnac phase shift $P_S$. Accordingly, and as shown in FIG. 8, the modulator phase shift $P_B$ corresponding to the peak of the intensity signal S which occurs at the axis origin when the angular rotation rate is substantially zero will then correspond to the Sagnac phase shift $P_S$. In the Carrington et al system, the offset position of the peak of the intensity signal S is determined by biasing the intensity signal and taking samples within the regions of the intensity signal as shown in FIG. 9.

As also earlier explained in the section entitled "Background Art", the Carrington et al arrangement was essentially an "open loop" system in that the driving voltage applied to the phase modulator and the resultant phase modulator output were substantially independent of the inertial input rate and the Sagnac phase. In accordance with one aspect of the present invention as embodied within the optical rate sensor 300, the sensor 300 operates in a closed loop mode. To better understand the concepts associated with open loop and closed loop control as they relate to aspects of optical rate sensor 300 in accordance with the invention, such systems will be explained in part in system nomenclature.

Figure 6:
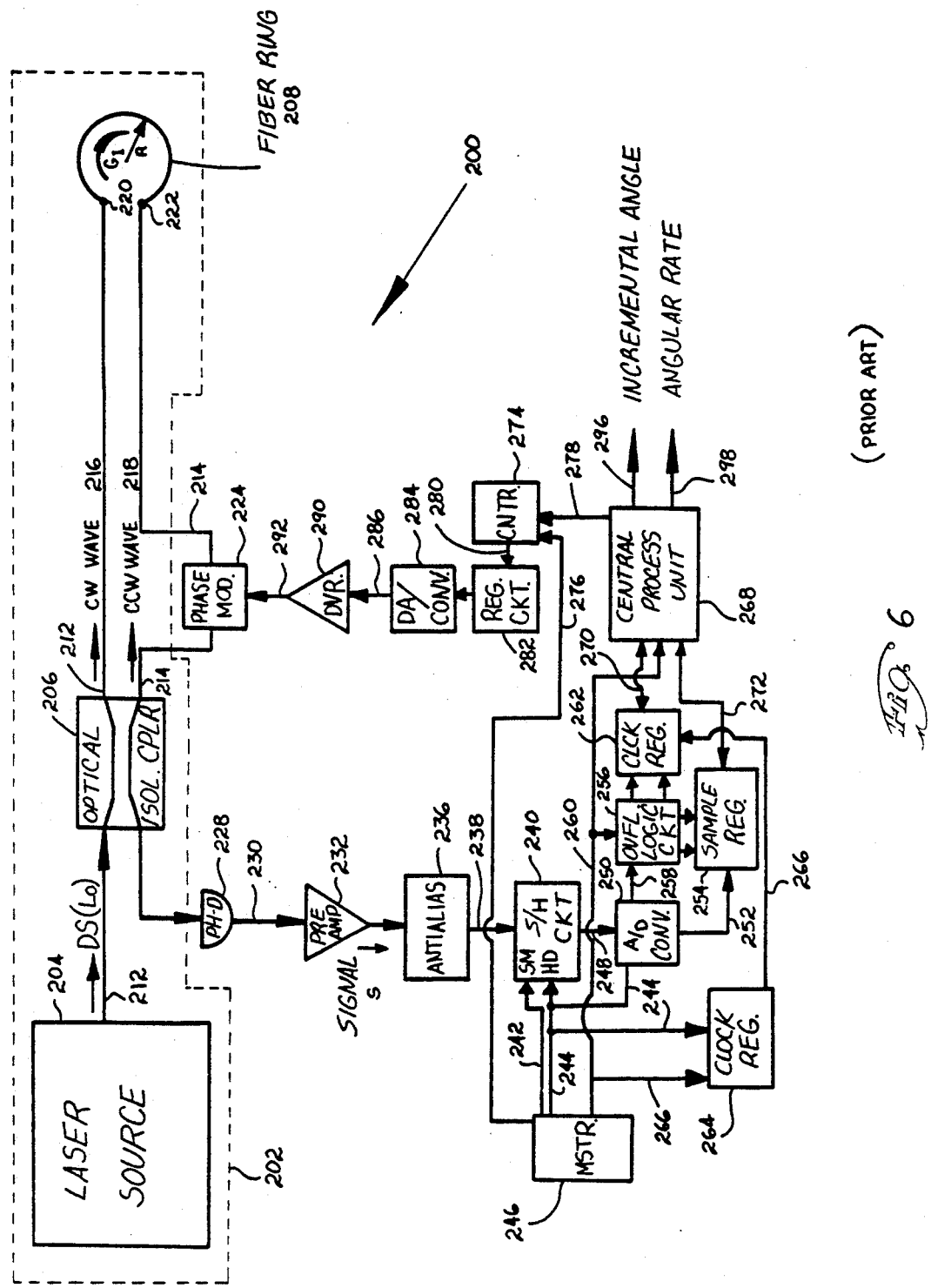
FIG. 6 is a schematic diagram of another known optical rate sensor comprising a passive ring Sagnac interferometer and a phase modulator.
Figure 7:
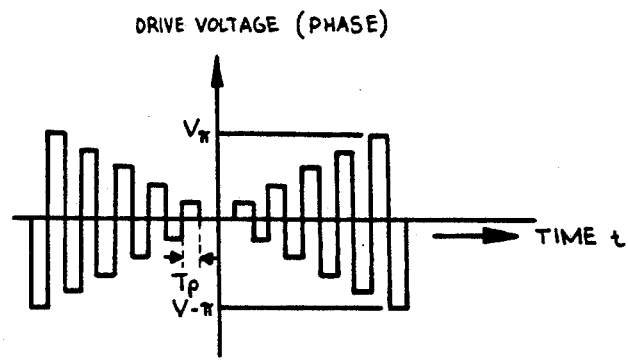
FIG. 7 depicts a typical drive voltage pattern for the phase modulator shown in the optical rate sensor depicted in FIG. 6.

FIG. 13 is a simplified system diagram of the operation of the previously known optical rate sensor 200 as described in the Carrington patent. For purposes of description, reference will be made to circuitry of the rate sensor 200 as depicted in FIG. 6. Specifically, the input to the system diagram of sensor 200 is the inertial rate input $G_I$. The interferometer 202 is shown as block 430, with $K_s$ representing the functional scale factor relating the Sagnac phase $P_S$ to the input rate $G_I$. This functional relationship can be written as:

$$P_s = K_s G_I \qquad \text{(Equation 11)}$$

Equation 11 essentially corresponds to the functional relationship shown in Equation 1, with $K_s$ being:

$$K_s = (4\pi RL)/L_0 c \qquad \text{(Equation 12)}$$

The variables shown in Equation 12 were previously described with respect to Equation 1.

Referring again to FIG. 13, the Sagnac phase shift $P_S$ and the modulator phase shift $P_B$ can then be characterized as being added together (through adder 432) within the interferometer 202. The effects of the photodiode 228, transconductance amplifier 232, filter 236 and S/H circuit 240 are collectively shown as block 436 having a scale factor $K_p$. The resultant output is then applied through the analog-to-digital (A/D) converter 250 and input to the CPU 268. In the Carrington et al system, the input to the CPU 268 is acted upon so as to determine the Sagnac phase $P_S$. As earlier explained, this determination of the Sagnac phase $P_S$ is computed in accordance with the mid-point between zero crossing intervals of the intensity signal peak as a function of the modulator phase shift $P_B$. As also earlier described, a Kalman filter (provided through operations of the CPU 268) is utilized to determine an optimal estimate of phase modulator driving voltage corresponding to the Sagnac phase shift $P_s$. Accordingly, the output of the CPU 268 can be characterized as an estimate $G_I$ of the inertial input rate $\hat{G}_I$.

As also shown in FIG. 13, the modulator phase $P_B$ can be characterized as a phase signal resulting from a control input signal u applied to the phase modulator 224. The functional relationship between the modulator phase $P_B$ and the input control variable u is shown as the modulator scale factor $K_m$. $K_m$ can be characterized as a scale factor associated with the actual physical implementation of the modulation. Although relatively constant, the scale factor $K_m$ is a function of variables such as phase modulator temperature and the like.

In the foregoing system as shown in FIG. 13, the applied input u to the phase modulator is shown as being totally independent of the Sagnac phase shift $P_S$. In fact, this completely open loop control is not entirely accurate With the variable u characterized as the driving voltage to the phase modulator, and as previously described in the section entitled "Background Art", the driving voltage is partially controlled to the extent that the scanning "window" is varied so as to attempt to maintain two and only two zero crossings of the intensity signal as a function of the modulator voltage during any given phase modulator cycle. However, this type of control cannot in any manner be characterized as a true "closed loop" operation.

As also earlier described, the foregoing system as substantially implemented and described in the Carrington et al patent basically results in a sinusoidal functional relationship between the intensity signal and the modulator drive voltage and also results in the intensity signal having values at certain times outside of the substantially linear region of the functional relationship. Because of operation in the nonlinear regions, and the essential requirement that information associated with the intensity signal in these non-linear regions be ignored, a relative reduction in signal to noise ratio occurs with respect to the determination of Sagnac phase. In addition, relatively low frequency inertial input rates can be aliased to DC by this arrangement, in a manner so that such input rates can actually appear as a constant inertial rate input.

In accordance with the invention embodied within the optical rate sensor 300, certain deficiencies associated with optical rate sensors such as those described in the Carrington et al patent are substantially eliminated. The optical rate sensor 300 operates essentially as a closed-loop arrangement in that the driving voltage applied to the phase modulator 420 at any given instant of time will be a function of the computed Sagnac phase shift. To more fully understand this concept, FIG. 14 depicts the functional relationship between the intensity signal S at the output of monitor photodiode 314 and the modulator phase shift $P_B$ (or modulator drive voltage $V_M$), with the intensity signal being unbiased. As earlier explained with respect to the rate sensor described in the Carrington et al patent, the offset of the peak of the intensity signal which would occur at the origin for zero input angular rotation rate corresponds to the Sagnac phase shift. As earlier described with respect to Equation 9, and as substantially described in the Carrington et al patent, this peak offset is substantially independent of laser source wave length or intensity changes.

The functional relationship between the intensity signal S and the modulator phase shift $P_B$ as shown in FIG. 14 will exist in any passive ring interferometer and phase modulator combination having a configuration and operation similar to those shown in rate sensors 200 and 300, if the scanning rate of the phase modulator is sufficiently rapid relative to the rate of change of angular rotation of the passive ring.

Theoretically, a closed-loop system can then be utilized whereby the driving voltage applied to the phase modulator is controlled in a manner so that the phase modulator output would "offset" or negate the Sagnac phase. Such a theoretical closed-loop system is shown in system format in FIG. 15, with like numbered references corresponding to previously described elements of the system diagram shown in FIG. 13 and the optical rate sensor 300 shown in FIG. 12. Referring thereto, with appropriate A/D and D/A conversion, the CPU 384 (or any other type of controller elements) is utilized to generate the control variable u (representative of modulator drive voltage $V_M$) so as to maintain the modulator phase $P_B$ at a value corresponding to the Sagnac phase $P_S$. Information regarding the rate input $G_I$ is contained in the phase error signal $P_e$. In the system arrangement shown in FIG. 15, the optical rate sensor system therefore becomes a closed-loop system whereby the driving voltage applied to the phase modulator is now a function of the observed Sagnac phase shift $P_S$. As also shown in FIG. 15, the output of the "adder" function having the Sagnac phase $P_S$ and the modulator phase $P_B$ as inputs corresponds to a phase error $P_e$, after transfer through the previously described circuitry represented by block 436 and scale factor $K_p$.

However, several problems exist with regard to the implementation of a system such as that shown in FIG. 15. First, the system shown in FIG. 15 would not have a phase modulator scanning rate which would be substantially rapid relative to the rate of change of angular rotation $G_I$. Accordingly, the functional relationship between the intensity signal at the output of the monitor photodiode 334 and the non-reciprocal phase modulator phase shift $P_B$ would not accurately correspond to the wave form shown in FIG. 14. Secondly, and as apparent from FIG. 14, the system would be operating in a range whereby changes in intensity signal relative to changes in Sagnac phase shift $P_S$ or phase modulator voltage would be substantially minimal and non-linear, after transfer through the previously described circuitry represented by block 436 and scale factor $K_p$. That is, operation of the system would be theoretically near a zero slope location of the functional relationship between the intensity signal S and the phase modulator output $P_B$. Such operation would result in extremely inaccurate measurement capability.

However, in accordance with the invention, the closed-loop concept of control of the phase modulator would be substantially beneficial if combined with the concept of causing the system to operate in a manner so that the actual values of the intensity signal S occur only within the regions of the functional pattern shown in FIG. 14 where the intensity signal is a substantially linear function of the phase modulator output $P_B$ or phase modulator driving voltage $V_m$. Stated as simply as possible, a closed-loop operation can be achieved where the non-reciprocal phase shift $P_B$ resulting from the phase modulator is controlled in a manner so as to correspond to the Sagnac phase $P_S$, but with additional signal generation within the system so that the scanning rate of the modulator is rapid relative to the rate of change of inertial input $G_I$, and the system is caused to operate so that the intensity signal at the output of the monitor photodiode 334 is maintained within the linear regions of the functional relationship between the intensity signal and the phase modulator output $P_B$ and driving voltage $V_m$. It should be emphasized that within these linear regions, measurement accuracy is enhanced in that maximum changes occur in signal intensity in response to given changes in modulator phase shift or modulator driving voltage. More specifically, the square wave patterns of signals $A_1$ and $A_2$ cause the intensity signal to be maintained at this optimum point of maximum signal intensity sensitivity for substantially 100% of the time.

This concept of causing the intensity signal to essentially operate within the linear regions of the functional pattern shown in FIG. 14 is shown in the system diagram of FIG. 16. Referring thereto, the control variable u which is generated by the CPU 384 as a function of the inertial input rate $G_I$ is modulated as represented by modulator 442 prior to application as a control signal to the phase modulator. The modulation is such as to cause the phase modulator output $P_B$ to rapidly shift and alternate between the values $P_{R1}$ and $P_{R2}$ as shown in the wave pattern of FIG. 14. As earlier described, and in accordance with conventional communication sampling theory, intensity signal values obtained at zero or minimum sloped regions of the functional relationship between the intensity signal and the phase modulator do not substantially contribute to determination of the peak offset corresponding to the Sagnac phase shift $P_S$. However, by applying the modulation as described above, the intensity signal is forced to be maintained in the maximum slope regions of the functional relationship between the intensity signal and the phase modulator output. As also shown in the system diagram of FIG. 16, a demodulator 440 is included within the system for purposes of extracting the phase error $P_E$ from the modulated signal. It should also be noted that the CPU 384 shown in the system diagrams of FIGS. 15 and 16 can include means for generating a signal representative of an "estimated" inertial input rate $G_I$, in addition to means for generating the control variable u as a function of the inertial input rate. However, for purposes of understanding the concept of controlling the system in a closed loop mode, it should be emphasized that the CPU 384 could essentially be eliminated from the system control diagrams. That is, the phase error $P_e$ could be directly fed back to the modulator 442. Such an arrangement, however, would not provide any optimal or other estimation functions to more accurately determine the rate input $G_I$.

In accordance with the foregoing, the intensity signal at the output of the photodiode can be made to continuously operate in the linear regions of the pattern describing the functional relationship between the intensity signal and the phase modulator output. Accordingly, no substantial information is lost and no substantial reduction occurs in the signal to noise ratio as a result of intensity signal outputs in the non-linear or minimally sloped regions. In addition, with the closed loop control arrangement, relatively low frequency inertial input rates will not be aliased to DC in a manner so as to appear as constant inertial rate inputs.

In accordance with the foregoing description, it is a primary aspect of the invention to utilize an input signal to the modulator (corresponding to the driving voltage $V_m$) which will cause the intensity signal at the output of the monitor photodiode to dwell almost continuously at the maximum slope points of the pattern shown in FIG. 14 relating the intensity signal to the modulator phase shift $P_B$. The following paragraphs derive equations for a modulation voltage M(t) which can be applied to the phase modulator 420 shown in FIG. 12 so as to achieve a desired nonreciprocal modulator phase shift $P_B(t)$.

It can be shown that the intensity signal at the output of the monitor photodiode 334 can be written in accordance with the following:

$$I = I_0 [\cos^2(f(t-T) + (M(t-T) + M(t))/2] \cos^2((M(t-T) - M(t))/2) + P_S/2)$$ (Equation 13)

where M(t) is the instantaneous phase modulator driving voltage or proportional modulator phase, $P_S$ is the Sagnac phase shift, f is the frequency of the laser source, and T is the transit time of a wavelet around the optical fiber ring. Equation 13 can be re-written as follows:

$$I = I_0 I_f(f)[1 + [\cos(M(t-T) - M(t) + P_S)/2]$$ (Equation 14)

In accordance with Equation 14, the quantity that determines the intensity can be written as:

$$F = (M(t-T) - M(t) + P_S)_{MOD2\pi}$$ (Equation 15)

The actual non-reciprocal phase shift which is to result from the phase modulator 420 can be written as:

$$P_B(t) = [M(t-T) - M(t)]/2$$ (Equation 16)

Solving Equation 16 utilizing modulo arithmetic for M(t) (representing the present modulation signal) results in the following equation:

$$M(t) = (M(t-T) - 2P_B(t))_{MOD2\pi}$$ (Equation 17)

A modulation wave form in accordance with Equation 17 and which can accomplish achieving the intensity signal dwelling almost continuously at the maximum slope linear regions of FIG. 14 can be shown to be the sum of wave forms $A_1(t)$ shown in FIG. 17 and wave form $A_2(t)$ as shown in FIG. 18. Again, the period T represents a transit time of a wavelet around the ring. It can be noted that the wave form $A_1(t)$ is independent of the inertial input rate or Sagnac phase. The wave form $A_1(t)$ can be characterized as a periodic wave form which causes the intensity signal at the monitor photodiode to be shifted to the left and right in the abscissa direction relative to the value of the intensity signal corresponding to a phase modulator output equal to the Sagnac phase. The amplitudes of the wave form $A_1(t)$ determine the magnitude of the shift to the left and right.

If the inertial rate input was zero, the signal $A_1(t)$ would cause the intensity signal to dwell at the exact locations of maximum signal intensity change relative to changes in modulator phase shift or modulator driving voltage. However, the functional relationship between the intensity signal and the modulator phase shift will change as the inertial rate input and corresponding Sagnac phase shift changes or otherwise becomes non-zero. The signal $A_2(t)$ will, in part, maintain the intensity signal at the maximum sloped regions.

The wave form $A_2(t)$, being a function of the inertial input rate (or Sagnac phase shift) can be characterized as determining the "vertical" location of operation along the pattern shown in FIG. 14. That is, the primary goal of the wave form $A_2(t)$ is to cause a modulator phase shift $P_B$ which is essentially equal in magnitude and opposite in polarity to the Sagnac phase shift $P_S$. A simplified system diagram of the foregoing is shown in FIG. 19. It should also again be emphasized that the non-reciprocal phase shift of the intensity signal resulting from the phase modulator 420 is dependent in part on the change in magnitude of signal $A_2(t)$ over a time period corresponding to the transit time of a wave through the ring.

With respect to the generation of wave form $A_2(t)$, it is apparent from the foregoing that the actual inertial input rate $G_I$ cannot be utilized for purposes of generating the wave form $A_2(t)$. Instead, the wave form $A_2(t)$ is generated as a function of an estimate $G_I$ of the actual inertial input rate $G_I$. Correspondingly, and as also shown in FIG. 19, the wave form $A_1(t)$ represents the modulation of the voltage signal applied to the phase modulator 420. This same or similar signal can be essentially utilized as an input to the demodulator 360 shown in FIG. 12 for purposes of extracting the actual phase error between the Sagnac phase and the phase modulator output.

The system diagram shown in FIG. 19, with the implementation of the wave forms $A_1(t)$ and $A_2(t)$, where $A_2(t)$ is a function of the inertial input rate, represents a substantial advance over known optical rate sensors. However, several practical problems can exist in utilizing a system having a closed loop control arrangement such as that shown in FIG. 19. For example, with the use of a central processing unit or other elements employing digital signals, an A/D converter must be employed. Such a physically realizable converter will always have some noise associated therewith, resulting in finite output errors. For this and other reasons, and in accordance with the invention, the analog intergrator 364 as previously described with respect to FIG. 12 is employed. The integrator 364 can be characterized as an element which achieves containment of errors resulting from DC bias present in the A/D converter. That is, the integrator essentially bounds the error resulting from the A/D conversion process.

A simplified system diagram representative of the closed loop control utilizing the analog integrator 364 is shown in FIG. 20. Referring thereto, the Sagnac phase shift $P_S$ is added to the phase modulator output $P_{BMOD}$ representative of the phase modulator output in its modulated state. The resultant signal from this combination of Sagnac phase and phase modulator output is shown as being applied through a transfer function $K_p$ representative of the scale factors associated with the monitor photodiode and the transconductance amplifier and other circuit elements. The output from the photodiode and transconductance amplifier is then demodulated, with the resultant signal representative of the difference between the Sagnac phase and the phase offset resulting from the output of the phase modulator. This demodulated signal thus represents the phase error $P_e$ between the actual Sagnac phase and the phase offset resulting from the phase modulator output. This signal is then integrated (with the integrator 364 shown in LaPlace transform notation), and the resultant integrated signal IE, having parameters equal to "integrated rate" or "attitude", can then be applied through the A/D converter 372 and sample register 376 (shown in FIG. 12) as an input signal to the CPU 384. The CPU 384 can utilize this signal to determine an estimated inertial input rate $G_I$. In addition, the CPU 384 can be utilized as a controller for generating an output signal functionally related to the estimated rate input $G_I$. This output signal is applied through the D/A convertor 392 and hold circuit 396, and applied as an input signal to the waveform generator 400. The waveform generator 400 utilizes the input signal $F_2$ and the output from hold circuit 396 to generate waveform $A_2(t)$. The waveform $A_2(t)$ is then added to the previously-described wave form $A_1(t)$ to produce the requisite modulator input voltage so as to provide the desired modulated phase modulator output $P_B$.

It should be emphasized that with respect to the aspects of the invention as described in the foregoing paragraphs, the concept of utilizing circuitry to force the modulator phase shift to a value equal in magnitude and opposite in polarity from that of the Sagnac phase shift is substantially independent of any concepts associated with additional circuitry for optimally estimating the inertial input rate. That is, the primary purpose of the CPU 384 is to provide an optimal estimate of the rate input $G_I$. The basic principles of the invention as described in the foregoing paragraphs could be achieved in substantial part without necessitating the use of CPU 384.

For example, FIG. 21 is similar to FIG. 20 but depicts a symbolic system diagram showing an arrangement for forcing the modulation voltage to the requisite value for generating a non-reciprocal modulator phase shift equal and opposite to that of the Sagnac phase shift without applying the phase error through a CPU 384. Specifically, FIG. 21 shows the Sagnac phase shift $P_S$ generated as a result of the inertial input rate $G_I$ applied through block 430 which represents the physical parameters of the optical fiber ring. Within the interferometer, the system summing junction 432 essentially compares the Sagnac phase shift $P_S$ and the non-reciprocal modulator phase shift $P_B$ and, in system notation, generates a modulator phase error. The modulated phase error is symbolically applied through block 436 representing the physical characteristics of the photodiode and other circuit elements. The modulated phase error is then applied through demodulator 360, with the resultant output corresponding to the phase error $P_e$ representative of the difference between the Sagnac phase shift $P_S$ and the modulator phase shift $P_B$.

It should be noted that the output of the demodulator 360 is, in fact, a sinusoidal function of the difference between the Sagnac phase $P_S$ and the modulator phase $P_B$. That is, the demodulator output can be written as:

$$P_e = P_o \sin(P_S - P_B) \quad \text{(Equation 18)}$$

Where $P_o$ is the peak amplitude. However, for small differences between Sagnac phase $P_S$ and modulator phase $P_B$, the following approximation is true:

$$P_e \approx P_o(P_S - P_B) \quad \text{(Equation 19)}$$

Accordingly, to define the demodulator output in exact terms, the resultant output can be characterized as being proportional to the difference between the Sagnac phase $P_S$ and the modulator phase $P_e$ for relatively small differences therebetween.

As earlier described with respect to FIG. 20, the phase error is applied through an analog integrator 364, with the resultant output IE of the integrator best characterized as representative of the "attitude" error with respect to the true attitude of the optical rate sensor and the attitude indicated by the measurements defined herein. As shown in FIG. 21, the signal representative of the attitude error can be applied to various physical readout circuitry. In addition, this signal can also be applied to estimation circuitry or the like for purposes of various operations thereon. However, with respect to several of the basic concepts of this invention, it is also shown in FIG. 21 that this attitude error can be directly utilized as an input to waveform generator 400 which is utilized to generate the requisite wave form $A_2(t)$. A wave form generator capable of generating the requisite wave form $A_2(t)$ given the appropriate inputs is well known in the art.

In summary, the foregoing description relates to the principal concepts of the invention with respect to forcing the intensity signal at the output of the photodiode to dwell at maximum slope regions of the intensity signal relative to the modulator voltage or modulator phase shift. This intensity signal is produced by utilizing a closed-loop circuit arrangement whereby the modulation voltage is a function of the measured Sagnac phase and is generated as a modulated signal having a DC component substantially equal in magnitude and opposite in polarity to the Sagnac phase.

With respect to the specific modulation voltage, the voltage is generated as a function of two signals $A_1(t)$ and $A_2(t)$ as previously described herein. $A_1(t)$ is of a frequency proportional to the ring transit time with an amplitude equal to p/8 radians and a zero DC component. The wave form $A_2(t)$ is of a frequency directly proportional to the frequency of wave form $A_1(t)$ with an amplitude functionally related to the measured inertial input rate.

With respect to another aspect of the invention, it has been determined that it is preferable to utilize samples of the modulation voltage signal only during certain time periods of the wave form $A_2(t)$. Specifically, it is preferable to take these samples only after the positive step associated with the wave form $A_2(t)$. This concept is characterized as a "blanking" function in that samples are taken only during the time periods when the combined signals $A_1(t)$ and $A_2(t)$ contain the most correct "amount" of information. By utilizing these blanking intervals, the highest and "best" amount of information is utilized to generate the appropriate modulation voltage. The actual "blanking" interval is determined by the "on" time of the previously-described switch 342 as shown in FIG. 12. Referring specifically to FIGS. 17 and 18, the "on" period will correspond to a time period having a duration equal to the nominal ring transit time immediately following the positive going or rising edge of signal $A_2$. It is during this time interval that closed loop operation will be occurring with the intensity signal being passed through the switch 342. These intervals are shown in FIGS. 17 and 18. At other times, corresponding to the "blanking" intervals, the intensity signal S will be blocked by switch 342. These intervals are shown in FIGS. 17 and 18. It should also again be emphasized that it is the relative magnitude between the two levels of $A_2$ which determine the non-reciprocal phase shift applied to the intensity signal resulting from the input to the phase modulator 420 corresponding to signal $A_2$. Also, it is this relative amplitude which is a function of the inertial input rate in accordance with the invention. Further in accordance with the invention, it should be noted that the particular frequencies and signal magnitudes shown in FIGS. 17 and 18 are not of primary importance. That is, other time periods and absolute magnitudes can be utilized without departing from the basic principles of the invention.

With respect to another aspect of the invention described above, the use of the analog integrator 364 is advantageous in reducing potential errors resulting from various physical components of the optical rate sensor. Accordingly, the use of the analog integrator 364 can be characterized as a means for containing the error source associated with the system. The analog integrator essentially "saves up" the average of the information. It should also be noted that to the extent digital signal processing is utilized in the system, the analog integrator 364 can substantially reduce the computer "throughput" requirement and bound the errors which may result from A/D conversion.

It should also be emphasized that the foregoing circuit arrangement is substantially advantageous over the use of ramp or similar modulator input voltage signals in that such ramp signals require that the modulator must be driven over a wider dynamic ranges.

In the foregoing description, it was shown that a direct analog arrangement could be employed for purposes of controlling the modulation voltage so that the phase modulator output would essentially "track" the Sagnac phase as it changes in correspondence to changes in inertial input rate. However, in any physically realizable system, random input disturbances will exist with respect to the circuit components. In addition, it is the intent of the optical rate sensor to provide an observable determination of the inertial input rate and the angular position of the rate sensor. Accordingly, various types of measurements must be taken during operation of the rate sensor. As well known to any person skilled in the art of system design, noise is associated with measurement processes. Furthermore, for practical use of the optical rate sensor, determination of the inertial input rate and incremental angle of the rate sensor should be provided in digital format. Accordingly, the analog signals shown in partial circuits such as the circuit in FIG. 21 actually require A/D conversion of certain observed signals. For these reasons, the CPU 384 or similar digital signal readout circuitry are preferably employed. The CPU 384 requires that the output signal from the analog integrator 364 be converted to digital format by the A/D converter 372.

In accordance with the foregoing, certain random errors can exist within determinations of the integrated phase error represented by the output signal from the analog integrator 364. Such errors can be caused, for example, by A/D quantization noise, laser diode intensity noise, shot noise within the monitor photodiode, Johnson noise within the analog electronics and D/A uncertainty within the basic sample voltage steps from the intensity signal S. To at least partially overcome these and other random errors, an optimal estimation sequence can be utilized within the CPU 384 to better determine the measured phase error signal (as converted to digital format) from the analog integrator 364 and the actual inertial input rate and incremental angle.

Since the statistical parameters of the output signal from the analog integrator 364 representative of phase error (mean, type of disturbance noise, etc.) can be readily determined, known estimation techniques can be utilized. For example, an optimal filter can be configured which will provide optimal estimates of the true value of the analog integrator output signal representative of phase error, even with substantially noisy measurements of this phase error signal. Basic processes relating to optimal filters are relatively well-known in the art and, for example, are described in texts such as *Probability, Random Variables and Stochastic Processes*, Papoulis (McGraw-Hill 1965), and *Estimation Theory With Application of Communications and Control*, Sage & Melsa (McGraw-Hill 1971).

Essentially, an optimal filter can be utilized to estimate, on the basis of noisy measurements, the value of inaccessible state variables of systems driven by stochastic input disturbances. In an optical rate sensor in accordance with the invention, the optimal filter can be utilized to estimate the true value of the analog integrator phase error signal by combining past and present measurements of this signal such that the mean square error between true and expected values thereof is minimized. The utilization of such optimal filter techniques is advantageous over simple averaging processes in that it takes into account not only additive measurement noise of the phase error signal, but also the statistics of the vehicle dynamics.

In addition to the concept of optimal filtering and estimation, it is also advantageous to develop an optimum "controller" for the closed loop process. That is, given the state variables of a system, optimum feedback coefficients to control the phase modulator voltage are derived. However, this derivation is based on the assumption that state variables are accessible and can be measured exactly. In an actual system having noise and inaccessible state variables, the variables are estimated and used as if they were the actual state variables to generate appropriate optimal control signals.

To first explain and derive the optimal control arrangement for an optical rate sensor in accordance with the invention, the basic system equations well known to those skilled in the art of system design are collectively shown below as Equations 20:

$$\dot{x} = Ax + Bu$$

$$y = Cx \qquad \text{(Equations 20)}$$

where x represents inaccessible state variables, u represents the control input and y represents control and measurement outputs. It should be emphasized that each of these variables, along with the functions A, B and C can represent matrix values. In addition, it should also be emphasized that the variables x, y and u are functions of time. The general system representation for the basic system equations defined in Equation 20 is shown in FIG. 22.

To represent, in a simplified manner, the results of random input disturbances and measurement noise, the input disturbances can be included by adding a noise input w to the control input u. In addition, a measurement noise vector v is added to the output expression for y so that the basic system equations now become:

$$\dot{x} = Ax + B(u + w)$$

$$y = Cx + v \qquad \text{(Equations 21)}$$

The system representation utilizing input disturbances and measurement noise is shown in FIG. 23. It should be emphasized that the foregoing is representative of a "multiple-output" system. The system outputs can be divided into two classes, namely control outputs and measurement outputs. Control outputs can be characterized as physical quantities that the system is to control, while measurement outputs can be characterized as physical quantities which may be directly measured in the system but which are not variables under actual control.

It should also be noted that the equations set forth above assume that the input disturbances and measurement output noise are additive. Although noise signals can affect a system in other than an additive manner, such additive noise is the most common and essentially is required to preserve the linearity and mathematical tractability required to formulate an optimal controller.

With the system as shown in FIG. 23, it is clear that control can only be exerted through a noisy input channel. Furthermore, observations of the outputs y can be made only through the noisy measurement channel. In accordance with the foregoing, the basic system control problem is to find a closed-loop procedure for generating the optimal control input u in terms of the noisy output y. With certain restrictions on the input and output disturbances, the foregoing system control problem can be characterized as two somewhat separate problems, characterized as the control and estimation phases.

With respect to the control phase of the solution for the closed-loop procedure, it can be assumed that all state variables are available, and basic linear control procedures can be employed. That is, optimal feedback coefficients can be determined, assuming that all state variables are capable of exact measurements. However, to use these results, it is necessary to reconstruct these state variables in some fashion from the noisy measurements which are the only actual outputs of the system. To accomplish this estimation phase, a basis system substantially comprising a Kalman filter can be utilized. That is, utilizing the noisy measurements y as inputs, the filter is employed to generate estimates of all state variables. These estimates are symbolized by $\hat{x}$ to indicate that the same are estimates of the state variables, rather than true values of the variables.

As well known to those involved in system design theory, the optimal filter determined as described in the subsequent paragraphs comprises a somewhat simple structural configuration which closely resembles the original system being filtered. In addition, the procedures utilized to solve the estimation problem by determining the optimal filter are substantially closely related to the techniques utilized to solve the conventional control problem. It is common in system control theory to characterize this procedure as the so-called "dual control problem."

Turning first to the optimal controller portion of the problem, an extremely basic and simplified description thereof is provided in the subsequent paragraphs. For purposes of determining "optimal" performance, it is clearly necessary to specify some method for determining the quality of performance of a system. In modern control system design well known to those skilled in the art, this is most often done by means of an integral performance index in the following form:

$$PI = \int_{t_i}^{t_f} L(x,u,t)dt \qquad \text{(Equation 22)}$$

A system is characterized as optimal over the time interval $t_i$ to $t_f$ if the value of the performance index PI is a minimum or maximum, depending on the type of performance index chosen. Assuming the performance index is to be minimized, the time $t_i$ can be characterized as the initial time and the time $t_f$ can be characterized as the final time of the control period. The integrand of the performance index is normally assumed to be a positive definite function of x, u and t. Since this integrand is always greater than zero, the value of the performance index is a monotonically increasing function of t in the interval $t_i < t < t_f$. The problem can thus be characterized as one of finding the optimal control u which translates the system from some given initial condition or state to some terminal condition or final state while minimizing the integral performance index. The trajectory corresponding to the optimal control or the optimal-control law is typically characterized as the optimal trajectory. The optimal-control law can be written as the following:

$$u = k(x(t),t) \qquad \text{(Equation 23)}$$

The distinction between the optimal control u(t) and the optimal control law as specified in Equation 23 is important, especially from a practical point of view. If the control u is known only as a function of time, i.e. as an optimal control, then the utilization of such control implies an open-loop system. In practice, however, one is usually interested in finding not only the optimal control but also the optimal-control law which enables one to generate u(t) from x(t) in a true feedback sense.

Several methods are well-known in the art of system control design for purposes of determining optimal control. For example, calculus of variations, Euler equations, and the state function of Pontryagin are well known and commonly utilized. The use of the latter is often characterized as a Pontryagin procedure for solving the general optimal-control problem.

An alternative approach can also be utilized, whereby the Pontryagin method can be combined with concepts associated with the second method of Liapunov. This alternative approach can eliminate two major problems associated with the Pontryagin method. First, it can remove the necessity of solving a two-point boundary problem. Secondly, the approach can yield a closed-loop solution in the form of an optimal control law for the initial value of u as a function of x and t.

However, as also well known to those skilled in the are of system design, this closed-loop combination approach can also present substantial difficulties. Among these difficulties is the necessity of solving a non-linear partial differential equation known as the Hamilton-Jacobi equation. There is, however, one class of problems of significant practical importance for which it is possible to solve the Hamilton-Jacobi equation in a relatively simplistic manner.

This class of problems can be defined as one where the performance index can be defined as follows:

$$PI = \int_0^\infty (x^TQx + u^TRu)dt \qquad \text{(Equation 24)}$$

This performance index PI can be characterized as a quadratic performance index, with the matrices Q and R being symmetric, and with Q being at least positive semi-definite and P being positive definite. This problem and a solution associated therewith is commonly characterized as the linear control problem with quadratic costs or, simply, as the linear control problem.

The subsequent paragraphs initiate a solution of the linear control problem with a direct application of the Hamilton-Jacobi approach. However, prior to applying this approach, the problem can be somewhat generalized by assuming that the upper limit on the performance index is a finite time T rather than infinity. The performance index then becomes:

$$PI = \int_0^T (x^TQx + u^TRu)dt \qquad \text{(Equation 25)}$$

The first step in the application of the Hamilton-Jacobi procedure is to formulate what is commonly known in the art of optimal system control as the Pontryagin "H" function. For the performance index as shown in Equation 25, this function becomes:

$$H(x,u,DV,t) = DV^T(Ax+Bu) + x^TQx + u^TRu \qquad \text{(Equation 26)}$$

The value DV can be characterized as the gradient of V(x,t) which, in turn, is the value of the performance index PI when evaluated along an optional trajectory which begins at x(t).

Upon setting the partial differentiation of the Pontryagin "H" function with respect to u equal to zero, the optimum value of the control variable u is given as follows:

$$u = -\tfrac{1}{2}R^{-1}B^TDV(x,t) \qquad \text{(Equation 27)}$$

From the foregoing, it is seen that R must be required to be positive definite so that $R^{-1}$ will always exist. In more physical terms, if R were only semi-definite, some elements or linear combinations of the elements of the control vector could become infinite without affecting the value of the performance index.

If the foregoing result is substituted into the equation for the Pontryagin "H" function as shown in Equation 26, the optimal Pontryagin state function can be derived. From this derivation, the Hamilton-Jacobi equation can then be written as a particular partial differential equation. Accordingly, to find the optimal control law, it is necessary to solve this derived partial differential equation.

In accordance with conventional control system design, this differential equation is typically solved by assuming that the solution is in a time varying quadratic form, and by then showing that such a solution satisfies the Hamilton-Jacobi equation. The solution can be initiated by assuming that V(x,t) is given by:

$$V(x,t) = x^T K(t) x = \int_t^T (x^T Q x + u^T R u) dt \quad \text{(Equation 28)}$$

where K(t) is a positive definite symmetric matrix for all t<T and K(T) is equal to 0. This latter condition is due to the boundary conditions on V(x,t), since with x(T) free it is obvious that V(x,T) is equal to zero independent of x. This requirement that K(t) be positive definite is necessary since the value of the integrand of the performance index is a positive definite function.

For this particular V(x,t) the function DV and the partial differential of V with respect to t can be derived. The result of these derivations can then be substituted into the Hamilton-Jacobi equation to arrive at the foregoing:

$$x^T[2K(t)A - K(t)BR^{-1}B^T K(t) + Q + \dot{K}(t)]x = O \quad \text{(Equation 29)}$$

For Equation 29 to be satisfied, it is necessary that K(t) satisfy the following differential equation:

$$K(t) + Q - K(t)BR^{-1}B^T K(t) + K(t)A + A^T K(t) = O \quad \text{(Equation 30)}$$

This differential equation must be satisfied subject to the boundary condition that K(T) be equal to zero. This equation is commonly referred to as the matrix Riccati equation.

General methods are available for obtaining an analytic solution for K(t). However, such solutions are typically extremely difficult for any systems of higher than second order. However, numerical solutions for K(t) can readily be determined on a digital computer. Such a function is provided by integrating the Riccati equation backward in time from a known terminal condition over a particular time interval of interest.

Once K(t) is known for the interval of interest, the optimal control law can be obtained and written as follows:

$$u = -R^- B^T K(t) x \quad \text{(Equation 31)}$$

Equation 31, with respect to conventional control system optimal control, is often written in the following form:

$$u^*(x,t) = -S^T(t) x \quad \text{(Equation 32)}$$

where $u^o(x,t)$ is the optimal control variable and $S^T(t)$ is:

$$S(t) = K(t) B R^{-1} \quad \text{(Equation 33)}$$

The elements of the matrix K(t) are commonly referred to as the feedback coefficients, since the optimal control consists of a time-weighted linear combination of the state variables. This concept is relatively important, since it indicates that in an optimal system all the state variables are to be fed back, instead of merely feeding back the output as is customary in classical control theory. A graphical system representation of the optimal system and optimal controller described above is shown in FIG. 24.

It should also be noted that if the value T approaches infinity, the K matrix becomes constant, thereby simplifying its determination. The fact that K is constant can be readily established by the simple argument that V(x,t₁) must be equal to V(x,t₂) for any finite $t_1$ and $t_2$. This must be true, since the plant and performance criteria are time invariant, and therefore a finite translation of the time scale does not affect the problem.

This constant K matrix, often designated as $K_o$, may be found through several procedures. One procedure is to perform a limit operation on the solution for the time varying problem. In order to utilize this approach, the time varying solution of the Riccati equation can be thought of not only as a function of time, but also as dependent upon the initial and final value of the time value of interest. In other words, $K_0$ is the initial value of the K matrix for the control interval zero to T as T increases without bound. For this case, the optimal feedback control law then becomes:

$$u^*(x) = -R^{-1} B^T K_o x$$

or $u^*(x) = -S^T x$ where $S = K_o B R^{-1}$ \quad (Equations 34)

The elements of the matrix S are once again referred to as feedback coefficients, since the optimal control law consists of linear combinations of the state variables fed back to form the optimal control. It should be noted that there is a substantial difference in the nature of the optimal control represented by Equation 34 as compared to Equations 31-33, in that Equation 34 comprises feedback coefficients which are constant, and the implementation of the optimal control law is thus considerably easier.

It should also be emphasized that other procedures can be utilized in determining the optimal control law as described above. For example, such procedures include the second method of Liapunov and also a commonly-known procedure utilizing frequency-domain criteria for optimality. Again, these optimal control design procedures are well known to those involved in the art of system design.

Returning again to the concept of the dual control problem of control and estimation, it is again noted that in the control phase of the solution, it can be assumed that all of the state variables are available, and the techniques described in the previous paragraphs can be utilized for determining the optimal feedback coefficients. Also as previously described, in order to utilize the results of determining the optimal controller, it is necessary to reconstruct its state variables in some fashion from the noisy measurements which are the only actual outputs of the system. This reconstruction process is accomplished by means of the Kalman filter. That is, utilizing the noisy measurements of y as inputs, the Kalman filter is utilized to generate estimates of all state variables. Also as previously described, these estimates are symbolized by x to indicate that they are only estimates of the state variables rather than true values of the state variables.

Still further, this Kalman filter takes on a relatively simple structure which closely resembles the original system comprising the optimal controller. In addition, techniques utilized to solve the estimation phase of the problem (i.e. determining the Kalman filter itself) are very closely related to the techniques associated with solving the controller problem.

In extremely simplified terms, these estimates of the state variables are utilized as if they were the actual state variables in order to generate the optimal control. That is, utilizing the foregoing description, the system then becomes:

$$u = -S^T \hat{x} \qquad \text{(Equation 35)}$$

This system is symbolically represented in FIG. 26. It should be noted that the validity of separating the dual control problem into the two separate phases of control and estimation can be characterized as a result of the linearity of the system, the nature of the performance index and the character of the input disturbances and the measurement noise.

First, it can be assumed that the noise signals w and v are a stationary Gaussian processes with zero mean. In addition, the signals w and v are assumed to be independent, i.e.:

$$E(w(t)v(t+T)) = 0 \qquad \text{(Equation 36)}$$

Another requirement associated with this derivation is that the input and output disturbance noise be white noise so that the correlation functions can be written as:

$$E(w(t)w^T(t+T)) = Qz(T)$$

$$E(v(t)v^T(t+T)) = Rz(T) \qquad \text{(Equations 37)}$$

where z(T) is the Dirac delta function. For example, the element in the ith row and jth column of $\overline{Q}$ is equal to:

$$Q_{ij} = E(w_i(t) w_j(t+T)) \qquad \text{(Equation 38)}$$

It is not uncommon for various elements of w and v also to be uncorrelated, so that $\overline{Q}$ and $\overline{R}$ become diagonal. In this case, the elements of $\overline{Q}$ and $\overline{R}$ may often be determined by experimental means. In addition it should be noted that it is not necessary to know the absolute value of any of the elements, but only the relative magnitude of the elements.

Of the requirements described above for w and v, the white noise requirement is perhaps the most difficult to justify on a practical basis. That is, no actual signal can ever satisfy the white noise assumption. However, if the signal's frequency spectrum is appreciably flat out to a frequency one or more decades beyond the crossover frequency of the system, it can be approximated by white noise with no practical loss of accuracy. From this view point, it is particularly easy to justify the white noise assumption for the optical rate sensor control system.

Of primary importance in allowing the separation of the control and estimation phases of the dual control problem is the Gaussian nature of the input and output noise. This fact can be related to two features of Gaussian signals: (1) any linear operation on a Gaussian signal yields a Gaussian signal; and (2) any Gaussian signal is completely described by its means and variance. Since a Kalman filter provides an unbiased minimum-variance estimate of the state vector, it is theoretically the best filter that can be utilized for the estimation phase.

With the foregoing as background information, the solution of the estimation phase of the stochastic problem can now be derived. Simply stated, the solution consists of the definition of a linear dynamic system, substantially similar to the original system, whose input is the noisy measurements y and whose output is x as follows:

$$\dot{\hat{x}} = A\hat{x} + \overline{S}(y - C\hat{x}) + Bu \qquad \text{(Equation 39)}$$

where $\overline{S}$ can be defined as:

$$\overline{S} = \overline{K}_o C^T R^{-1} \qquad \text{(Equation 40)}$$

and with $\overline{K}_o$ being the steady state solution of a matrix Riccati differential equation as follows:

$$\dot{\overline{K}} = A\overline{K} + \overline{K}A^T - \overline{K}C^T R^{-1} C\overline{K} + BQB^T \qquad \text{(Equation 41)}$$

In Equation 41, the steady state value is found by integrating Equation 41 forward in time from the initial condition $\overline{K}(0) = E(x(0))x^T(0)$. In this instance, the initial state x(0) is treated as a random variable with Gaussian distribution and a mean equal to zero. The value of $\overline{K}_o$ is independent of the initial conditions on $\overline{K}$ and $\overline{K}(0)$ and can therefore be set to any value if only $\overline{K}_o$ is of interest. The initial condition $\hat{x}(0)$ is set equal to $E(\hat{x}(0)) = 0$ and this system is graphically represented in FIG. 26, primarily for purposes of comparison with FIG. 24.

In brief and relatively simplistic terminology, the optimal filter provides an error signal which is generated by subtracting the estimated output $\hat{y}$ from the actual output y. Thereafter, with $\overline{S}$ as the input matrix, this error signal is used as an input to a model of the original system. Two features of this system can be observed: (1) the structure of the system is relatively simple and well-defined; and (2) the filter structure closely resembles that of the original system. In addition, the mathematical procedures utilized in determining the filter, e.g., solving a matrix Riccati equation, are relatively similar to those utilized for the solution of the optimal linear control phase of the dual control problem.

The similarity between the techniques associated with the optimal control and those associated with the estimation phase can be clearly shown by again considering the following equations:

$$S = K_o B R^{-1}$$

$$-\dot{K}(t) = A^T K(t) + K(t)A - K(t)BP^{-1}B^T K(t) + Q \qquad \text{(Equation 42)}$$

which yield the optimal control for the system defined as follows with the corresponding performance index:

$$\dot{x} = Ax + Bu \qquad \text{(Equations 43)}$$

$$PI = \int_0^\infty (x^T Q x + u^T R u) dt$$

These equations clearly are substantially comparable to Equations 39 and 40. With a study of this comparison, it can be seen that the $\overline{S}$ matrix may be obtained as the feedback coefficient matrix of a control problem with the system described by the following equations, with time running backward and with the following performance index:

$$x = A^T x + C^T u \qquad \text{(Equations 44)}$$

$$PI = \int_0^\infty (x^T(BQB^T)x + u^T Ru) dt$$

The system described by Equations 44 is commonly referred to as the dual of the original system. In terms of this dual control problem, it is possible to utilize the conventional optimal control techniques for the determination of the elements of $\bar{S}$. Since the primary mary concern is only the steady state solution of Equation 41, the value $\bar{R}$ in Equation 41 can be set to zero, thus forming a reduced Riccati equation.

In view of the duality of this control problem, it can readily be seen why it is not particularly important to know the absolute magnitude of each element in $\bar{Q}$ and $\bar{R}$. Since $\bar{Q}$ and $\bar{R}$ determine the performance index in the dual problem, only their relative magnitudes are important, as is the case for Q and R.

In accordance with the foregoing, the complete optimal structure for the stochastic control problem is shown in FIG. 27. The noisy measurements of y are utilized by the optimal filter structure to generate $\hat{x}(t)$. In terms of this estimate of the system's state, the optimal control is formed by the use of the feedback control matrix S.

It should also be noted that the foregoing description of optimal filters has assumed that the "plant" and "output" equations are non-time varying. However, this is not a necessary assumption. In addition, it is possible to allow the correlation matrices $\bar{R}$ and $\bar{Q}$ to be time varying and for the control and observation interval to be finite. In all of these cases, the $\bar{S}$ matrix becomes time dependent, and one must solve and store the complete solution of interest.

Applying the foregoing considerations to the optical rate sensor 300, it can first be noted that an open-loop system diagram of the rate sensor can be represented as depicted in FIG. 28. In FIG. 28, the control input u can be characterized as a modulator voltage which is to be applied to the phase modulator 420. The state variable x can be characterized as a vector comprising the actual output of the analog integrator (IE) and the actual inertial input rate $G_I$. For purposes of deriving the optimal controller and filter, the actual Sagnac phase $P_s$ can be substituted for the input rate $G_I$, because they are directly related by the scale factor $K_s$ representative of the physical parameters of the interferometer.

To represent random input disturbances and measurement noise associated with the A/D converter 372, the system representation of FIG. 28 can be modified in the manner shown in FIG. 29. Referring specifically to FIG. 29, the A/D converter 372 has been replaced by a summing junction 448 representative of an additive measurement noise vector v(t) which will be referred to herein as v. Correspondingly, additive input noise is represented by the summing junction 450 having a noise vector w(t) applied thereto. It should be noted that the representation of additive noise resulting from input noise (from the amplifier, demodulator, etc.) is shown in a manner slightly modified from the general representation of FIG. 23. However, the concepts associated with deriving the optimal controller and filter for the optical rate sensor substantially correspond to the general concepts previously described herein.

To derive the specific optimal controller and filter, the general system equations can be written as follows:

$$\dot{x} = Ax + Bu + w$$

$$y = Cx + v \quad \text{(Equations 45)}$$

where x is a vector having state variables IE and $P_s$, u is a scalar representing the control variable corresponding to the phase modulation voltage, y is the observed or "noisy" values of the analog integrator output and the Sagnac phase, w is a scalar representative of input noise, and v is a scalar representative of measurement noise. The matrices A, B, C, and D, can be written as follows:

$$A = \begin{vmatrix} 0 & K_d \\ 0 & 0 \end{vmatrix}$$

$$B = \begin{vmatrix} K_d K_m \\ 0 \end{vmatrix}$$

$$C = [1 \ 0]$$

[Equations 46)

The matrix A is commonly referred to as the "system dynamics" matrix. Matrix B is the "control" matrix, and C is the "measurement" matrix.

In accordance with the prior discussion, a "performance index" is defined as follows:

$$PI = \int_o^\infty (x^T Q x + u^T R u) dt \quad \text{(Equation 47)}$$

with Q being equal to the "state" weighting index and R being equal to the control weighting index. To minimize the performance index, the control variable u is determined as:

$$u = -R^{-1} B^T K_o x \quad \text{(Equation 48)}$$

where $K_o$ is the controller gain matrix. The controller gain matrix $K_o$ is computed from the following differential equation (i.e. the matrix Riccati equation) corresponding to Equation 30:

$$\dot{K}_o = -AK_o - A^T K_o + K_o B R^{-1} B^T K_o - Q \quad \text{(Equation 49)}$$

Setting $\dot{K}_o$ equal to zero and solving Equation 49 for the controller gain results in the following:

$$u = [-(Q/R)^{\frac{1}{2}} - 1/K_m] x \quad \text{(Equation 50)}$$

To derive the appropriate filter for optimal estimation, the system representation shown in FIG. 27 is utilized, with the estimated state vector $\hat{x}$ utilized as an input to the optimal controller. To derive the filter, the previously-described Equations 39 and 40 are repeated:

$$\dot{\hat{x}} = A\hat{x} + S(y - C\hat{x}) + Bu$$

$$y = Cx \quad \text{(Equations 51)}$$

where $\bar{S}$ is the steady state Kalman gain matrix. With the parameters of the state variables as previously described, the Kalman gain matrix is a vector having gains $K_1$ and $K_2$. Assuming A, $\bar{S}$, C and B are constant, Equation 51 can be written in LaPlace notation as follows:

$$s\hat{x} = A\hat{x} + S(y - C\hat{x}) + Bu \quad \text{(Equation 52)}$$

The general transfer function can then be written as:

$$\hat{x} = [sI - A + SC][Sy + Bu] \quad \text{(Equation 53)}$$

where I is the identity matrix.

For the optimal filter, the vectors and matrices of Equation 53 have the following values:

$$x = \begin{vmatrix} \hat{IE} \\ \hat{P}_s \end{vmatrix}$$ (Equations 54)

$$A = \begin{vmatrix} 0 & K_D \\ 0 & 0 \end{vmatrix}$$

$$B = \begin{vmatrix} K_D K_M \\ 0 \end{vmatrix}$$

$$C = [1 \ 0]$$

$$S = \begin{vmatrix} K_1 \\ K_2 \end{vmatrix}$$

It should be noted that $K_D$ and $K_M$ represent the "modeled" values of $K_d$ (demodulator gain) and $K_m$ (phase modulator gain), respectively. The transfer function for the estimated variables $\hat{IE}$ and $\hat{P}_s$ can now be written as:

$$\hat{IE} = [(sK_1 + K_2 K_D)y + sK_D K_M u]/[s^2 + K_2 s + K_2 K_D]$$

and $$\hat{P}_s = [sK_2 y - K_2 K_D K_M u]/[s^2 + K_1 s + K_2 K_D]$$ (Equations 55)

The optimal control now becomes:

$$u = -[\hat{IE}(Q/R)^{\frac{1}{2}} + \hat{P}_s/K_M]$$ (Equation 56)

An optimal controller and filter in accordance with the invention in the foregoing description is shown in FIG. 30. The optimal filter and controller shown in FIG. 30 can be provided by digital processing techniques and implemented through the use of CPU 384 as will be described in subsequent paragraphs herein.

It should be noted that by increasing the ratio of Q/R, the controller is caused to "weight" the filter state estimated variables more heavily than the control "effort." Accordingly, as this ratio is increased, the state error would be expected to be reduced. Similarly, as the ratio of Q/R is decreased, the control effort becomes dominant over state variable estimation.

In the optimal filter and controller as shown in FIG. 30, two transfer functions are of particular interest. Of primary importance is the transfer function $y/G_I$. This function gives the scaling of the measurement vector y relative to the Sagnac phase shift $P_s$. Also of importance is the ratio of the estimated Sagnac phase shift $\hat{P}_s$ relative to the actual Sagnac phase shift $\hat{P}_s$. With a mathematical derivation of these transfer functions utilizing LaPlace notation, it can be observed that for a "step" in the actual Sagnac phase $P_s$, the measurement y will converge to the value $K_1/K_2$. Correspondingly, it can also be noted that the overall transfer function relating the estimated Sagnac phase $\hat{P}_s$ to the actual Sagnac phase $P_S$ will have a DC gain of unity. Accordingly, the estimated Sagnac phase should be equal to the actual Sagnac phase for a step input.

It should be emphasized that of prime importance in the design and implementation of an optimal controller and filter in accordance with FIG. 30 is the transient response of the integrator due to step changes in actual inertial input rate. This transient response will be dependent upon the ratio of the square root of Q/R. For example, with Q equal to zero (the situation of essentially no estimation), the measurement y will essentially remain at a fixed value in response to the transient. For Q/R greater than zero, the integrator value will decrease with time, thus indicating that the estimate of the Sagnac phase $\hat{P}_s$ is held on a digital integrator within the Kalman filter.

Although the foregoing implementation of an optical rate sensor in accordance with the invention provides substantial advances over known rate sensors, an additional problem inherent to any type of rate sensing device having applications such as aircraft and missile guidance is the problem of appropriate dynamic range. That is, missile and similar navigation systems require substantial accuracy over a wide dynamic range of rotation rates. For example, in a conventional missile system, rotation rates can potentially vary between 1000° per second to 1° per hour, i.e. a range ratio of $3.6 \times 10^6$ to 1, assuming constant resolution within the range. When a measurement technique such as digital sampling is utilized to estimate the magnitude of the intensity signal output from the photodiode, a 22-bit (plus sign) binary word must be utilized for purposes of analog to digital conversion. The necessity of such large scale data words is prohibitive to the use of small scale and high speed A/D converters as required for aircraft and missile guidance control systems. Another problem associated with the requisite wide dynamic range pertains to the signal to noise (S/N) ratio. In accordance with conventional communication theory, a 131 db S/N ratio is required for a $3.6 \times 10^6$ dynamic range. In many physically realized passive ring interferometers such as that shown in rate sensor 100, the S/N ratio will actually be closer to a value of 75 db.

The problem of dynamic range at the input of an optical rate sensor in accordance with the invention is solved in part by the use of optimal filtering which serves to improve the resolution of the signal in the presence of noise due to intensity fluctuations and sampling truncation. With respect to the requisite number of digital to analog (D/A) converter states for purposes of converting the estimated phase modulation input voltage level, the problem of the wide dynamic range still remains. However, in accordance with one aspect of the invention, this problem can be substantially alleviated by utilizing a non-linear digital output from the optimal controller and filter as described in subsequent paragraphs herein.

To explain the foregoing, the variable $e_i$ is characterized as the error in the measurement of inertial input rate during the ith sample period. Accordingly, the error in the phase angle, characterized as $P_e$, can be written as follows:

$$P_e = \sum_{i=0}^{t/T} e_i T$$ (Equation 57)

where T is the output sample period.

It can be shown that if the standard deviation of the error in angular rate measurement $e_i$ is approximately 80° per hour, with a sample period of T equal to 0.005 seconds, then the standard deviation of the phase error of angel $P_e$ is approximately equal to 0.1° at the end of one hour.

It can further be shown that the quantization of the output angular rate does not have to be less than the noise output, i.e. 80° per hour. This can be shown to be true since the probability density function (or frequency distribution function) can be assumed constant for the noise output of the angular rate measurement error over a specific range in accordance with the following:

$$PDF(e_i) = 1/LSB \qquad \text{(Equations 58)}$$
$$-LSB/2 < e_i < LSB/2$$
$$0 \text{ elsewhere}$$

where LSB defines the "least significant bit." In accordance with the foregoing, the variance of the angular rate measurement error is given by the following:

$$\delta_{e_i}^2 = 1/LSB \int_{-\frac{LSB}{2}}^{\frac{LSB}{2}} e_i^2 PDF(e_i) de_i = LSB^2/12 \qquad \text{(Equation 59)}$$

The standard deviation for the angular rate measurement error is thus equal to the value of the least significant bit (LSB) divided by the square root of 12.

Accordingly, if the LSB was 80° per hour (as an example) and the maximum rate of measurement was ±1000° per second, the dynamic range of the output would be given by the following:

$$[2000°/sec \times 3600 \ sec/hr]/80°/hr = 0.9 \times 10^5 \qquad \text{(Equation 60)}$$

The value shown in Equation 60, indicating a dynamic range of approximately $0.9 \times 10^5$ can be substantially achieved with a 16-bit digital to analog (D/A) converter. Accordingly, a 16-bit output appears to be sufficient at low rates. That is, if a bias error with respect to the phase modulator input voltage is to be achieved which will result in a standard deviation of the phase angle error $P_e$ being no greater than 0.1° per hour, then the least significant bit for the quantization of the angular rate measurement need not be less than 80° per hour.

Correspondingly, at high angular rates, a significant goal to achieve with respect to phase bias error is to have a scale factor error of less than 200 "parts per million" (PPM). Such a scale factor can be achieved through the use of a D/A converter having less than 16-bit resolution. That is, as the inertial input rate increases, the number of bits required to define or otherwise indicate the input rate as a binary coded signal will also increase. However, with a scale factor error of 200 PPM, the information present in the least significant bits will be within the range of acceptable noise. The greater the input rate, the greater the number of least significant bits which will be within the noise range. Accordingly, for inertial input rates of, for example, greater than 1.4° per second, the scale factor error of 200 PPM (which represents an increasing phase error as the input rate increases) will result in the "non-noise" portion of the binary representation of the rate having no more than 16 bits.

In accordance with the foregoing, appropriate resolution over a wide dynamic range can be achieved through the use of 16-bit D/A conversion if the particular bit range can be varied. To achieve this function, digital processing techniques can be implemented so as to essentially "strip" the most significant bits from the computation of the phase modulator voltage control variable u prior to D/A conversion. A system diagram of the optimal controller and filter previously shown in FIG. 30 is shown in FIG. 31 with the requisite "most significant bit" (MSB) stripper or "round-off" operation. Again, in accordance with the foregoing, the 16 most significant bits of the phase modulator voltage control variable can be utilized, since the least significant bit of the chosen 16 bits will still be representative of a quantization of the angular rate measurement which will include some noise error.

Returning again to FIG. 12, the entirety of the optical rate sensor 300 with respect to processing of the intensity signal detected by the monitor photodiode 334 will now be described. As earlier described, the intensity signal is "sampled" by switch 342 and applied to the high pass filter 356. The resultant filtered signal is applied through the demodulator 360, with the demodulated signal applied as an input to the analog integrator 364. The output of the integrator 364 is applied on line 366 to the A/D converter 372. The sampled signals are then applied to the A/D sample register 376. The sample signals from the A/D sample register 376 are applied on line 388 as input signals to the CPU 384. As described in the foregoing paragraphs, the CPU 384 comprises an optimal controller and filter for purposes of generating an appropriate control signal u for controlling the phase modulator 420. As also previously described and shown in FIG. 31, this signal is applied through a 16-bit "stripper" for purposes of obtaining the 16 most significant bits. The control signal u comprising the 16 most significant bits is applied on line 390 as an input signal to the D/A converter 392. The D/A converter 392 then generates an appropriate analog signal which is applied on line 394 to the hold circuit 396. The hold circuit 396 will appropriately time the application of signals on line 398 to the wave form generator 400. Waveform generator 400, with the application of a signal $F_2$, will provide a modulated signal corresponding to the previously described signal $A_2$. The waveform $A_2$ is then applied as an input signal to the attenuator 404. The resultant attenuated signal is applied on line 406 as an input to the adder circuit 408. Also applied as an input to the adder circuit 408 is the wave form $A_1$ which is generated by the waveform generator 412 having input signal $F_1$ as previously described herein. The resultant signal $A_3$ is then applied as an input signal to the driver circuit 416. The driver 416, as previously described, generates an appropriate voltage signal on line 418 which is applied as an input to the phase modulator 420. In this manner, the appropriate phase modulation is applied so as to control the output of the intensity signal at the photodiode 334 in a manner such that the DC component of the phase offset from the phase modulator 420 essentially is equal and opposite to the Sagnac phase resulting from rotation of the ring 308.

It should be noted that the purpose for the attenuator 404 is to reduce the scaling of the maximum output of the D/A converter 392. This scaling reduction can be utilized to reduce the maximum error in terms of the amplitude of the signal applied to the phase modulator 420. The attenuator 404 can have a scale factor reduction of, for example, $1/K_o$. Correspondingly, and as shown in FIG. 31, with this scale factor attenuation, a multiplier is utilized in the system having a scale factor multiplication of $K_o$.

In the exemplary optical rate sensor 300 depicted in FIG. 12, the optimal controller and filtering functions, in addition to the "stripping" of the most significant bits of the phase modulator voltage control signal u, can be achieved at least in part by the utilization of information processing within CPU 384.

The information processing and control functions which are accomplished in part by utilization of CPU 384 can be divided into certain real time sequences comprising the following functions: parameter and variable compensation, closure loop functions and data acquisition functions. The compensation program can be utilized to estimate or otherwise vary certain parameters associated with the optimal filter and optimal controller in view of temperature changes, changes in signal intensity and the like. For example, this compensation function can be utilized to vary the modeled scale factors such as $K_M$, $K_D$ and similar variables as previously described and depicted in other drawings herein.

The closure loop sequence can be utilized to determine the estimated values of the Sagnac phase $P_s$ and error IE from the output of the analog integrator 364. The closure loop sequence can also be utilized to then generate the appropriate phase modulator control voltage signal u, including the "rounded-off" signal by determining the most significant bits.

The data acquisition sequence can be utilized for providing control parameter inputs to the compensation sequence and the closure loop sequence. In addition, the data acquisition sequence can be utilized to receive signals representative of the values to be determined, such as the angular rate measurement and phase angle. It is obvious that other types of parameters can also be processed within the data acquisition sequence for purposes of providing various output data, such as measured temperatures, optical rate sensor status flags and the like.

Sequence control can be transferred between the compensation sequence and the closure loop sequence by conventional digital computer techniques such as the use of "interrupt" processing signals. As an example of one exemplary sequence which can be utilized with the optical rate sensor closure loop functions, FIG. 32 shows one example of a closure loop process. Referring to FIG. 32, the closure loop process is designated as "CL" and initiated by transfer of control from the compensation sequence through means of an "interrupt" or similar digital computer technique. Upon initialization of the sequence CL, the CPU 384 is made to read the next sample of the integrator output, designated in FIG. 32 as $A_E$(in). For purposes of further description, the letter "n" will indicate signals associated with the nth sample.

It should be noted that $A_E$(in) represents the output of the A/D converter 372 for a given sample period n. The input signal received from the A/D converter 372 can then be multiplied by a scale factor representative of the ratio between the "modeled" wavelength and the nominal wavelength. This modeled wavelength can be computed within the compensation sequence and represents the estimated wavelength in view of measured temperature and other measured parameters. The result of the scaled A/D input is shown in the FIG. 32 sequence diagram as the signal a(n).

The difference between the scaled A/D output signal a(n) and the computed estimate of a(n+1) from the prior sample period is then determined. The result of this computation is shown in the FIG. 32 sequence diagram as da(n). Following this computation, an estimate is made of the Sagnac phase $P_s$ and is shown in the FIG. 32 sequence diagram as $P_s(n+1)$. This estimate is obtained from the addition of the estimate of the Sagnac phase $P_s$ computed from the prior sample period (shown in FIG. 32 as $P_s(n)$) plus a value representing the multiplication of the optimal filter gain $K_2$, T (representing the sample period) and da(n). It will be immediately apparent that the optimal filter gain $K_2$ and the sample period T are signal values previously stored in memory locations of the CPU 384. For purposes of understanding, the signal values corresponding to the computations of the CPU 384 are shown in the system diagram representation of the optimal filter and optimal controller as depicted in FIG. 31.

After the computation of the estimated Sagnac phase $P_s(n+1)$, a computation is made for the next estimate of the integrator output a(n+1). This computation is shown in the FIG. 32 sequence diagram and corresponds to the signal at location L1 shown in the FIG. 31 system diagram. It should be noted that this computation utilizes stored values for the optimal filter gain $K_1$, optimal filter gain $K_2$, the "modeled" gain $K_D$ (representative of the gain associated with the amplifier, demodulator, etc. as previously described herein) and the modeled gain $K_M$ representative of the modeled phase modulator gain. In addition, this computation also utilizes the computed value $u_{ro}(n)$ representative of the "rounded off" computed value for the control variable u.

After the computation of the "next" estimate of the integrator output a=(n+1), a computation is then made to compute the "next" value of the control signal u(n+1). As shown in the FIG. 32 sequence diagram, this computation employs the ratio value Q/R, representing the weighting of the estimation effort versus the controller effort. As also shown in FIG. 32, the computation of the estimated Sagnac phase $P_s(n+1)$ and the control signal u(n+1) employ the attenuator scale factor value $K_0$.

Following the computation of the control signal u(n+1), this control signal is "rounded off" to its most significant bits. This computation represents a nonlinearity in the generation of the control signal. The resultant rounded off signal is shown in the FIG. 32 sequence diagram and in the FIG. 31 system diagram as signal $u_{ro}(n+1)$ As also shown in the FIG. 32 sequence diagram, this signal will be applied to the D/A converter 392 as the control signal previously described with respect to FIG. 12.

The estimated value of the Sagnac phase $P_s(n+1)$ is then utilized in a modulo 10 counter for purposes of summing and averaging consecutive determinations of the estimated Sagnac phase. The average of each ten Sagnac phase estimates is utilized as an output of the closure loop process for purposes of providing information to both the compensation program and the data acquisition program. For purposes of data acquisition and indication to a user or operator of the inertial rate input to sensor 300, it is clearly sufficient to provide an output indication of the estimated Sagnac phase at a frequency of once every tenth sample period, with the output representative of the average of the samples over the last ten sample periods.

In accordance with the foregoing, the appropriate control variable $u_{ro}(n+1)$ is computed based on the integrator output utilizing an optimal filter and controller. For purposes of providing an output signal representative of an estimate of the inertial input rate $G_I$, the estimate of the Sagnac phase $P_s(n+1)$ can be multiplied by the scale factor $1/K_s$ representing the modeled scale factor $K_s$ of the ring 308 between the inertial input rate and the Sagnac phase $P_s$. This output therefore represents the estimate of the inertial input rate $G_I$.

The principles of the invention are not limited to the specific optical rate sensor described herein for determining an applied angular velocity by means of measurement of an intensity signal corresponding to the Sagnac-induced phase shift which, in turn, is linearly proportional to the rotation rate. For example, it will be apparent to those skilled in the art that various other types of controller and filtering arrangements for estimation and control relating to the application of control signals to the phase modulator can be utilized without altering the basic concepts of the inventions. It will be further apparent to those skilled in the art that modifications and variations of the above described illustrative embodiment of the invention may be effected without departing from the spirit and scope of the novel concepts of the invention.

The embodiments of the invention in which an exclusive property or privilege is claimed are defined as follows:

1. An optical rate sensor for use in inertial reference systems to detect angular rotation and measure magnitude and directional sense of the rate of angular rotation, said rate sensor comprising:
   a passive ring Sagnac interferometer wherein a pair of counter-propagating optical waves are transmitted in opposite directions through a ring path and emerge therefrom with a relative Sagnac phase shift indicative of said rate of angular rotation, said interferometer comprising combining means for recombining said counter-propagating waves wherein the resultant low order fringe pattern is representative of the relative phases of said counter-propagating waves;
   phase modulation means connected to said interferometer for externally applying to said counter-propagating waves a non-reciprocal phase shift;
   circuit means connected to said interferometer for generating an intensity signal indicative of said resultant low order fringe pattern; and
   measuring means connected to said circuit means for measuring said intensity signal and generating an output signal corresponding to said rate of angular rotation;
   characterized in that:
   said measuring means comprises:
   demodulation means responsive to said intensity signal for demodulating said intensity signal and for generating a phase error signal;
   integration means connected to said demodulation means for integrating said phase error signal and for generating a corresponding integrated phase error signal;
   analog-to-digital converter means for converting said integrated error signal into a digital error signal corresponding thereto;
   central processing means responsive to said digital error signal and to clock signal to estimate the true value of said integrated phase error signals by combining past and present measurements of said signals, such that mean square errors between true and expected values thereof are minimized, and for generating a control signal representative thereof;
   modulation means for modulating said control signal so as to apply a level adjusted AC signal to said phase modulation means, and for generating a modulated reference signal;
   adder means for summing a period time-variant AC bias signal with said modulated reference signal, and for generating a modulator control signal, said control signal representative of the relative Sagnac phase shift of said pair of counter-propagating waves.

2. An optical rate sensor in accordance with claim 1 characterized in that the period of said AC bias signal is approximately twice the ring transit time for an optical wave traversing said ring path.

3. An optical rate sensor in accordance with claim 1 characterized in that the amplitude of said time-variant feedback signal will vary and substantially correspond to a non-reciprocal phase shift equal and opposite to the then-current relative Sagnac phase shift of said counter-propagating waves.

4. An optical rate sensor for detecting angular rotation, comprising:
   a ring interferometer wherein a pair of counter-propagating optical waves are transmitted in opposite directions through a ring path and emerge therefrom with a relative Sagnac phase shift indicative of the rate of angular rotation, the interferometer comprising an optical combiner which combines the counter propagating waves emerging from the ring into a combined optical wave wherein a resultant low-order fringe pattern is representative of the relative phases of the counter propagating waves,
   a detector coupled to the interferometer for generating an intensity signal indicative of the resultant low-order fringe pattern;
   control circuitry connected to the detector and including a digital processor and responsive to the intensity signal in each of a plurality of predefined time periods to store data derived from a measurement of the intensity signal and to generate a phase modulator control signal derived from the data stored in a previous time period and a measurement of the intensity signal in the current time period; and
   a phase modulator connected to the control circuitry and the interferometer and responsive to the control signal to apply to the counter-propagating waves a phase shift corresponding to the phase modulator control signal.

5. The sensor in accordance with claim 4 wherein the control circuitry is responsive to the intensity signal in each of the time periods to compute from a measurement of the intensity signal an estimate of the value of the measurement of the intensity signal in the next time period and wherein the data stored in each time period comprises the computed estimate.

6. An optical rate sensor for detecting angular rotation, comprising:
   a ring interferometer wherein a pair of counter-propagating optical waves are transmitted in opposite directions through a ring path and emerge therefrom with a relative Sagnac phase shift indicative of the rate of angular rotation, the interferometer comprising an optical combiner which combines the counter propagating waves emerging from the ring into a combined optical wave wherein a resultant low-order fringe pattern is representative of phase difference of the counter propagating waves;
   detector circuitry coupled to the interferometer for generating a detector output signal representative of the phase difference;
   control circuit including a digital processor and responsive to the detector output signal to generate a square wave phase error control signal having a plurality of pulses with predetermined starting times and indicative of a detected phase error;

a phase modulator connected to the control circuitry and the interferometer and responsive to the phase error control signal to apply to the counter-propagating waves a phase shift corresponding to the detected phase error; and interconnection circuitry connected to the detector circuitry to selectively apply the detector output signal to the control circuitry only during selected periods of time having starting times related to the predetermined starting times and having a duration substantially equal to a period of time T required by the optical waves to traverse the ring path.

7. The sensor in accordance with claim 6 wherein the square wave phase error control signal has a periodic rate which is a function of the time period T required by the light waves to traverse the ring path.

8. The sensor in accordance with claim 7 and further comprising timing circuitry for generating periodic timing pulses and wherein the interconnection circuitry is connected to the timing circuitry and responsive to the timing pulses to selectively apply a detector output signal representative of the phase difference to the control circuitry only at certain periods of time defined as a function of the periodic rate of the square wave phase error control signal.

9. The sensor in accordance with claim 8 wherein the interconnection circuitry applies detector output signals to the control circuitry at periods of time having starting times delayed from the predetermined starting times.

10. The sensor in accordance with claim 8 and further comprising a square wave generator for generating a square wave phase shift signal comprising a series of pulses of predetermined magnitude and having a periodic pulse rate defined as a function of the time period T required by the light waves to traverse the ring path and circuitry transmitting a combined output signal obtained by combining the phase error control signal and the phase shift signal to the phase modulator.

11. The sensor in accordance with claim 10 wherein the duration of one period of the periodic pulse rate of the phase shift signal is less than the time period T required by the light waves to traverse the ring path.

12. In an optical rate sensor comprising control circuitry and a ring interferometer wherein a pair of counter-propagating optical waves are transmitted in opposite directions through a ring path and emerge therefrom with a relative Sagnac phase shift indicative of the rate of angular rotation and wherein the counter-propagating waves emerge from the ring in a combined optical wave in which a resultant low-order fringe pattern is representative of phase difference of the counter-propagating waves, a method for controlling operation of the optical rate sensor comprising the steps of:

monitoring the combined optical wave and applying to the control circuitry a periodic electrical output signal which is representative of predetermined portions of the low-order fringe pattern occurring only in certain periods of time;

generating in the control circuitry and on the basis of the periodic control signal representative of the predetermined portions of the low-order fringe pattern a periodic phase error control signal indicative of a detected phase error;

periodically applying a phase shift to the counter-propagating waves proportional to the generated periodic phase error control signal, wherein a phase shift is applied to the counter-propagating waves proportional to a control signal generated on the basis of only predetermined portions of the low-order fringe pattern while other portions of the fringe pattern are blanked out.

13. The method in accordance with claim 12 wherein the periodic output signal has a periodic rate which is a function of the time period T required by the light to traverse the ring path.

14. The method in accordance with claim 12 wherein the step of generating a phase error control signal includes the step of generating a square wave phase error control signal having a periodic rate which is a function of the time period required by the light waves to traverse the ring path.

15. The method in accordance with claim 14 in which the step of generating a square wave phase error control signal comprises the step of generating such a control signal having a plurality of pulses having predetermined starting times and wherein the step of generating a periodic output signal comprises the step of generating such a signal having a plurality of pulses occurring in synchronism with the pulses of the phase error control signal and having starting times delayed from the starting times of the phase error control signal pulses.

16. The method in accordance with claim 15 and further comprising the step of generating a square wave phase shift signal comprising a series of pulses of predetermined magnitude and having a period pulse rate defined as a function of the time period T required by the light waves to traverse the ring path and the step of combining the square wave phase error control signal and the square wave phase shift signal prior to the step of applying the phase shift to the counter-propagating waves.

17. The method in accordance with claim 16 wherein the step of generating a square wave phase shift signal comprises the step of generating such a signal wherein the duration of one period of the periodic pulse rate is less than the time required by the light waves to traverse the ring path.

18. An optical rate sensor for detecting angular rotation, comprising:

a ring interferometer wherein a pair of counter-propagating optical waves are transmitted in opposite directions through a ring path and emerge therefrom with a relative phase shift indicative of the rate of angular rotation, the interferometer comprising an optical combiner which combines the counter-propagating waves emerging from the ring into a combined optical wave wherein a resultant low-order fringe pattern is representative of the relative phase shift;

detector circuitry coupled to the interferometer for generating a detector output signal representative of the phase shift;

a phase modulator connected to the interferometer and responsive to a phase control signal to apply to the counter-propagating waves a phase shift defined by the phase control signal;

timing circuitry for generating periodic timing pulses defining predetermined time intervals;

control circuitry including a digital processor responsive to the detector output signal to generate a phase control signal indicative of a detected phase error;

interface circuitry connected to the control circuitry and the phase modulator and responsive to the timing pulses to selectively apply the generated phase control signal to the phase modulator only during selected ones of the time intervals defined by the timing circuitry;

interconnection circuitry connected to the detector and the control circuitry and responsive to the timing pulses to selectively apply the detector output signal to the control circuitry only during the selected time intervals, whereby only selected portions of the detector output signal representative of the phase shift of the counter-propagating waves are applied to the control circuitry.

19. The sensor in accordance with claim 18 wherein the interconnection circuitry applies the detector output signal to the control circuitry at a periodic rate which is a function of the time period T required by the optical waves to traverse the ring path.

20. The sensor in accordance with claim 19 wherein the periodic rate is a function of 1/nT, and n is an integer.

21. The sensor in accordance with claim 18 wherein the interconnection circuitry comprises a switch responsive to the timing pulses to selectively connect the detector output signal to the control circuitry only during the selected time periods.

* * * * *